United States Patent
Naya et al.

(10) Patent No.: US 6,611,367 B1
(45) Date of Patent: Aug. 26, 2003

(54) SURFACE PLASMON OPTICAL MODULATOR ELEMENT

(75) Inventors: Masayuki Naya, Kaisei-machi (JP); Yoshio Inagaki, Minamiashigara (JP); Yoshihisa Usami, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/499,246

(22) Filed: Feb. 7, 2000

(30) Foreign Application Priority Data

| Feb. 5, 1999 | (JP) | 11-028015 |
| Mar. 2, 1999 | (JP) | 11-054744 |
| Mar. 2, 1999 | (JP) | 11-054746 |
| Mar. 2, 1999 | (JP) | 11-054748 |

(51) Int. Cl.$^7$ ................................. G02F 1/29
(52) U.S. Cl. .................. 359/299; 359/244; 359/262; 359/263; 359/321; 252/582; 430/581
(58) Field of Search ................ 359/244, 262, 359/263, 299, 321; 430/581–590

(56) References Cited

U.S. PATENT DOCUMENTS

| 4,092,168 A | 5/1978 | Lemahieu et al. | 430/510 |
| 4,803,150 A | 2/1989 | Dickerson et al. | 430/502 |
| 4,855,221 A | 8/1989 | Factor et al. | 430/510 |
| 4,857,446 A | 8/1989 | Diehl et al. | 430/510 |
| 4,861,700 A | 8/1989 | Shuttleworth et al. | 430/517 |
| 4,900,652 A | 2/1990 | Dickerson et al. | 430/502 |
| 4,920,031 A | 4/1990 | Ohno et al. | 430/522 |
| 4,948,717 A | 8/1990 | Diehl et al. | 430/510 |
| 5,115,336 A * | 5/1992 | Schildkraut et al. | 359/263 |
| 5,318,882 A | 6/1994 | Ootaguro et al. | 430/495 |

FOREIGN PATENT DOCUMENTS

| JP | 48-62826 | 9/1973 |
| JP | 49-5125 | 1/1974 |
| JP | 49-99620 | 9/1974 |
| JP | 49-114420 | 10/1974 |
| JP | 52-38056 | 3/1977 |
| JP | 52-92716 | 8/1977 |
| JP | 54-38129 | 3/1979 |
| JP | 55-10059 | 1/1980 |
| JP | 58-35544 | 3/1983 |
| JP | 59-16834 | 1/1984 |
| JP | 63-316853 | 12/1988 |
| JP | 64-40827 | 2/1989 |
| JP | 2-300287 | 12/1990 |
| JP | 2-300288 | 12/1990 |
| JP | 3-224793 | 10/1991 |
| JP | 9-277703 | 10/1997 |

OTHER PUBLICATIONS

Kyoichi Sasaki et al., "Ultrafast wide range all–optical switch using complex refractive–index changes in a composite film of silver and polymer containing photochromic dye", vol. 83. No. 6, 1998, pp. 2894–2900.

\* cited by examiner

*Primary Examiner*—Evelyn Lester
(74) *Attorney, Agent, or Firm*—Sughrue Mion, PLLC

(57) ABSTRACT

A surface plasmon optical modulator element includes a dielectric material block disposed so that light-to-be-modulated travels through the interior of the dielectric material block and impinges upon one surface thereof at an angle of total reflection, a metal film formed on the surface of the dielectric material block, a photo-functional film which is formed on the metal film and whose refractive index is changed upon exposure to light, and a modulating light source which projects modulating light onto the photo-functional film. The photo-functional film is formed of dye which contains an electron donor and an electron acceptor so that a photoelectron can be transferred therebetween.

68 Claims, 11 Drawing Sheets

PRIOR ART

F I G. 6
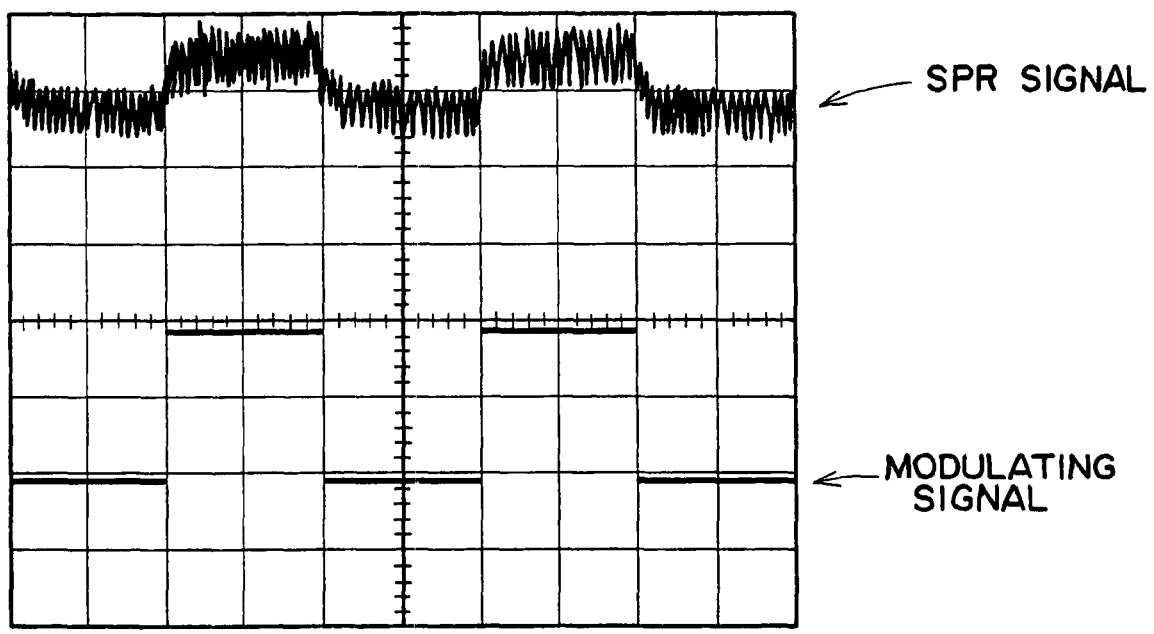

F I G . 13
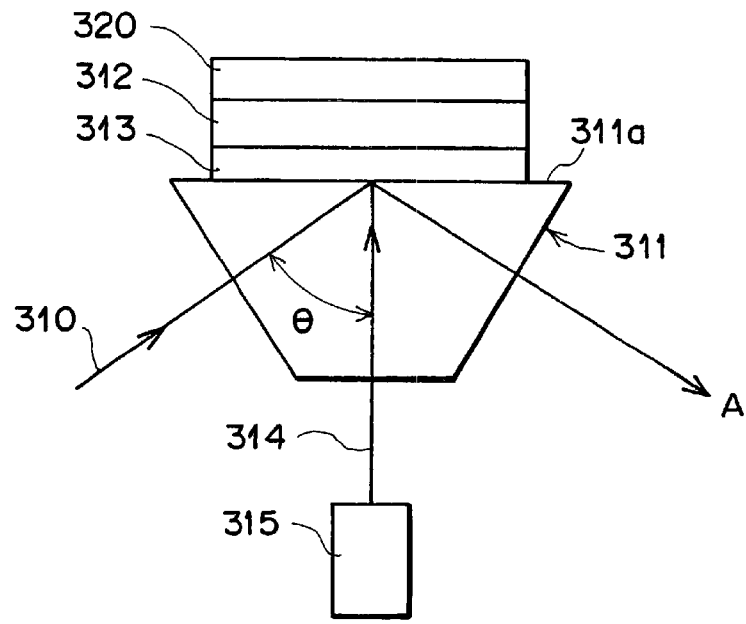
F I G . 14
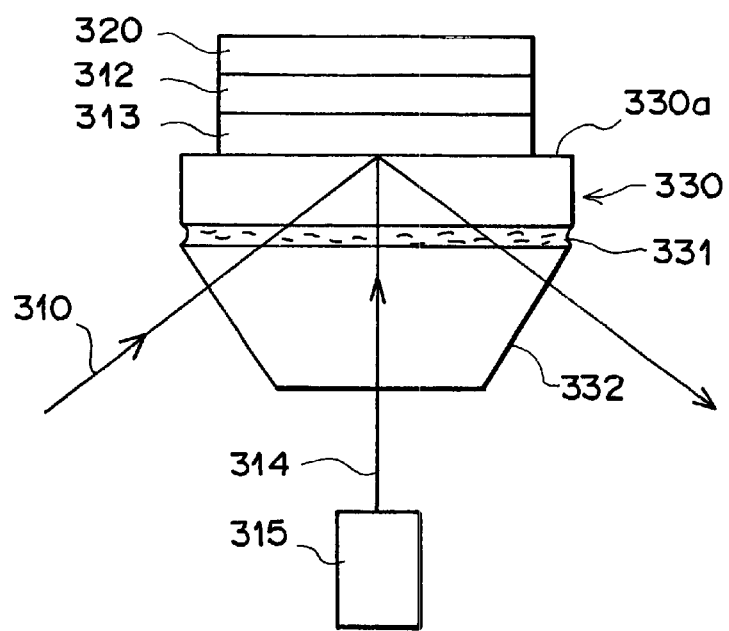

SURFACE PLASMON OPTICAL MODULATOR ELEMENT

BACKGROUND OF THE INVENTION

1. Field of the Invention

This invention relates to a surface plasmon optical modulator element which modulates light on the basis of generation of surface plasmon.

2. Description of the Related Art

In metal, free electrons vibrate in a group to generate compression wave called plasma wave. The compression wave generated in a surface of metal is quantized into surface plasmon.

There has been investigated a surface plasmon optical modulator element which modulates light on the basis of the phenomenon that the surface plasmon is generated by light wave as disclosed, for instance, in "Ultrafast wide range all-optical switch using complex refractive-index changes in a composite film of silver and polymer containing photochromic dye" by Kyoichi Sasaki and Toshihiko Nakamura, Journal of Applied Physics, vol. 83, No.6, pp. 72 to 78 (1998). FIG. 4 shows the basic arrangement of a surface plasmon optical modulator element which has been conventionally conceived (will be referred to as "the conventional surface plasmon optical modulator element", hereinbelow). As shown in FIG. 4, the conventional surface plasmon optical modulator element basically comprises a dielectric material block 11 disposed so that light-to-be-modulated modulated 10 travels through the interior of the dielectric material block 11 and impinges upon one surface 11a thereof at an angle of total reflection, a metal film 12 formed on the surface 11a of the dielectric material block 11, a photo-functional film 13 which is formed on the metal film 12 and whose refractive index is changed upon exposure to light, and a modulating light source 15 which projects modulating light 14 onto the photo-functional film 13.

In the surface plasmon optical modulator element, the angle of incidence θ of the light-to-be-modulated 10 to the surface 11a of the dielectric material block 11 is set, for instance, so that relatively strong surface plasmon resonance is generated in the metal film 12 when the modulating light 14 is projected onto the photo-functional film 13 and relatively weak or no surface plasmon resonance is generated in the metal film 12 when the modulating light 14 is not projected onto the photo-functional film 13.

With this arrangement, the light-to-be-modulated 10 is reflected in total reflection at the interface between the dielectric material block 11 and the metal film 12 and travels in the direction of arrow A in a state where the modulating light 14 is not projected onto the photo-functional film 13. To the contrast, when the modulating light 14 is projected onto the photo-functional film 13, surface plasmon resonance is generated to cancel the total reflection and the amount of light-to-be-modulated 10 reflected from the interface is greatly reduced or nullified. Thus, by controlling projection of the modulating light 14 onto the photo-functional film 13, the light-to-be-modulated 10 traveling in the direction of arrow A can be modulated.

Conventionally, the metal film 12 is generally of gold. Properties of a gold film are not apt to be changed by oxidation, which ensures stable modulation.

In the conventional surface plasmon optical modulator element in which a gold film is employed, there has been a problem that a sufficient degree of modulation cannot be obtained unless the refractive index of the photo-functional film 13 is greatly changed.

This will be described in detail with reference to FIG. 2, hereinbelow. FIG. 2 shows the relation between the angle of incidence θ of the light-to-be-modulated 10 to the surface 11a of the dielectric material block 11 and the reflectance of the surface 11a of the dielectric material block 11 for different conditions under which surface plasmon resonance is generated. In FIG. 2, characteristic curve a represents the relation when the condition under which surface plasmon resonance is generated (will be referred to as "the surface plasmon resonance generating condition", hereinbelow) is relatively slack and characteristic curve b represents the relation when the surface plasmon resonance generating condition is relatively strict. The characteristic curves a and b are translated substantially in the direction of the abscissa when the refractive index of the photo-functional film 13 on the metal film 12 changes according to whether the modulating light 14 is projected onto the photo-functional film 13. As can be understood from the characteristic curve a, when the surface plasmon resonance generating condition is slack, the difference between the reflectance when the modulating light 14 is projected and that when the modulating light 14 is not projected, i.e., the degree of modulation, cannot be large unless the difference between the refractive indexes of the photo-functional film 13 when the modulating light 14 is projected onto the photo-functional film 13 and when the modulating light 14 is not projected onto the photo-functional film 13 is extremely large. The refractive index of the photo-functional film 13, the reflectance of the surface 11a and the like when the modulating light 14 is projected onto the photo-functional film 13 will be referred to as the refractive index of the photo-functional film 13, the reflectance of the surface 11a and the like with projection of the modulating light 14, hereinbelow. Similarly the refractive index of the photo-functional film 13, the reflectance of the surface 11a and the like when the modulating light 14 is not projected onto the photo-functional film 13 will be referred to as the refractive indexes of the photo-functional film 13, the reflectance of the surface 11a and the like without projection of the modulating light 14, hereinbelow.

To the contrast, as can be understood from the characteristic curve b, when the surface plasmon resonance generating condition is strict, the difference between the reflectance with projection of the modulating light 14 and that without projection of the modulating light 14 can be large and a large degree of modulation can be obtained even if the difference between the refractive indexes with and without projection of the modulating light 14 is small.

When the metal film 12 is of gold, the surface plasmon resonance generating condition is relatively slack as represented by the characteristic curve a in FIG. 2 and accordingly it is difficult to obtain a sufficient degree of modulation.

When a metal film 12 of silver is employed, the surface plasmon resonance generating condition becomes more strict. However properties of a silver film are apt to be changed by oxidation and accordingly, it is difficult to obtain stable modulation when a silver film is employed.

As disclosed in the above identified paper, the photo-functional film 13 has been conceived to be formed by use of dye comprising spiropyran series photochromic compound. Further the photo-functional film 13 is conceived to be formed by use of phthalocyanine dye as disclosed in the arguments in a public lecture, "Frontier Technology in Molecular Photonics" (Dec. 11, 1997) pp. 181 to 187, published by Shizuoka University Electronics Laboratory.

However, the photo-functional film 13 of spiropyran series photochromic dye is disadvantageous in that it is slow in response to light and accordingly is unsuitable for high speed modulation. Further, the photo-functional film 13 of phthalocyanine dye is disadvantageous in that its light absorption wavelength is limited and accordingly it can only serve to modulation of light at limited wavelengths.

Further, there has been a problem in the conventional surface plasmon optical modulator element that it is difficult to correctly position relatively to each other the light-to-be-modulated 10 and the modulating light 14 which are caused to impinge upon the metal film on opposite sides of the metal film. That is, since the light-to-be-modulated 10 is generally a thin beam and the modulating light 14 is condensed into a thin beam when a high power density is required to generate a desired change in the refractive index of the photo-functional film 13, positioning of the beams becomes difficult.

Further, though the metal film 12 may be formed of silver or copper as well as gold, properties of a silver film are apt to be changed by oxidation. When a protective layer is formed between the silver film 12 and the photo-functional film 13 in order to protect the silver film 12 from oxidation, action of controlling the surface plasmon resonance by change of the refractive index of the photo-functional film 13 can be deteriorated.

SUMMARY OF THE INVENTION

In view of the foregoing observations and description, the primary object of the present invention is to provide a surface plasmon optical modulator element in which a sufficiently high degree of modulation can be obtained by changing the refractive index of the photo-functional film by a small amount and at the same time a stable modulation can be obtained.

Another object of the present invention is to provide a surface plasmon optical modulator element which can realize a high-speed modulation of light at various wavelengths.

Still another object of the present invention is to provide a surface plasmon optical modulator element in which positioning of the light-to-be-modulated and the modulating light is facilitated and at the same time the metal film can be easily protected without deteriorating properties of the metal film.

In accordance with a first aspect of the present invention, there is provided a surface plasmon optical modulator element comprising a dielectric material block disposed so that light-to-be-modulated travels through the interior of the dielectric material block and impinges upon one surface thereof at an angle of total reflection, a metal film formed on said one surface of the dielectric material block, a photo-functional film which is formed on the metal film and whose refractive index is changed upon exposure to light, and a modulating light source which projects modulating light onto the photo-functional film, wherein the improvement comprises that said metal film is a silver film and an oxygen cut film which is transparent to the modulating light is formed on the photo-functional film.

In accordance with a second aspect of the present invention, there is provided a surface plasmon optical modulator element which is basically the same as that in accordance with the first aspect of the present invention except that the oxygen cut film is formed on the silver film.

In accordance with a third aspect of the present invention, there is provided a surface plasmon optical modulator element which is basically the same as that in accordance with the first aspect of the present invention except that the photo-functional film itself is an oxygen cut film.

In the surface plasmon optical modulator elements in accordance with the first to third aspects of the present invention, the angle of incidence of the light-to-be-modulated to said one surface of the dielectric material block is set, for instance, so that relatively strong surface plasmon resonance is generated in the metal film when the modulating light is projected onto the photo-functional film and relatively weak or no surface plasmon resonance is generated in the metal film when the modulating light is not projected onto the photo-functional film.

Otherwise, the angle of incidence of the light-to-be-modulated to said one surface of the dielectric material block may be set so that relatively strong surface plasmon resonance is generated in the metal film when the modulating light is not projected onto the photo-functional film and relatively weak or no surface plasmon resonance is generated in the metal film when the modulating light is projected onto the photo-functional film.

It is preferred when the light-to-be-modulated is linearly polarized light that the dielectric material block be positioned so that the light-to-be-modulated impinges upon said one surface in the form of P-polarized light.

As the dielectric material block, a dielectric material block in the form of a prism can be suitably used. Otherwise, the dielectric material block may be integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism. The dielectric material block is formed of a dielectric material which is transparent to the wavelength of the light-to-be-modulated. It is especially preferred that the dielectric material block be formed of a dielectric material whose refractive index to the wavelength of the light-to-be-modulated is in the range of 1.2 to 3. For example, the dielectric material block may be formed of BK7, high refractive index glass, polycarbonate, or the like.

In the surface plasmon optical modulator elements in accordance with the first to third aspects of the present invention, the thickness of the silver film is set so that surface plasmon resonance is generated when a modulating light at a wavelength in the range of 350 nm to 2000 nm is projected onto the photo-functional film, and is preferably in the range of 10 nm to 70 nm. A thin layer of anchor material such as Cr, Ge or the like may be provided, preferably in a thickness not larger than 5 nm, between the dielectric material block and the silver film in order to bring the dielectric material block and the silver film into a close contact with each other.

Further, it is preferred that the oxygen cut film be transparent to light at a wavelength of the modulating light. For example, the oxygen cut film may be of known ultraviolet curing resin or polyvinyl alcohol. The oxygen cut film may be formed by known various methods and the thickness of the oxygen cut film is preferably in the range of 500 nm to 2000 nm.

In accordance with a fourth aspect of the present invention, there is provided a surface plasmon optical modulator element comprising a dielectric material block disposed so that light-to-be-modulated travels through the interior of the dielectric material block and impinges upon one surface thereof at an angle of total reflection, a dielectric material layer which is formed on said one surface of the dielectric material block and is of a material lower than the dielectric material block in refractive index, a metal film formed on the dielectric material layer, a photo-functional film which is formed on the metal film and whose refractive index is changed upon exposure to light, and a modulating light source which projects modulating light onto the photo-functional film.

In the surface plasmon optical modulator element in accordance with the fourth aspect of the present invention, the angle of incidence of the light-to-be-modulated to said one surface of the dielectric material block is set, for instance, so that relatively strong surface plasmon resonance is generated in the metal film when the modulating light is projected onto the photo-functional film and relatively weak or no surface plasmon resonance is generated in the metal film when the modulating light is not projected onto the photo-functional film.

Otherwise, the angle of incidence of the light-to-be-modulated to said one surface of the dielectric material block may be set so that relatively strong surface plasmon resonance is generated in the metal film when the modulating light is not projected onto the photo-functional film and relatively weak or no surface plasmon resonance is generated in the metal film when the modulating light is projected onto the photo-functional film.

It is preferred that the refractive index of the dielectric material layer be substantially equal to the refractive index of the photo-functional film without projection of the modulating light. The dielectric material layer may be formed of, for instance, $SiO_2$ or the like, and is preferably 100 nm to 1000 nm in thickness.

It is preferred when the light-to-be-modulated is linearly polarized light that the dielectric material block be positioned so that the light-to-be-modulated impinges upon said one surface in the form of P-polarized light.

As the dielectric material block, a dielectric material block in the form of a prism can be suitably used. Otherwise, the dielectric material block may be integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism. The dielectric material block is formed of a dielectric material which is transparent to the wavelength of the light-to-be-modulated. It is especially preferred that the dielectric material block be formed of a dielectric material whose refractive index to the wavelength of the light-to-be-modulated is in the range of 1.2 to 3. For example, the dielectric material block may be formed of BK7, high refractive index glass, polycarbonate, or the like. The difference in refractive index between the dielectric material block and the dielectric layer is preferably in the range of 0.1 to 0.9.

In the surface plasmon optical modulator element in accordance with the fourth aspect of the present invention, the metal film is formed of metal which satisfies the condition that surface plasmon resonance is generated when a modulating light at a wavelength in the range of 350 nm to 2000 nm is projected onto the photo-functional film. For example, the metal film may be formed of gold, silver, copper or aluminum. The thickness of the metal film is set so that surface plasmon resonance is generated when a modulating light at a wavelength in the range of 350 nm to 2000 nm is projected onto the photo-functional film, and is preferably in the range of 10 nm to 70 nm. The metal film may be formed on the low-refractive-index dielectric material layer by a known method such as deposition, sputtering, plating or the like. A thin layer of anchor material such as Cr, Ge or the like may be provided, preferably in a thickness not larger than 5 nm, between the low-refractive-index dielectric material block and the metal film in order to bring the low-refractive-index dielectric material block and the metal film into a close contact with each other.

In accordance with a fifth aspect of the present invention, there is provided a surface plasmon optical modulator element comprising a dielectric material block disposed so that light-to-be-modulated travels through the interior of the dielectric material block and impinges upon one surface thereof at an angle of total reflection, a metal film formed on said one surface of the dielectric material block, a photo-functional film which is formed on the metal film and whose refractive index is changed upon exposure to light, and a modulating light source which projects modulating light onto the photo-functional film, wherein the improvement comprises that said photo-functional film is formed of dye which contains an electron donor and an electron acceptor so that a photoelectron can be transferred therebetween.

In the surface plasmon optical modulator element in accordance with the fifth aspect of the present invention, the dielectric material block is formed of a dielectric material which is transparent to the wavelength of the light-to-be-modulated. It is especially preferred that the dielectric material block be formed of a dielectric material whose refractive index to the wavelength of the light-to-be-modulated is in the range of 1.2 to 3. For example, the dielectric material block may be formed of BK7, high refractive index glass, polycarbonate, or the like.

In the surface plasmon optical modulator element in accordance with the fifth aspect of the present invention, the metal film is formed of metal which satisfies the condition that surface plasmon resonance is generated when a modulating light at a wavelength in the range of 350 nm to 2000 nm is projected onto the photo-functional film. For example, the metal film may be formed of gold, silver, copper or aluminum. The thickness of the metal film is set so that surface plasmon resonance is generated when a modulating light at a wavelength in the range of 350 nm to 2000 nm is projected onto the photo-functional film, and is preferably in the range of 10 nm to 70 nm. The metal film may be formed on the dielectric material block by a known method such as deposition, sputtering, plating or the like. A thin layer of anchor material such as Cr, Ge or the like may be provided, preferably in a thickness not larger than 5 nm, between the dielectric material block and the metal film in order to bring the dielectric material block and the metal film into a close contact with each other. In this specification, the expression "a metal film formed on said one surface of the dielectric material block" should be broadly interpreted to include a metal film formed on said one surface of the dielectric material block with one or more films intervening therebetween as well as a metal film formed directly on said one surface of the dielectric material block. Similarly, the expression "a photo-functional film formed on the metal film" should be broadly interpreted to include a photo-functional film formed on the metal film with one or more films intervening therebetween as well as a photo-functional film formed directly on the metal film.

In the surface plasmon optical modulator element in accordance with the fifth aspect of the present invention, the photo-functional film is obtained by applying the dye to a metal film by a known method such as spin coating, deposition, sputtering or the like. The thickness of the photo-functional film is controlled so that surface plasmon resonance is generated when a modulating light at a wavelength in the range of 350 nm to 2000 nm is projected onto the photo-functional film and is generally in the range of 10 nm to 1000 nm. Further, the angle of incidence of the light-to-be-modulated to said one surface of the dielectric material block is set, for instance, so that relatively strong surface plasmon resonance is generated in the metal film when the modulating light is projected onto the photo-functional film and relatively weak or no surface plasmon resonance is generated in the metal film when the modulating light is not projected onto the photo-functional film.

Otherwise, the angle of incidence of the light-to-be-modulated to said one surface of the dielectric material block may be set so that relatively strong surface plasmon resonance is generated in the metal film when the modulating light is not projected onto the photo-functional film and relatively weak or no surface plasmon resonance is generated in the metal film when the modulating light is projected onto the photo-functional film.

It is preferred when the light-to-be-modulated is linearly polarized light that the dielectric material block be positioned so that the light-to-be-modulated impinges upon said one surface in the form of P-polarized light.

As the dielectric material block, a dielectric material block in the form of a prism can be suitably used. Otherwise, the dielectric material block may be integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism.

In accordance with a sixth aspect of the present invention, there is provided a surface plasmon optical modulator element comprising a dielectric material block disposed so that light-to-be-modulated travels through the interior of the dielectric material block and impinges upon one surface thereof at an angle of total reflection, a photo-functional film which is formed on said one surface of the dielectric material block and whose refractive index is changed upon exposure to light, a metal film formed on the photo-functional film, and a modulating light source which projects modulating light onto the photo-functional film through the dielectric material block.

In this specification, the expression "a photo-functional film formed on said one surface of the dielectric material block" should be broadly interpreted to include a photo-functional film formed on said one surface of the dielectric material block with one or more films intervening therebetween as well as a photo-functional film formed directly on said one surface of the dielectric material block. Similarly, the expression "a metal film formed on the photo-functional film" should be broadly interpreted to include a metal film formed on the photo-functional film with one or more films intervening therebetween as well as a metal film formed directly on the photo-functional film.

It is preferred that a protective layer which prevents oxidation of the metal film be formed on the metal film.

In the surface plasmon optical modulator element in accordance with the sixth aspect of the present invention, the angle of incidence of the light-to-be-modulated to said one surface of the dielectric material block is set, for instance, so that relatively strong surface plasmon resonance is generated in the metal film when the modulating light is projected onto the photo-functional film and relatively weak or no surface plasmon resonance is generated in the metal film when the modulating light is not projected onto the photo-functional film.

Otherwise, the angle of incidence of the light-to-be-modulated to said one surface of the dielectric material block may be set so that relatively strong surface plasmon resonance is generated in the metal film when the modulating light is not projected onto the photo-functional film and relatively weak or no surface plasmon resonance is generated in the metal film when the modulating light is projected onto the photo-functional film.

It is preferred when the light-to-be-modulated is linearly polarized light that the dielectric material block be positioned so that the light-to-be-modulated impinges upon said one surface in the form of P-polarized light.

As the dielectric material block, a dielectric material block in the form of a prism can be suitably used. Otherwise, the dielectric material block may be integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism. The dielectric material block is formed of a dielectric material which is transparent to the wavelength of the light-to-be-modulated. It is especially preferred that the dielectric material block be formed of a dielectric material whose refractive index to the wavelength of the light-to-be-modulated is in the range of 1.2 to 3. For example, the dielectric material block may be formed of BK7, high refractive index glass, polycarbonate, or the like.

In the surface plasmon optical modulator element in accordance with the sixth aspect of the present invention, the metal film is formed of metal which satisfies the condition that surface plasmon resonance is generated when a modulating light at a wavelength in the range of 350 nm to 2000 nm is projected onto the photo-functional film. For example, the metal film may be formed of gold, silver, copper or aluminum. The thickness of the metal film is set so that surface plasmon resonance is generated when a modulating light at a wavelength in the range of 350 nm to 2000 nm is projected onto the photo-functional film, and is preferably in the range of 10 nm to 70 nm. The metal film may be formed on the photo-functional film by a known method such as deposition, sputtering, plating or the like. A thin layer of anchor material such as Cr, Ge or the like may be provided, preferably in a thickness not larger than 5 nm, between the photo-functional film and the metal film in order to bring the photo-functional film and the metal film into a close contact with each other.

Further, as the protective layer which prevents oxidation of the metal film, a film formed of a material which is transparent to light at a wavelength equal to that of the modulating light and can cut oxygen is preferred. Specifically the protective layer may be formed of an ultraviolet-curing resin film or a polyvinyl alcohol film. Such a film may be formed on the metal film by various known methods. The thickness of the protective layer is preferably in the range of 500 to 2000 nm.

The photo-functional film may be suitably formed of a compound represented by the following general formula (I).

General formula (I)

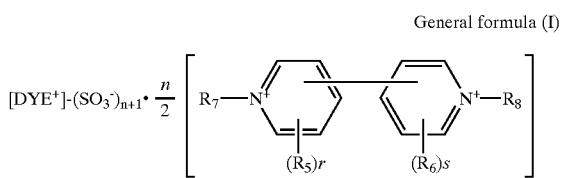

wherein DYE$^+$ represents a monovalent cyanine dye cation, n represents an integer not smaller than 1, $R_5$ and $R_6$ represent a substituent group independently of each other, $R_7$ and $R_8$ represent an alkyl group, an alkenyl group, an alkynyl group, an aralkyl group, an aryl group or a heterocyclic group independently of each other, $R_5$ and $R_6$ may be bonded to form a ring, $R_5$ and $R_7$ may be bonded to form a ring, $R_6$ and $R_8$ may be bonded to form a ring, $R_7$ and $R_8$ may be bonded to form a ring, and r and s represent an integer from 0 to 4 independently of each other. When each of r and s represents an integer not smaller than 2, that is, when there are a plurality of $R_5$'s or $R_6$'s, they may be either equal to each other or different from each other.

It is preferred that the monovalent cyanine dye cation (DYE$^+$) in the general formula (I) be a cation represented by the following general formula (I-1).

General formula (I-1)

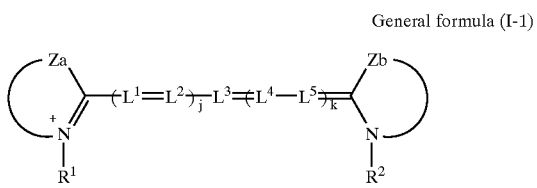

wherein Za and Zb represent independently of each other a group of atoms required to form a five- or six-membered nitrogen-containing heterocycle, $R^1$ and $R^2$ represent independently of each other an alkyl group or an aryl group, $L^1$, $L^2$, $L^3$, $L^4$ and $L^5$ represent independently of each other a substituted or non-substituted methyne (when there exists a substituent group on $L^1$ to $L^5$, they may be bonded to form a ring), j represents 0 or 1, and k represents 0 or 1.

The five- or six-membered nitrogen-containing heterocycle (nucleus) represented by Za or Zb includes, for instance, a thiazole nucleus, benzothiazole nucleus, naphthathiazole nucleus, thiazoline nucleus, oxazole nucleus, benzooxazole nucleus, naphthaoxazole nucleus, oxazoline nucleus, selenazole nucleus, benzoselenazole nucleus, naphthaselenozole nucleus, selenazoline nucleus, tellurazole nucleus, benzotellurazole nucleus, naphthatellurazole nucleus, tellurazoline nucleus, imidazole nucleus, benzoimidazole nucleus, naphthaimidazole nucleus, pyridine nucleus, quinoline nucleus, isoquinoline nucleus, imidazo[4,5-b] quinoxaline nucleus, oxadiazole nucleus, thiadiazole nucleus, tetrazole nucleus and pyrimidine nucleus.

Among these nuclei, benzothiazole nucleus, imidazole nucleus, naphthaimidazole nucleus, quinoline nucleus, isoquinoline nucleus, imidazo[4,5-b]quinoxaline nucleus, thiadiazole nucleus, tetrazole nucleus and pyrimidine nucleus are preferred.

These rings may be provided with a benzene ring or a naphthoquinone condensed thereto.

The five- or six-membered nitrogen-containing heterocycle may have a substituent group or atom such as a halogen atom, a substituted or non-substituted alkyl group and an aryl group. As the halogen atom, a chlorine atom is preferred. As the alkyl group, a straight-chain alkyl group having 1 to 6 carbon atoms is preferred. The substituent group for the alkyl group includes an alkoxy group (e.g., methoxy group), an alkylthio group (e.g., methylthio group) and the like. As the aryl group, a phenyl group is preferred.

The alkyl group represented by $R^1$ or $R^2$ may have a substituent group and is preferably a straight-chain, cyclic or branched alkyl group having 1 to 18 (preferably 1 to 8, and more preferably 1 to 6) carbon atoms.

The aryl group represented by $R^1$ or $R^2$ may have a substituent group and is preferably a straight-chain, cyclic or branched aryl having 6 to 18 carbon atoms.

A preferable substituent group for the alkyl group or the aryl group represented by $R^1$ or $R^2$ includes the following.

A substituted or non-substituted aryl group having 6 to 18 carbon atoms (e.g., phenyl group, chlorophenyl group, anisyl group, toluic group, 2,4-di-t-amyl, and 1-naphthyl), an alkenyl group (e.g., vinyl and methylvinyl), an alkynyl group (e.g., ethinyl, 2-methylethinyl and 2-phenylethinyl), a halogen atom (e.g., F, Cl, Br and I), a cyano group, a hydroxyl group, a carboxyl group, anacyl group (e.g., acetyl, benzoyl, salicyloyl, and pivaloyl), an alkoxy group (e.g., methoxy, butoxy and cyclohexyloxy), an allyloxy group (e.g., phenoxy and 1-naphthaoxy), an alkylthio group (e.g., methylthio, butylthio, benzylthio and 3-methoxypropylthio), an allylthio group (e.g., phenylthio and 4-chlorophenylthio), an alkylsulfonyl group (e.g., methanesulfonyl and butanesulfonyl), an arylsulfonyl group (e.g., benzenesulfonyl and paratoluene sulfonyl), a carbamoyl group having 1 to 10 carbon atoms, an amide group having 1 to 10 carbon atoms, an acyloxy group having 2 to 10 carbon atoms, an alkoxycarbonyl group having 2 to 10 carbon atoms, and a heterocyclic group (e.g., aromatic heterocyclic such as pyridyl, thienyl, furil, thiszolyl, imidazolyl and pyrazolyl, aliphatic heterocyclic such as pyrrolidine ring, piperidine ring, morpholine ring, pyran ring, thiopyran ring, dioxane ring, and dithiolane).

It is preferred that each of $R^1$ and $R^2$ be a non-substituted straight-chain alkyl group having 1 to 8 (preferably 1 to 6, and more preferably 1 to 4) carbon atoms or a substituted straight-chain alkyl group having 1 to 8 (preferably 1 to 6, and more preferably 1 to 4) carbon atoms substituted by an alkoxy group (especially methoxy) or by an alkylthio group (especially methylthio).

The methyne group represented by $L^1$ to $L^5$ may have a substituent group. A preferable substituent group includes an alkyl group having 1 to 18 carbon atoms, an aralkyl group and those listed above as the preferable substituent groups for the alkyl group or the aryl group represented by $R^1$ or $R^2$. Among these groups, an alkyl group (e.g., methyl), an aryl group (e.g., phenyl), a halogen atom (e.g., Cl and Br) and an aralkyl group (e.g., benzyl) are preferred.

It is preferred that j and k are 0 or 1 independently of each other.

The substituent groups on the $L^1$ to $L^5$ may be bonded to form a ring, which ring is preferably a five- or six-membered ring. Two or more such rings may be fused to each other. The site at which the substituent groups are bonded depends upon the number of the methyne chains formed. For example, when the methyne chain is formed by the $L^1$ to $L^5$ is a pentamethyne chain, then the preferable connecting sites are $L^1$ and $L^3$, $L^2$ and $L^4$ and $L^3$ and $L^5$. When a double-fused ring is to be formed, the connecting sites are $L^1$, $L^3$ and $L^5$. Further, in this case, L1 and R1, L1 and R2 and L3 and R2 may be bonded to form a ring, which is preferably a five- or six-membered ring.

It is preferred that the ring formed by the substituent groups on the $L^1$ to $L^5$ be a cyclohexen.

Among the cyanine dye cations represented by general formula (I-1), cations represented by the following general formula (I-2) are especially preferable.

General formula (I-2)

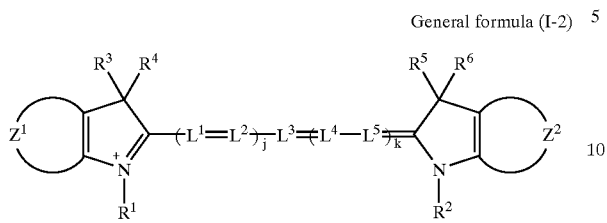

wherein $Z^1$ and $Z^2$ represent independently of each other a group of atoms required to form an indolenyne nucleus or a benzoindolenyne nucleus, $R^1$ and $R^2$ represent independently of each other an alkyl group or an aryl group, $R^3$, $R^4$, $R^5$ and $R^6$ represent independently of each other an alkyl group, $L^1$, $L^2$, $L^3$, $L^4$ and $L^5$ represent independently of each other a substituted or non-substituted methyne (when there exists a substituent group on $L^1$ to $L^5$, they may be bonded to form a ring), j represents 0, 1 or 2, and k represents 0 or 1.

The indolenyne nucleus or the benzoindolenyne nucleus represented by $Z^1$ and $Z^2$ may have a substituent group or atom such as a halogen atom, and an aryl group. As the halogen atom, a chlorine atom is preferred. As the aryl group, a phenyl group is preferred.

The alkyl group represented by $R^3$ to $R^6$ is preferably a straight-chain, cyclic or branched alkyl group having 1 to 18 (preferably 1 to 8, and more preferably 1 to 6) carbon atoms. $R^3$ and $R^4$ may be bonded to form a ring, and similarly $R^5$ and $R^6$ may be bonded to form a ring.

The alkyl group represented by $R^3$ to $R^6$ may have a substituent group. A preferable substituent group includes those listed above as the preferable substituent groups for the alkyl group or the aryl group represented by $R^1$ or $R^2$.

The alkyl group represented by $R^3$ to $R^6$ is preferably a non-substituted straight-chain alkyl group (especially methyl or ethyl) having 1 to 6 carbon atoms.

It is preferred that ($SO_3^-$) group in [$DYE^+$]-($SO_3^-$)$_{n+1}$ be bonded to terminals of R1 and R2 in the general formulae (I-1) and I-2).

Specific examples of the part represented by [$DYE^+$]-($SO_3^-$)$_{n+1}$ in the general formula (I) will be listed below.

A-1

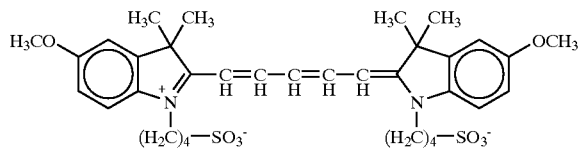

A-2

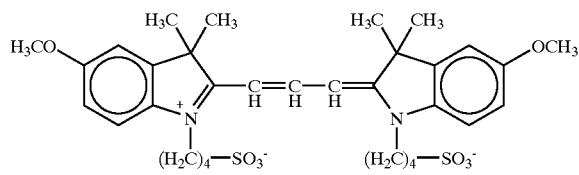

A-3

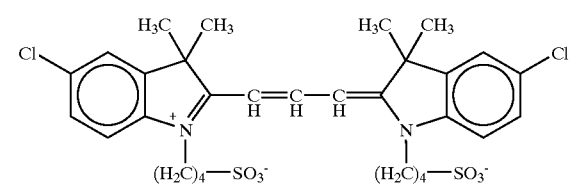

A-4

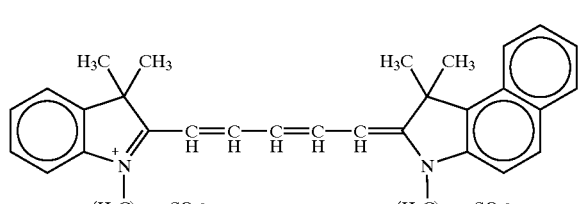

A-5

A-6

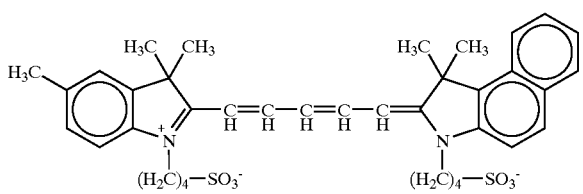

A-7

A-8

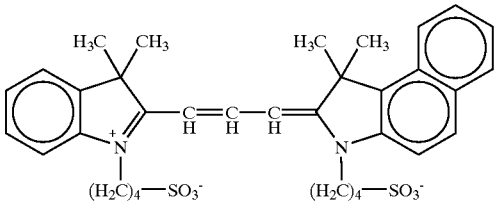

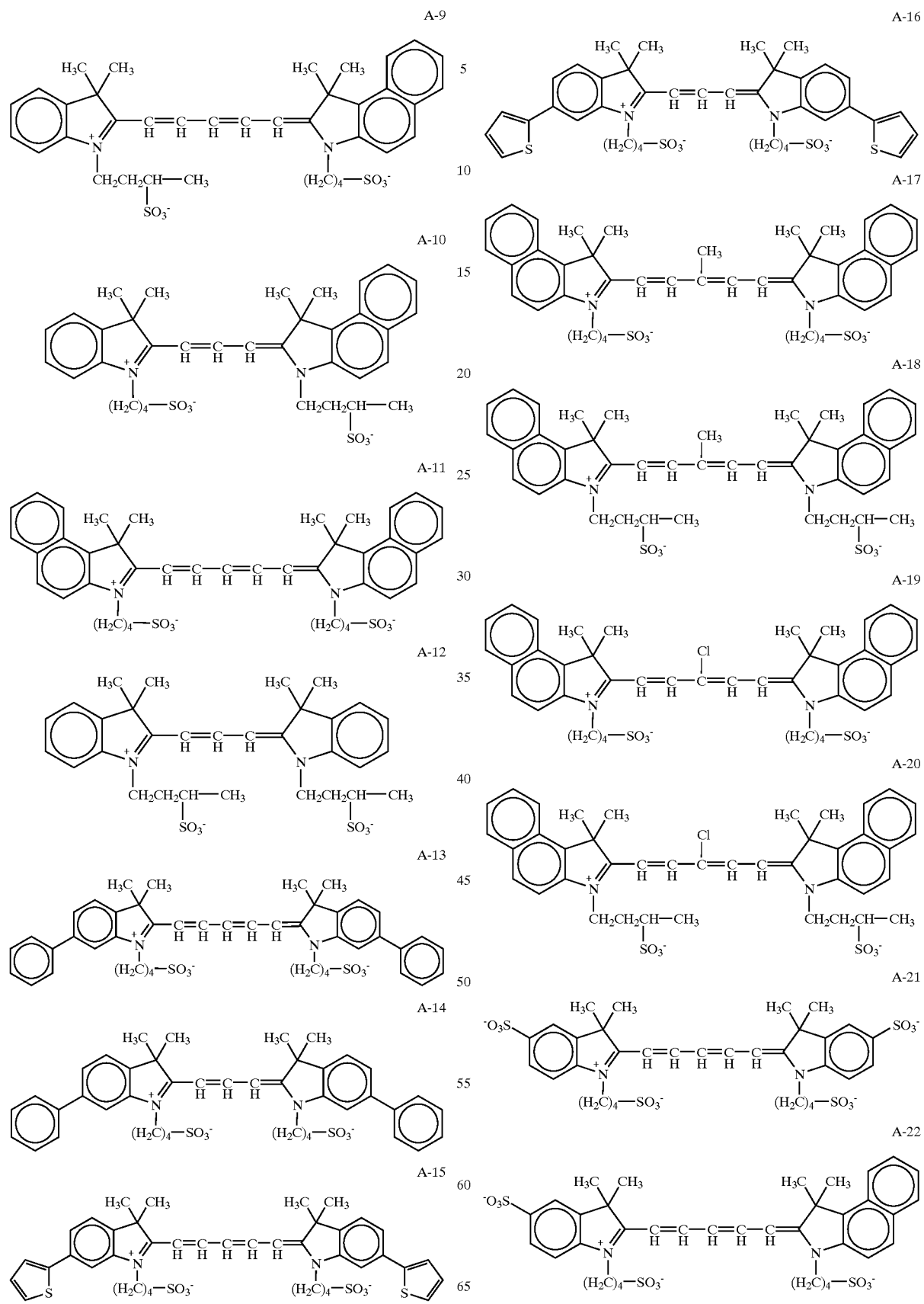

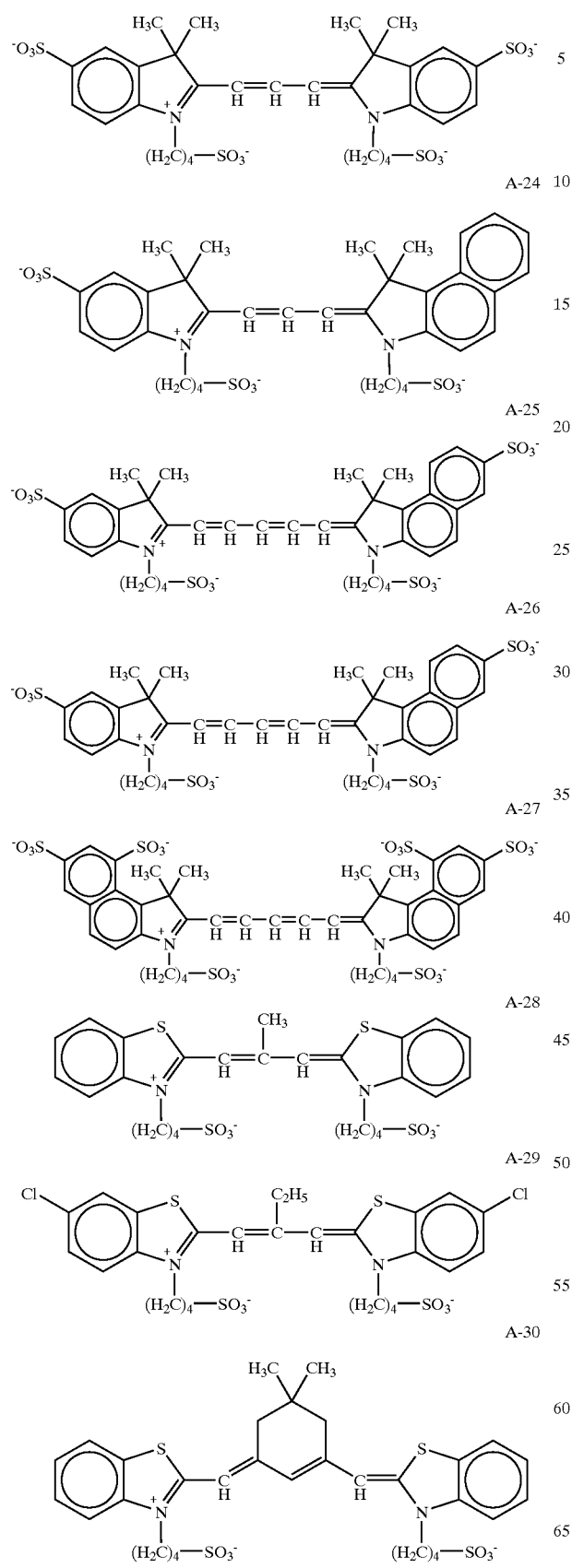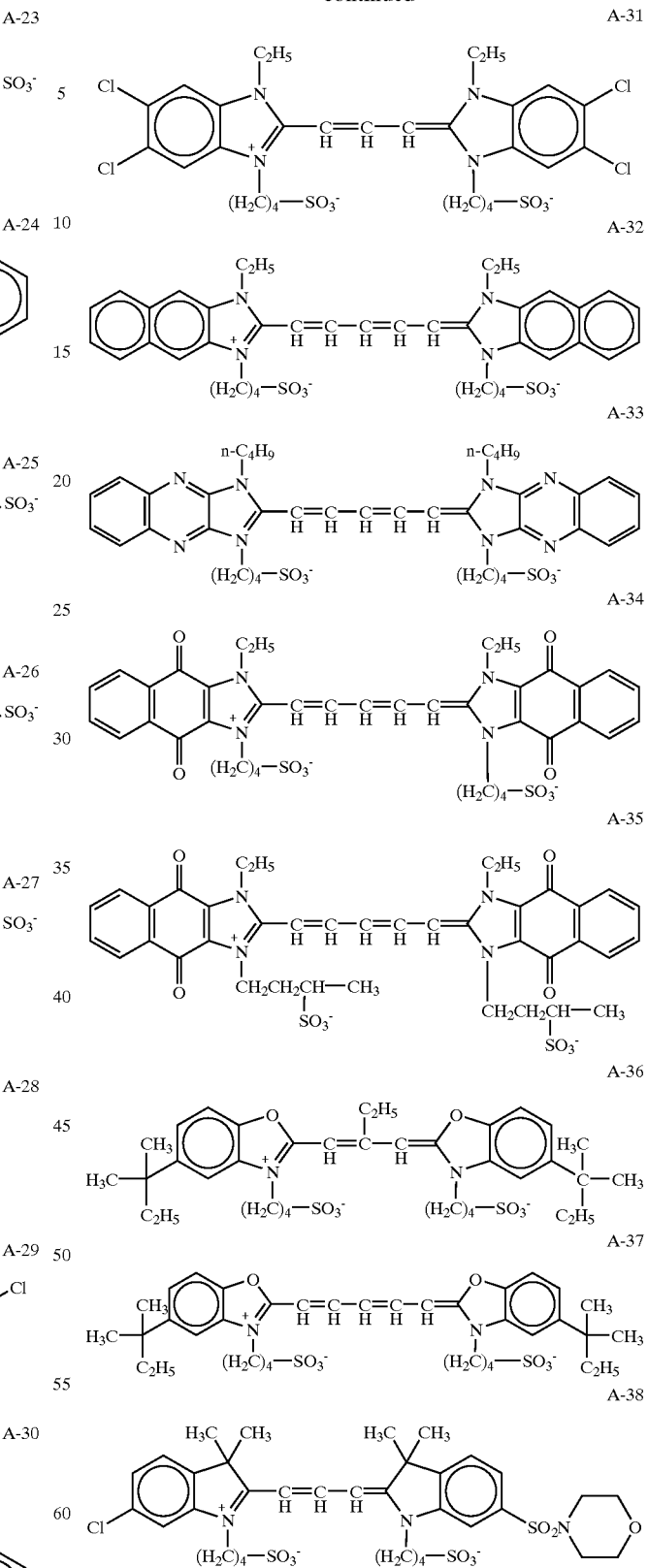
The part of the general formula (I) represented by the following formula (I-3) will be described in detail hereinbelow.

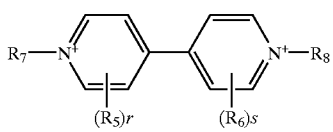

General formula (I-3)

wherein $R_5$ and $R_6$ represent a substituent group independently of each other, $R_7$ and $R_8$ represent an alkyl group, an alkenyl group, an aralkyl group, an aryl group or a heterocyclic group independently of each other, $R_5$ and $R_6$ may be bonded to form a ring, $R_5$ and $R_7$ may be bonded to form a ring, $R_6$ and $R_8$ may be bonded to form a ring, $R_7$ and $R_8$ may be bonded to form a ring, and r and s represent an integer from 0 to 4 independently of each other. When each of r and s represents an integer not smaller than 2, that is, when there are a plurality of $R_5$'s or $R_6$'s, they may be either equal to each other or different from each other.

The alkyl group represented by $R_7$ and $R_8$ is preferably a substituted or non-substituted, straight-chain, cyclic or branched, alkyl group having 1 to 18 (more preferably 1 to 8) carbon atoms. Such an alkyl group includes methyl, ethyl, n-propyl, isopropyl, n-butyl, isobutyl, t-butyl, n-hexyl, neopentyl, cyclohexyl, adamantyl, cyclopropyl and the like.

The substituent group for the alkyl group includes the following.

A substituted or non-substituted alkenyl group having 2 to 18 (preferably 2 to 8) carbon atoms such as vinyl;

a substituted or non-substituted alkynyl group having 2 to 18 (preferably 2 to 8) carbon atoms such as ethynyl;

a substituted or non-substituted aryl having 6 to 10 carbon atoms such as phenyl or naphthyl;

a halogen atom such as F, Cl, Br or the like;

a substituted or non-substituted alkoxy group having 1 to 18 (preferably 1 to 8) carbon atoms such as methoxy or ethoxy, a substituted or non-substituted aryloxy having 6 to 10 carbon atoms such as phenoxy or p-methoxyphenoxy, a substituted or non-substituted alkylthio group having 1 to 18 (preferably 1 to 8) carbon atoms such as methylthio or ethylthio;

a substituted or non-substituted arylthio group having 6 to 10 carbon atoms such as phenylthio;

a substituted or non-substituted acyl group having 2 to 18 (preferably 2 to 8) carbon atoms such as acetyl or propionyl;

a substituted or non-substituted alkylsulfonyl group or arylsulfonyl group having 1 to 18 (preferably 1 to 8) carbon atoms such as methanesufonyl or p-toluenesulfonyl;

a substituted or non-substituted acyloxy group having 2 to 18 (preferably 2 to 8) carbon atoms such as acetoxy or propionyloxy;

a substituted or non-substituted alkoxycarbonyl group having 2 to 18 (preferably 2 to 8) carbon atoms such as methoxycarbonyl or ethoxycarbonyl;

a substituted or non-substituted aryloxycarbonyl having 7 to 11 carbon atoms such as naphthoxycarbonyl;

a non-substituted amino group or a substituted amino group having 1 to 18 (preferably 1 to 8) carbon atoms such as methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, ethylcarbamoylamino, phenylcarbamoylamino, acetylamino, ethylcarbonylamino, ethylthiocarbamoylamino, cyclohexylcarbonylamino, benzoylamino, chloroacetylamino, or methylsulfonylamino;

a substituted or non-substituted carbamoyl group having 1 to 18 (preferably 1 to 8) carbon atoms such as non-substituted carbamoyl, methylcarbamoyl, ethylcarbamoyl, n-butylcarbamoyl, t-butylcarbamoyl, dimethylcarbamoyl, morpholinocarbamoyl or pyrrolidinocarbamoyl;

a non-substituted sulfamoyl or a substituted sulfamoyl having 1 to 18 (preferably 1 to 8) carbon atoms such as methylsulfamoyl or phenylsulfamoyl;

a cyano group;

a nitro group;

a carboxy group, a hydroxyl group; and a heterocyclic group such as oxazole ring, benzooxazole ring, thiazole ring, benzothiazole ring, imidazole ring, benzoimidazole ring, indolenyn ring, pyridine ring, piperidine ring, pyrrolidine ring, morpholyn ring, sulfolane ring, furan ring, thiophene ring, pyrazole ring, pyrrole ring, chroman ring or coumarin ring. The alkenyl group represented by $R_7$ or $R_8$ is preferably a substituted or non-substituted alkenyl group having 2 to 18 carbon atoms and more preferably a substituted or non-substituted alkenyl group having 2 to 8 carbon atoms such as vinyl, allyl, 1-propenyl or 1,3-butadienyl.

Preferable substituent groups for the alkenyl group include those listed above as the substituent groups for the alkyl group.

The alkynyl group represented by $R_7$ or $R_8$ is preferably a substituted or non-substituted alkynyl group having 2 to 18 carbon atoms and more preferably a substituted or non-substituted alkynyl group having 2 to 8 carbon atoms such as ethynyl or 2-propinyl.

Preferable substituent groups for the alkynyl group include those listed above as the substituent groups for the alkyl group.

The aralkyl group represented by $R_7$ or $R_8$ is preferably a substituted or non-substituted aralkyl group having 7 to 18 carbon atoms such as benzyl or methylbenzyl.

The aryl group represented by $R_7$ or $R_8$ is preferably a substituted or non-substituted aryl group having 6 to 18 carbon atoms such as phenyl or naphtyl.

Preferable substituent groups for the aryl group include those listed above as the substituent groups for the alkyl group and an alkyl group such as methyl or ethyl.

The heterocyclic group represented by $R_7$ or $R_8$ includes five- or six-membered saturated or unsaturated heterocycles such as oxazole ring, benzooxazole ring, thiazole ring, benzothiazole ring, imidazole ring, benzoimidazole ring, indolenyn ring, pyridine ring, piperidine ring, pyrrolidine ring, morpholyn ring, sulfolane ring, furan ring, thiophene ring, pyrazole ring, pyrrole ring, chroman ring and coumarin ring. The heterocyclic group may be substitiuted and in this case, preferable substituent groups include those listed above as the substituent groups for the alkyl group.

The substituent group represented by $R_5$ or $R_6$ includes those listed above as the substituent group for the alkyl group and alkyl groups such as methyl and ethyl.

Preferably the substituent group represented by $R_5$ or $R_6$ is a hydrogen atom or an alkyl group. A hydrogen atom is especially preferable.

It is especially preferred that the structure represented by the general formula (I-3) be a structure represented by the following general formula (I-4) or (I-5).

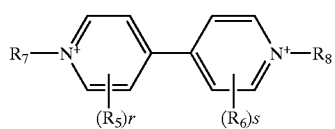

General formula (I-4)

wherein R5, R6, R7 and R8 are the same as those in the general formula (I), and r and s represent an integer from 0 to 4 independently of each other. When each of r and s represents an integer not smaller than 2, that is, when there are a plurality of $R^5$'s or $R_6$'s, they may be either equal to each other or different from each other.

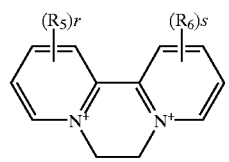

General formula (I-5)

wherein R5 and R6 are the same as those in the general formula (I). In the general formula (I-5), it is preferred that $R_5$ and $R_6$ be bonded to each other to form a carbon ring or a heterocycle, and it is further preferred that $R_5$ and $R_6$ respectively form a fused aromatic ring together with a pyridine ring bonded thereto. r and s represent an integer from 0 to 4 independently of each other and when each of r and s represents an integer not smaller than 2, that is, when there are a plurality of $R_5$'s or $R_6$'s, they may be either equal to each other or different from each other.

Specific examples of the part represented by the general formula (I-3) in the general formula (I) will be listed below.

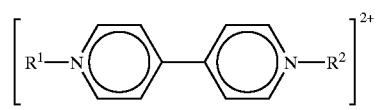

wherein specific examples of $R^1$ and $R^2$ are as follows.

| No. | Ra | Rb |
|---|---|---|
| B-1 | $CH_3$ | $CH_3$ |
| B-2 | $C_2H_5$ | $C_2H_5$ |
| B-3 | n-$C_3H_7$ | n-$C_3H_7$ |
| B-4 | n-$C_4H_9$ | n-$C_4H_9$ |
| B-5 | iso-$C_4H_9$ | iso-$C_4H_9$ |
| B-6 | n-$C_6H_{13}$ | n-$C_6H_{13}$ |
| B-7 | —$C(CH_3)_3$ | —$C(CH_3)_3$ |
| B-8 | —$CH_2CH_2C(CH_3)_3$ | —$CH_2CH_2C(CH_3)_3$ |
| B-9 | $H_2C=CH$ | $H_2C=CH$ |
| B-10 | $NCCH_2$ | $NCCH_2$ |
| B-11 | $EtO_2C—CH_2$ | $EtO_2C—CH_2$ |
| B-12 | $HOCH_2CH_2$ | $HOCH_2CH_2$ |
| B-13 | $EtOCH_2CH_2$ | $EtOCH_2CH_2$ |
| B-14 | cyclohexyl | cyclohexyl |
| B-15 | $CH_3$ | $CH_3$ |
| B-16 | $CH_3COCH_2$ | $CH_3COCH_2$ |
| B-17 | adamantyl | adamantyl |
| B-18 | $CF_3CH_2$ | $CF_3CH_2$ |
| B-19 | Ph | Ph |
| B-20 | $H_3C$—C$_6H_4$— | $H_3C$—C$_6H_4$— |
| B-21 | $H_3CO$—C$_6H_4$— | $H_3CO$—C$_6H_4$— |

-continued
B-22 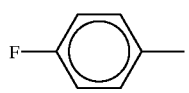 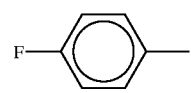
B-23 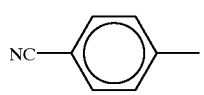 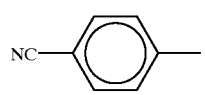
B-24 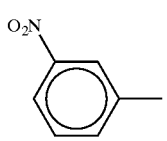 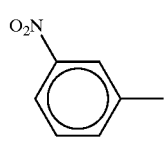
B-25 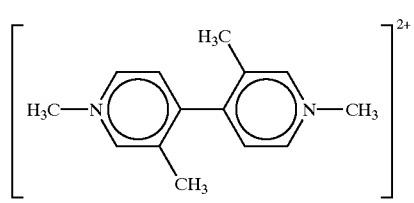
B-26 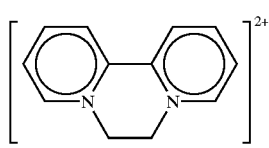
B-27 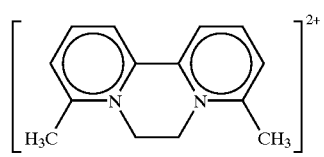
B-28 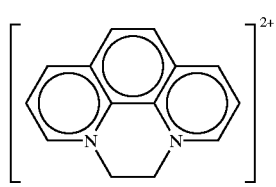
B-29 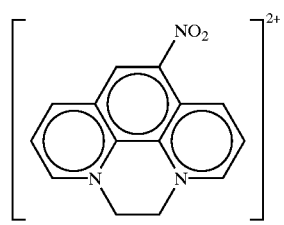
B-30 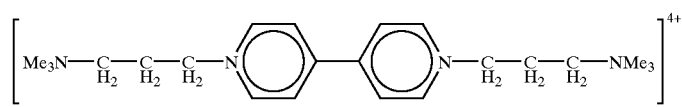
B-31 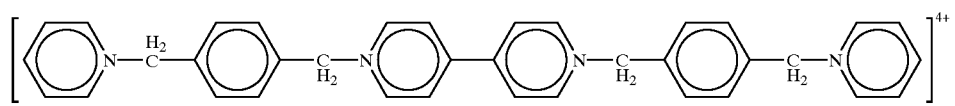

-continued
B-32 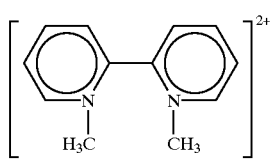
B-33 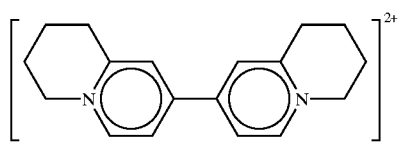
B-34 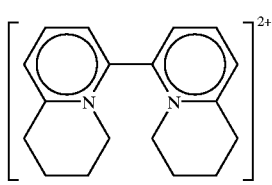
B-35 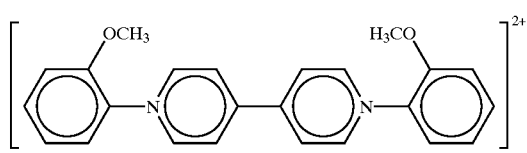
B-36 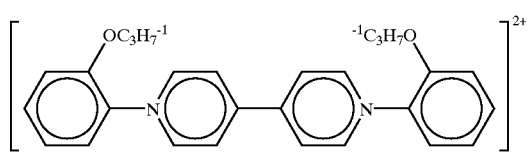
B-37 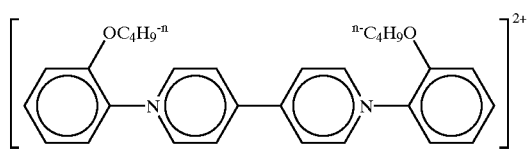
B-38 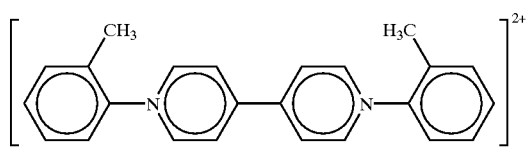
B-39 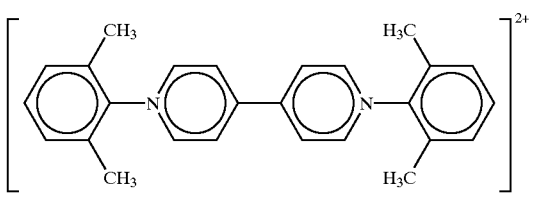
B-40 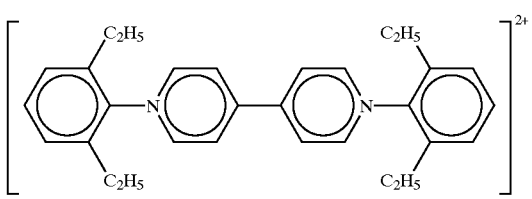

-continued
B-41 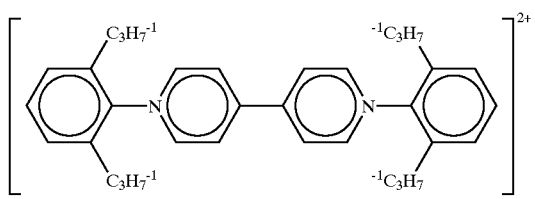
B-42 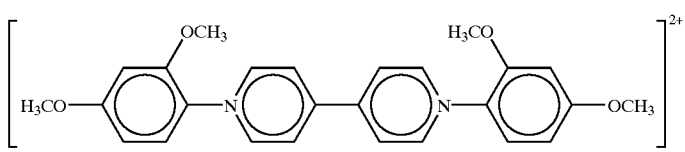
B-43 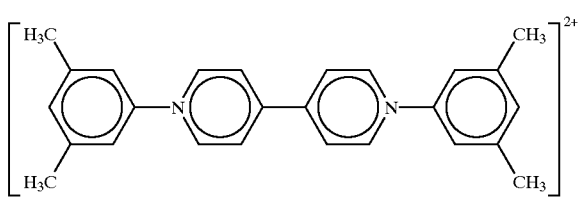
B-44 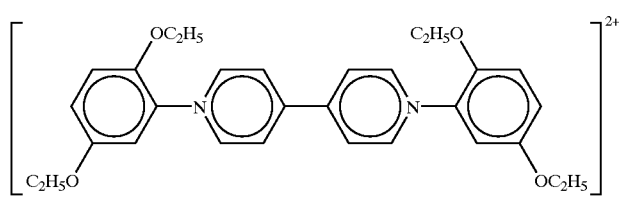
B-45 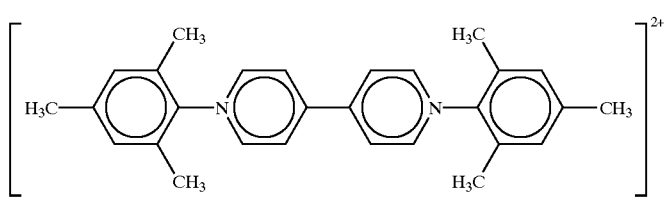
B-46 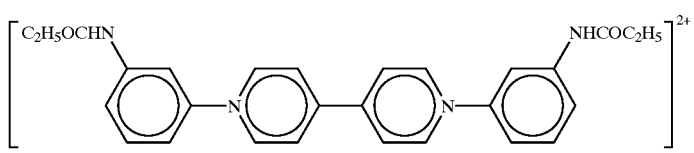
B-47 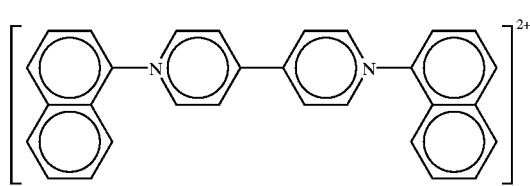
B-48 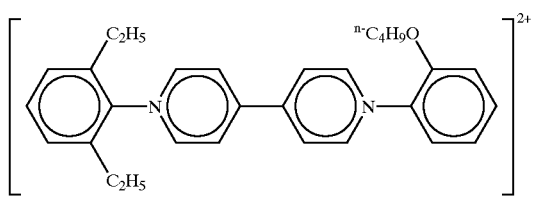

-continued

B-49 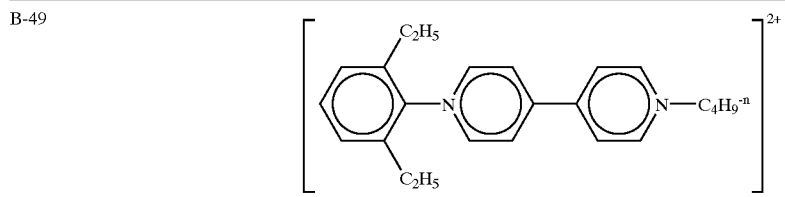

B-50 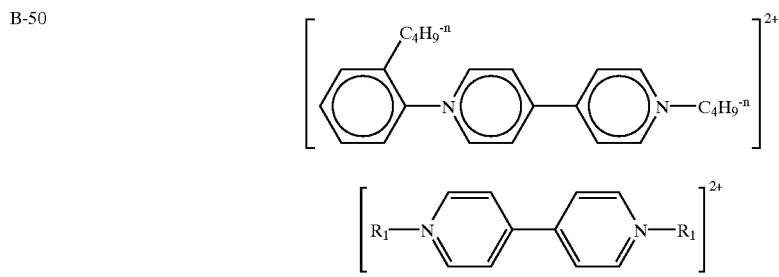

wherein specific examples of $R^1$ are as follows.

| No. | $R^1$ |
|---|---|
| B-51 | iso-$C_5H_{11}$ |
| B-52 | —$CH_3CH_2CH_2CH_2CHCH$ $\|$ $C_2H_5$ |
| B-53 | $H_3C$—CH—Ph |
| B-54 | $PhCH_2CH_2$ |
| B-55 | 1-naphthylmethyl (–$CH_2$) |
| B-56 | 2-methyl-1-naphthylmethyl |
| B-57 | 2-naphthylmethyl |
| B-58 | 2-methylbenzyl |

| No. | $R^1$ |
|---|---|
| B-59 | 2-phenylbenzyl |
| B-60 | $H_2C{=}CH{-}CH_2$ |
| B-61 | $(H_3C)_2C{=}CH{-}CH_2$ |
| B-62 | $H_2C{=}C(CH_3){-}CH_2$ |
| B-63 | $Ph_3C$ |
| B-64 | benzyl (Ph–$CH_2$) |
| B-65 | $HC{\equiv}C{-}CH_2$ |
| B-66 | $CH_3SO_2CH_2CH_2$ |
| B-67 | 3-methylpyridazinyl |
| B-68 | methyl-triazinyl |

$$\left[ R_1{-}N{\bigcirc}{-}{\bigcirc}N{-}R_2 \right]^{2+}$$

wherein specific examples of $R_1$ and $R_2$ are as follows.

| No. | $R_1$ | $R_2$ |
|---|---|---|
| B-69 | H₂N-triazine-NH₂ | H₂N-triazine-NH₂ |
| B-70 | 2-pyrimidinyl | 2-pyrimidinyl |
| B-71 | furfuryl (O-CH₂) | furfuryl (O-CH₂) |
| B-72 | 2,4-dinitrophenyl-methyl | 2,4-dinitrophenyl-methyl |
| B-73 | 2-benzothiazolyl | 2-benzothiazolyl |
| B-74 | 2-pyridyl | 2-pyridyl |
| B-75 | iso-$C_4H_9$ | $PhCH_2$ |

Specific examples of preferred compounds for forming the photo-functional film 13 are listed in the following table 1. In table 1, each compound is represented by a combination of the anion part $[DYE^+]\text{-}(SO3^-)_{n+1}$ and the cation part represented by the general formula (I-3). For example, No.1 compound in table 1 represented by a combination of (A-1) and (B-5) has the following structure.

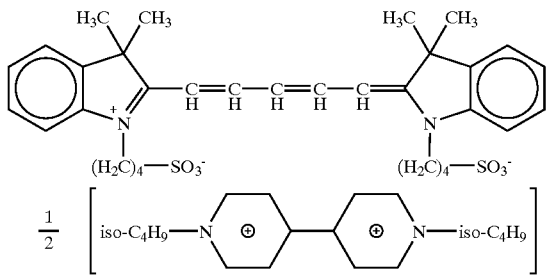

TABLE 1

| compound No. | anion | cation |
|---|---|---|
| 1 | A-1 | B-5 |
| 2 | A-1 | B-40 |
| 3 | A-1 | B-54 |
| 4 | A-2 | B-5 |
| 5 | A-2 | B-40 |

TABLE 1-continued

| compound No. | anion | cation |
|---|---|---|
| 6 | A-2 | B-54 |
| 7 | A-3 | B-5 |
| 8 | A-3 | B-40 |
| 9 | A-3 | B-74 |
| 10 | A-4 | B-5 |
| 11 | A-4 | B-74 |
| 12 | A-4 | B-54 |
| 13 | A-5 | B-5 |
| 14 | A-5 | B-40 |
| 15 | A-5 | B-74 |
| 16 | A-6 | B-5 |
| 17 | A-6 | B-40 |
| 18 | A-6 | B-54 |
| 19 | A-8 | B-5 |
| 20 | A-8 | B-40 |
| 21 | A-10 | B-40 |
| 22 | A-10 | B-54 |
| 23 | A-12 | B-5 |
| 24 | A-12 | B-40 |
| 25 | A-12 | B-74 |
| 26 | A-14 | B-40 |
| 27 | A-14 | B-54 |
| 28 | A-16 | B-74 |
| 29 | A-16 | B-54 |
| 30 | A-17 | B-5 |
| 31 | A-17 | B-40 |
| 32 | A-18 | B-40 |
| 33 | A-18 | B-54 |
| 34 | A-19 | B-40 |
| 35 | A-19 | B-54 |
| 36 | A-24 | B-40 |
| 37 | A-24 | B-74 |
| 38 | A-26 | B-40 |
| 39 | A-26 | B-70 |
| 40 | A-28 | B-5 |
| 41 | A-28 | B-54 |
| 42 | A-29 | B-40 |
| 43 | A-29 | B-54 |
| 44 | A-30 | B-5 |
| 45 | A-30 | B-74 |
| 46 | A-31 | B-40 |
| 47 | A-31 | B-74 |
| 48 | A-33 | B-40 |
| 49 | A-33 | B-54 |
| 50 | A-33 | B-74 |

The photo-functional film may be formed of one or more of the compounds represented by the general formula (I).

The compounds represented by the general formula (I) can be easily synthesized in light of the following papers. F. M. Hamer, "The Cyanine Dyes and Related Compounds 5", (Interscience Publishers, N.Y., 1964), pp. 54~; Nikolai Tyutyulkov, Jurgen Fabian, Achim Ulehlhorn, Fritz Dietz, Alia Tadjer, "Polymethine Dyes", (St. Kliment Ohridski University Press, Sophia), pp. 23 to 38; D. M. Sturmer, "Heterocyclic Compounds-Special topics in heterocyclic chemistry", chapter 18, section 14, pp.482 to 515, John Wiley & Sons, New York London, 1977; and "Rodd's Chemistry of Carbon Compounds", (2nd Ed. vol. IV, part B, 1977, chapter 15, pp. 369 to 422, (2nd. Ed. vol. IV, part B, 1985, chapter 15, pp. 267 to 296, Elsvier Science Public Company Inc., New York.

More specifically, the compounds represented by the general formula (I) can be obtained by mixing, in suitable solvent such as methanol, water or a mixture of methanol and water, salt represented by $[DYE^+]\text{-}(SO_3^-)_{n+1}(M^+)_n$ (wherein M represents a cation such as a sodium ion, a potassium ion, an ammonium ion, a pyridinium ion, a triethylammonium ion, an N-ethylpyridinium ion or the like) and salt obtained by combining a cation represented by the general formula (I-3) with an anion such as Cl-, Br-, I- or paratoluene sulfonate, and separating out a reaction product as crystals.

For example, No. 41 compound in the above table 1 can be obtained in the following manner. That is, a methanol solution of N-ethylpyridinium (A-28) salt is mixed with a methanol solution of bromide of (B-54) and deposited crystals are separated out. Then by washing the crystals with methanol and drying the crystals, No. 41 compound is obtained as discolored powder whose melting point is in the range of 213 to 217° C.

Further, a photo-functional film 13 formed of a dye compound represented by the following general formula (II-1) and/or a dye compound represented by the following general formula (II-2) may be suitably employed.

General formula (II-1)

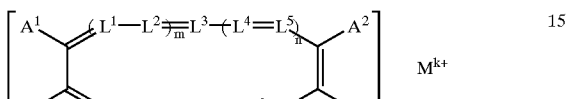

General formula (II-2)

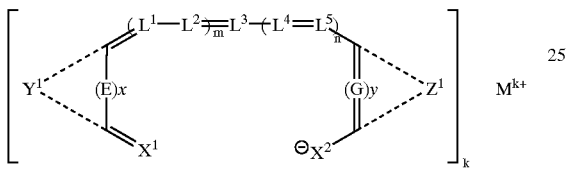

wherein $A^1, A^2, B^1$ and $B^2$ respectively represent substituent groups, $L^1, L^2, L^3, L^4$ and $L^5$ respectively represents methyne groups, $X^1$ represents =O, =NR, or =C(CN)$_2$ (R representing a substituent group), $X^2$ represents —O, —NR or —C(CN)$_2$ (R representing a substituent group), and m and n respectively represent integers in the range of 0 to 2. Y1 and E respectively represent an atom or a group of atoms required to form a carbon ring or a heterocycle, Z1 and G respectively represent an atom or a group of atoms required to form a carbon ring or a heterocycle, x represents 0 or 1, and y represents 0 or 1. $Mk^+$ represents an onium ion and k represents a number of the charge.

The dye compounds comprise an anion part (dye component) and a cation part (onium component).

The anion part will be described first.

The substituent groups represented by $A^1, A^2, B^1$ and $B^2$ include the following.

A substituted or non-substituted, straight-chain, cyclic or branched, alkyl group having 1 to 18 (more preferably 1 to 8) carbon atoms such as methyl, ethyl, propyl, isopropyl, n-butyl, isobutyl, sec-butyl, t-butyl, cyclohexyl, methoxyethyl, ethoxycarbonylethyl, cyanoethyl, diethylaminoethyl, hydroxyethyl, chloroethyl, acetoxyethyl, trifluoromethyl and the like;

a substituted or non-substituted aralkyl group having 7 to 18 (preferably 7 to 12) carbon atoms such as benzyl and methylbenzyl;

an alkenyl group having 2 to 18 (preferably 2 to 8) carbon atoms such as vinyl;

an alkynyl group having 2 to 18 (preferably 2 to 8) carbon atoms such as ethynyl;

a substituted or non-substituted aryl group having 6 to 18 (preferably 6 to 10) carbon atoms such as phenyl, 4-methylphenyl, 4-methoxyphenyl and 3,5-dicarboxyphenyl;

a substituted or non-substituted acyl group having 2 to 18 (preferably 2 to 8) carbon atoms such as acetyl, propionyl, butanoyl, and chloroacetyl;

a substituted or non-substituted alkylsulfonyl group or arylsulfonyl group having 1 to 18 (preferably 1 to 8) carbon atoms such as methanesufonyl and p-toluenesulfonyl;

an alkylsulfinyl group having 1 to 18 (preferably 1 to 8) carbon atoms such as methanesutinyl, ethanesufinyl, and octanesulfinyl;

an alkoxycarbonyl group having 2 to 18 (preferably 2 to 8) carbon atoms such as methoxycarbonyl and ethoxycarbonyl;

an aryloxycarbonyl having 7 to 18 (preferably 7 to 12) carbon atoms such as phenoxycarbonyl, 4-methylphenoxycarbonyl, and 4-methoxyphenylcarbonyl;

a substituted or non-substituted alkoxy group having 1 to 18 (preferably 1 to 8) carbon atoms such as methoxy, ethoxy, n-butoxy and methoxyethoxy;

a substituted or non-substituted aryloxy having 6 to 18 (preferably 6 to 10) carbon atoms such as phenoxy and 4-methoxyphenoxy;

an alkylthio group having 1 to 18 (preferably 1 to 8) carbon atoms such as methylthio and ethylthio;

an arylthio group having 6 to 10 carbon atoms such as phenylthio;

a substituted or non-substituted acyloxy group having 2 to 18 (preferably 2 to 8) carbon atoms such as acetoxy, ethylcarbonyloxy, cyclohexylcarbonyloxy, benzoyloxy and chloroacetyloxy;

a substituted or non-substituted sulfonyloxy having 1 to 18 (preferably 1 to 8) carbon atoms such as methanesulfonyloxy;

a substituted or non-substituted carbamoyloxy group having 2 to 18 (preferably 2 to 8) carbon atoms such as methylcarbamoyloxy and diethylcarbamoyloxy;

a non-substituted amino group or a substituted amino group having 0 to 18 (preferably 0 to 8) carbon atoms such as non-substitited amino, methylamino, dimethylamino, diethylamino, anilino, methoxyphenylamino, chlorophenylamino, moripholino, piperidino, pyrrolizino, pyridylamino, methoxycarbonylamino, n-butoxycarbonylamino, phenoxycarbonylamino, methylcarbamoylamino, phenylcarbamoylamino, ethylcarbamoylamino, methylsulfamoylamino, pheylsulfamoylamino, acetylamino, ethylcarbonylamino, ethylthiocarbamoylamino, cyclohexylcarbonylamino, benzoylamino, chloroacetylamino, methylsulfonylamino and benzenesulfonylamino;

a substituted or non-substituted carbamoyl group having 1 to 18 (preferably 1 to 8) carbon atoms such as non-substituted carbamoyl, methylcarbamoyl, ethylcarbamoyl, n-butylcarbamoyl, t-butylcarbamoyl, dimethylcarbamoyl, morpholinocarbamoyl and pyrrolidinocarbamoyl;

a substituted or non-substituted sulfamoyl group having 0 to 18 (preferably 0 to 8) carbon atoms such as non-substituted sulfamoyl, methylsulfamoyl and phenylsulfamoyl;

a halogen atom such as F, Cl and Br;

a hydroxyl group, a cyano group;

a nitro group;

a carboxyl group: and a heterocyclic group such as oxazole, benzooxazole, thiazole, benzothiazole, imidazole, benzoimidazole, indolenyn, pyridine, sulfolane, furan, thiophene, pyrazole, pyrrole, chroman and coumarin.

The substituent group represented by $A^1$ or $A_2$ is preferably not smaller 0.2 in Hammette substituent constant σp. Hammette substituent constant is described, for instance, in Chem. Rev. 91,165 (1991). Especially preferable substituent groups include a cyano group, a nitro group, an alkoxycarbonyl group, an acyl group, a carbamoyl group, a sulfamoyl group, an alkylsulfonyl group, and an arylsulfonyl group.

It is preferred that the substituent group represented by $B^1$ or $B^2$ be an alkyl group, an aryl group, an alkoxy group or an amino group.

Since $[-C(=L^1)-(E)_x-C(=X^1)-]$ (will be referred to as "W1", hereinbelow, for the purpose of simplicity) bonded to $Y^1$ and $[-C(-L^5)=(G)_y=C(-X^2)-]$ (will be referred to as "W2", hereinbelow, for the purpose of simplicity) bonded to $Z^1$ are in a conjugated state, a carbon ring or a heterocycle formed by $Y^1$ and W1 and a carbon ring or a heterocycle formed by $Z^1$ and W2 may be considered to respectively form resonance structures.

The carbon ring or the heterocycle formed by $Y^1$ and W1 or $Z^1$ and W2 is preferably a four- to seven-membered ring, more preferably five-or six-membered ring. The ring may form a fused ring with another four- to seven-membered ring. Further the ring may have a substituent group. The substituent group includes those listed above as the substituent groups represented by $A^1$, $A^2$, $B^1$ and $B^2$. As heteroatom forming the heterocycle, B, N, O, S, Se and Te are preferred. Among them, N, O and S are especially preferred.

x and y are 0 or 1 independently of each other and preferably are both 0.

$X^1$ represents =O, =NR or =C(CN)$_2$ and $X^2$ represents —O, —NR or —C(CN)$_2$. R represents a substituent group which includes those listed above as the substituent groups represented by $A^1$, $A^2$, $B^1$ and $B^2$. R represents preferably an aryl group and more preferably phenyl.

It is preferred that $X^1$ represents =O and $X^2$ represents =O.

The carbon ring formed by $Y^1$ and W1 or $Z^1$ and W2 includes the following.

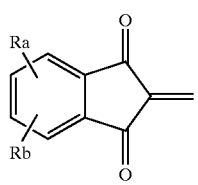

A-1

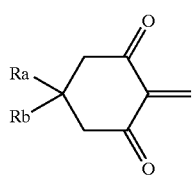

A-2

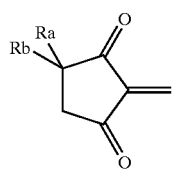

A-3

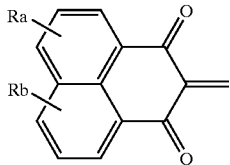

A-4 wherein Ra and Rb represent a hydrogen atom or a substituent group independently of each other.

Carbon rings represented by A-1 and A-4 are preferred.

The heterocycle formed by $Y^1$ and W1 or $Z^1$ and W2 includes the following, wherein Ra, Rb and Rc represent a hydrogen atom or a substituent group independently of each other.

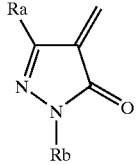

A-5

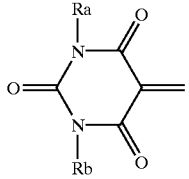

A-6

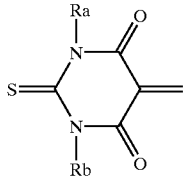

A-7

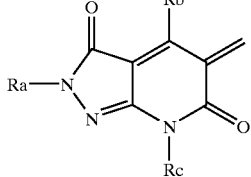

A-8

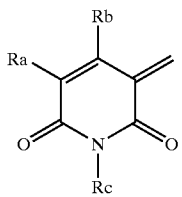

A-9

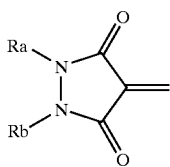

A-10

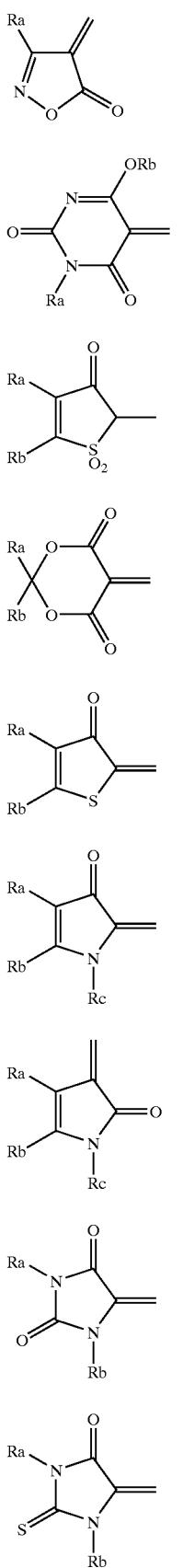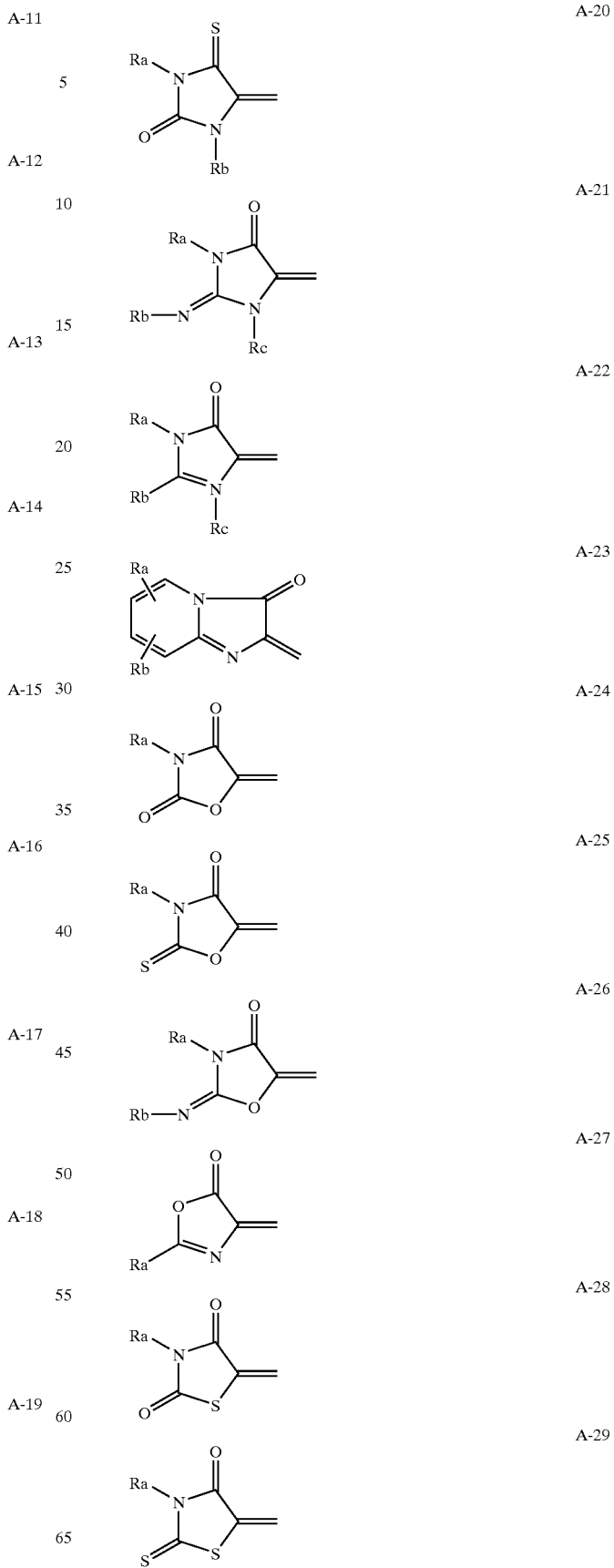

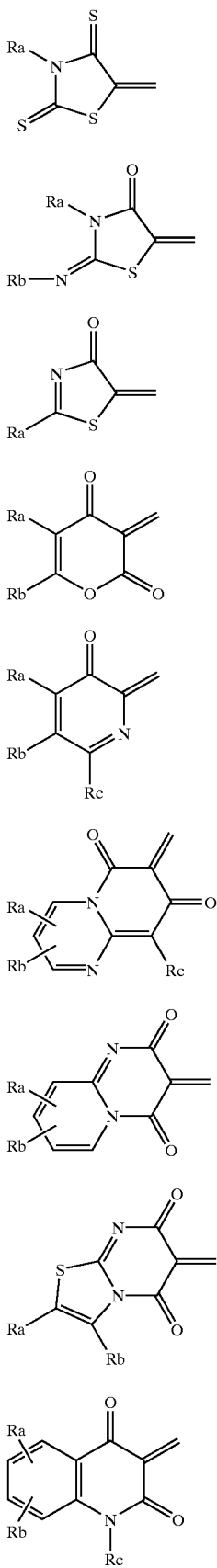

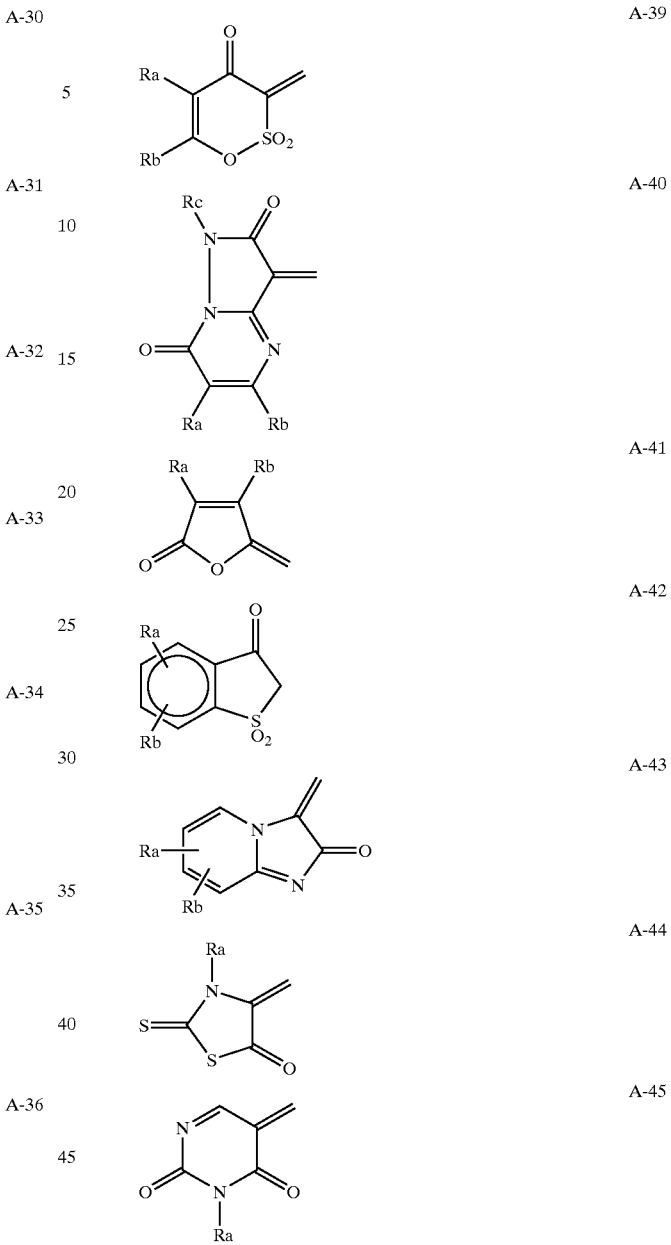

The heterocycles represented by A-5, A-6 and A-7 are preferred.

The substituent groups represented by Ra, Rb and Rc are the same as those listed above as the substituent groups represented by $A^1$, $A^2$, $B^1$ and $B^2$.

The substituent groups represented by Ra, Rb and Rc may be bonded to form a carbon ring or a heterocycle.

The methyne groups represented by $L^1$, $L^2$, $L^3$, $L^4$ and $L^5$ are methyne groups which may have substituent groups independently of each other, which are same as those listed above as the substituent groups represented by $A^1$, $A^2$, $B^1$ and $B^2$. An alkyl group, an aralkyl group, an aryl group, an alkoxy group, an aryloxy group, an alkylthio group, an arylthio group, a halogen atom, an amino group, a carbamoyl group and a heterocycle are preferred. Further the substituent groups may be bonded to each other to form a five- to seven-membered ring such as a cyclopentene ring, a 1-dimethylaminocyclopentene, a 1-diphenylaminocyclopentene ring, a cyclohexene ring, a 1-chlorocyclohexene ring, an isophorone ring, a 1-morphorinocyclopentene ring and a cycloheptene ring.

It is preferred that m and n be both 1, or one of m and n be 0 with the other being 2.

The cation part will be described in detail now.

As the onium ion represented by $M^{k+}$, those represented by the following general formulae (II-3) and (II-4) are most preferable.

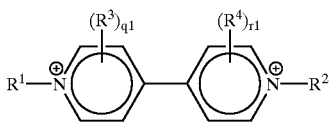

General formula (II-3)

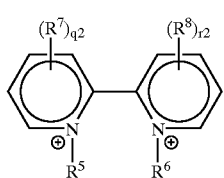

General formula (II-4)

wherein $R^1$, $R^2$, $R^5$ and $R^6$ represent independently of each other an alkyl group, an alkenyl group, an alkynyl group or an aryl group and $R^3$, $R^4$, $R^7$ and $R^8$ represent independently of each other a substituent group or a substituent atom. $R^1$ and $R^6$ may be bonded to form a ring and so may $R^3$ and $R^4$, $R^5$ and $R^6$, $R^7$ and $R^8$, $R^1$ and $R^3$, $R^2$ and $R^4$, $R^5$ and $R^7$, and $R^6$ and $R^8$. q1, q2, r1 and r2 respectively represent an integer from 0 to 4. When each of q1, q2, r1 and r2 represents an integer not smaller than 2, that is, when there are a plurality of $R^3$'s, $R^4$'s, $R^7$'s or $R^8$'s, they may be either equal to each other or different from each other.

It is preferred that the alkyl groups represented by $R^1$, $R^2$, $R^5$ and $R^6$ be a substituted or non-substituted alkyl group having 1 to 18 (more preferably 1 to 8) carbon atoms such as methyl, ethyl, n-propyl, isopropyl, n-butyl, isobutyl or n-hexyl.

The substituent group for the alkyl group includes the following.

A halogen atom such as F, Cl, Br and the like;
a substituted or non-substituted alkoxy group having 1 to 18 (preferably 1 to 8) carbon atoms such as methoxy and ethoxy,
a substituted or non-substituted aryloxy having 6 to 10 carbon atoms such as phenoxy and p-methoxyphenoxy,
a substituted or non-substituted alkylthio group having 1 to 18 (preferably 1 to 8) carbon atoms such as methylthio and ethylthio;
a substituted or non-substituted arylthio group having 6 to 10 carbon atoms such as phenylthio;
a substituted or non-substituted acyl group having 2 to 18 (preferably 2 to 8) carbon atoms such as acetyl and propionyl;
a substituted or non-substituted alkylsulfonyl group or arylsulfonyl group having 1 to 18 (preferably 1 to 8) carbon atoms such as methanesufonyl and p-toluenesulfonyl;
a substituted or non-substituted acyloxy group having 2 to 18 (preferably 2 to 8) carbon atoms such as acetoxy or propionyloxy;
a substituted or non-substituted alkoxycarbonyl group having 2 to 18 (preferably 2 to 8) carbon atoms such as methoxycarbonyl and ethoxycarbonyl;
a substituted or non-substituted alkenyl group having 2 to 18 (preferably 2 to 8) carbon atoms such as vinyl;
a substituted or non-substituted alkynyl group having 2 to 18 (preferably 2 to 8) carbon atoms such as ethynyl;
a substituted or non-substituted aryl having 6 to 10 carbon atoms such as phenyl and naphthyl;
a substituted or non-substituted aryloxycarbonyl having 7 to 11 carbon atoms such as naphthoxycarbonyl;
a substituted or non-substituted amino group having 0 to 18 (preferably 0 to 8) carbon atoms such as non-substituted amino, methylamino, dimethylamino, diethylamino, anilino, methoxyphenylamino, chlorophenylamino, moripholino, piperidino, pyrrolizino, pyridylamino, methoxycarbonylamino, n-butoxycarbonylamino, phenoxycarbonylamino, methylcarbamoylamino, ethylcarbamoylamino, phenylcarbamoylamino, acetylamino, ethylcarbonylamino, ethylthiocarbamoylamino, cyclohexylcarbonylamino, benzoylamino, chloroacetylamino, and methylsulfonylamino;
a substituted or non-substituted carbamoyl group having 1 to 18 (preferably 1 to 8) carbon atoms such as non-substituted carbamoyl, methylcarbamoyl, ethylcarbamoyl, n-butylcarbamoyl, t-butylcarbamoyl, dimethylcarbamoyl, morpholinocarbamoyl and pyrrolidinocarbamoyl;
a substituted or non-substituted sulfamoyl group having 0 to 18 (preferably 0 to 8) carbon atoms such as non-substituted sulfamoyl, methylsulfamoyl and phenylsulfamoyl;
a cyano group;
a nitro group;
a carboxy group,
a hydroxyl group; and
a heterocyclic group such as oxazole, benzooxazole, thiazole, benzothiazole, imidazole, benzoimidazole, indolenyn, pyridine, sulfolane, furan, thiophene, pyrazole, pyrrole, chroman and coumarin.

It is preferred that the alkenyl groups represented by $R^1$, $R^2$, $R^5$ and $R^6$ be a substituted or non-substituted alkenyl group having 2 to 18 (more preferably 2 to 8) carbon atoms such as vinyl, allyl, 1-propenyl and 1,3-butadienyl.

Preferable substituent groups for the alkenyl group include those listed above as the substituent groups for the alkyl group.

The alkynyl group represented by $R^1$, $R^2$, $R^5$ and $R^6$ is preferably a substituted or non-substituted alkynyl group having 2 to 18 carbon atoms and more preferably a substituted or non-substituted alkynyl group having 2 to 8 carbon atoms such as ethynyl or 2-propinyl.

Preferable substituent groups for the alkynyl group include those listed above as the substituent groups for the alkyl group.

The aryl group represented by $R^1$, $R^2$, $R^5$ and $R^6$ is preferably a substituted or non-substituted aryl group having 6 to 18 carbon atoms such as phenyl or naphtyl.

Preferable substituent groups for the aryl group include those listed above as the substituent groups for the alkyl group and an alkyl group such as methyl or ethyl.

The substituent groups represented by $R^3$, $R^4$, $R^7$ and $R^8$ are the same as those listed above as the substituent groups represented by $A^1$, $A^2$, $B^1$ and $B^2$.

Preferably the substituent groups represented by $R^3$, $R^4$, $R^7$ and $R^8$ are hydrogen atoms or alkyl groups, the former being preferred.

It is preferred that $R^5$ and $R^6$ be bonded to each other to form a ring, which is more preferably a five- to seven ring and most preferably a six-membered ring.

Further it is also preferred that $R^3$ and $R^4$ as well as $R^7$ and $R^8$ be bonded to each other to form a carbon ring or a heterocycle, the former being more preferred. It is further preferred that $R^3$, $R^4$, $R^7$ and $R^8$ respectively form a fused aromatic ring together with a pyridine ring bonded thereto.

Specific examples of the anion part and the cation part of the dye compounds represented by the general formulae (II-1) and (II-2) are as follows.

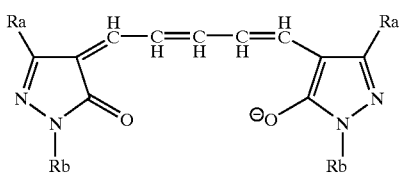

wherein specific examples of Ra and Rb are as follows.

| No. | Ra | Rb |
|---|---|---|
| B-1 | COOEt | H |
| B-2 | COOEt | CH₃ |
| B-3 | COOEt | 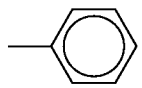 |
| B-4 | COOEt | —CH₂CH₂OH |
| B-5 | COOCH₃ |  |
| B-6 | COOEt | 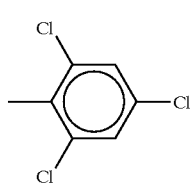 |
| B-7 | COOEt | CONHC₄H₉(n) |
| B-8 | COOEt | CONHPh |
| B-9 | CN |  |
| B-10 | COCH₃ | 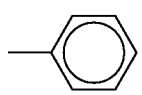 |
| B-11 | CF₃ | 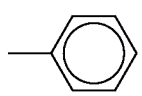 |
| B-12 | CONHCH₃ | CH₃ |
| B-13 | CONHCH₃ | 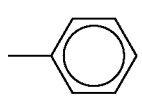 |

-continued

| No. | Ra | Rb |
|---|---|---|
| B-14 | CONHC₄H₉(n) | 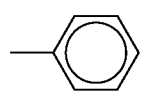 |
| B-15 | 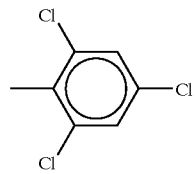 | 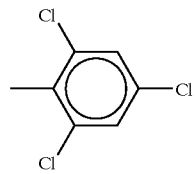 |
| B-16 | CONHCH₃ | 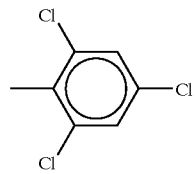 |

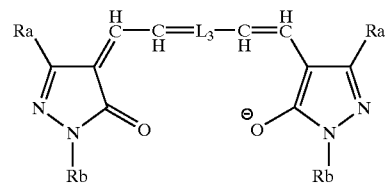

wherein specific examples of Ra, Rb and L₃ are as follows.

| No. | Ra | Rb | L₃ |
|---|---|---|---|
| B-17 | CONHC₄H₉(n) | CONHC₄H₉(n) | CH |
| B-18 | 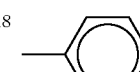 | H | CH |
| B-19 | 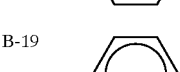 | CH₃ | CH |
| B-20 | 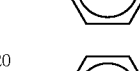 | 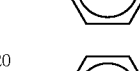 | CH |
| B-21 | 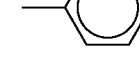 | 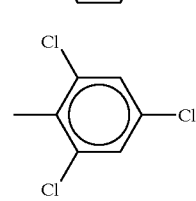 | CH |
| B-22 | 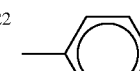 | 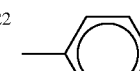 | CH |
| B-23 | 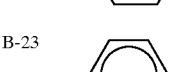 | 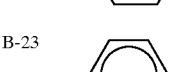 | CH |

-continued
| No. | Ra | Rb | L₃ |
|---|---|---|---|
| B-24 |  (—C₆H₄—CH₃) | 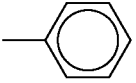 (Ph) | CH |
| B-25 | 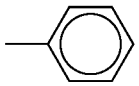 (Ph) | 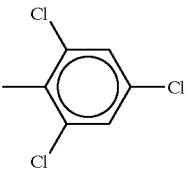 (2,4,6-trichlorophenyl) | C(CH₃) |
| B-26 | 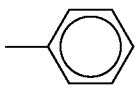 (Ph) | CONHC₄H₉(n) | CH |
-continued
| No. | Ra | Rb | L₃ |
|---|---|---|---|
| B-27 | 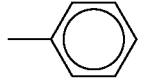 (Ph) | 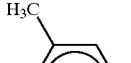 (H₃C—C₆H₄—CH₃) | CH |
| B-28 | COOEt | CH₂Ph | CH |
| B-29 | —SO₂CH₃ | 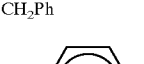 (Ph) | CH |
wherein specific examples of Ra, Rb, L₃, m and n are as follows.
| No. | Ra | Rb | L₃ | m | n |
|---|---|---|---|---|---|
| B-30 | —NHSO₂CH₃ | 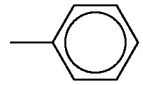 | CH | 1 | 1 |
| B-31 | HO | 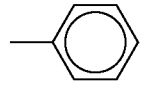 | C(CONH₂) | 1 | 1 |
| B-32 | CH₃ | 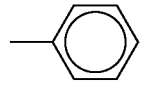 | C(Ph) | 1 | 1 |
| B-33 | CH₃ | 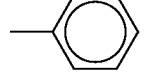 | C(CH₂Ph) | 1 | 1 |
| B-34 | CH₃ | 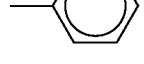 | 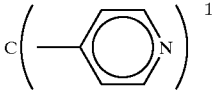 (C-pyridyl) | 1 | 1 |
| B-35 | —OEt | 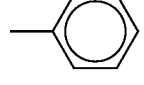 | CH | 1 | 1 |
| B-36 | —NHCOCH₃ |  | CH | 1 | 1 |

-continued

| No. | Ra | Rb | L₃ | m | n |
|---|---|---|---|---|---|
| B-37 | —NHCOPh | (phenyl) | CH | 1 | 1 |
| B-38 | —NHCOPh | —CONHC₄H₉(n) | CH | 1 | 1 |
| B-39 | —NHCOPh | —CONHPh | CH | 1 | 1 |
| B-40 | —COOEt | 2,4,6-trichlorophenyl | CH | 1 | 0 |
| B-41 | —CN | 2,4,6-trichlorophenyl | CH | 1 | 0 |
| B-42 | —CF₃ | (phenyl) | CH | 1 | 0 |
| B-43 | —CONHC₄H₉(n) | (phenyl) | CH | 1 | 0 |
| B-44 | —NHCOC₄H₉(n) | (phenyl) | CH | 1 | 0 |

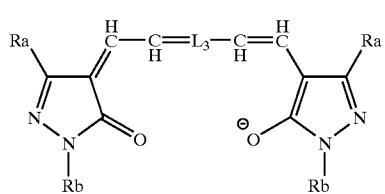

wherein specific examples of Ra, Rb and L₃ are as follows.

| No. | Ra | Rb | L₃ |
|---|---|---|---|
| B-45 | 3-NHAc-6-Cl-anilino (via NH) | 2,4,6-trichlorophenyl | CH |
| B-46 | —NH₂ | (phenyl) | CH |
| B-47 | —NHCONHC₄H₉(n) | (phenyl) | CH |
| B-48 | —NHCOOC₄H₉(n) | (phenyl) | CH |
| B-49 | 3,5-dichlorophenyl | CH₂Ph | CH |
| B-50 | —NHCO-(biphenyl) | | C(Ph) |

-continued

| No. | Ra | Rb | L₃ |
|---|---|---|---|
| B-51 | (N-phthalimidyl) | (phenyl) | CH |
| B-52 | (N-phthalimidyl) | 2,4,6-trichlorophenyl | CH |
| B-53 | —CN | 2,4,6-trichlorophenyl | CH |
| B-54 | —CF₃ | 2,4,6-trichlorophenyl | CH |

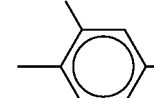

wherein specific examples of Ra, Rb and L are as follows.

| No. | Ra | Rb | L |
|---|---|---|---|
| B-55 | —COOEt | 2,4,6-trichlorophenyl | C(CH₃) |
| B-56 | —CN | 2,4,6-trichlorophenyl | C(CH₃) |
| B-57 | —CF₃ | 2,4,6-trichlorophenyl | C(CH₃) |
| B-58 | —COCH₃ | 2,4,6-trichlorophenyl | C(CH₃) |
| B-59 | —COOEt | 2-methylphenyl | C(CH₃) |
| B-60 | —CN | 2-methylphenyl | C(CH₃) |
| B-61 | —COOEt | 2,4,6-trichlorophenyl | C(Br) |
| B-62 | —COOEt | 2,4,6-trichlorophenyl | C(Cl) |
| B-63 | —CN | 2,4,6-trichlorophenyl | C(Br) | wherein specific examples of Ra, Rb and L are as follows.

| No. | Ra | Rb | L |
|---|---|---|---|
| B-64 | —CN | 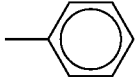 | C(Br) |
| B-65 | —COOEt | 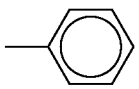 | C(Cl) |
| B-66 | —COOEt | 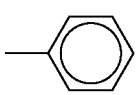 | CH |
| B-67 | —CONHCH$_3$ | 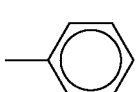 | CH |
| B-68 | —NHCOCH$_3$ |  | CH |
| B-69 | —CH$_3$ |  | CH |
| B-70 | —NH$_2$ |  | CH | wherein specific examples of Ra, Rb, X and L are as follows.

| No. | Ra | Rb | X | L |
|---|---|---|---|---|
| B-71 | H | H | O | CH |
| B-72 | H | CH$_3$ | O | CH |
| B-73 | H | nC$_4$H$_9$ | O | CH |
| B-74 | nC$_4$H$_9$ | nC$_4$H$_9$ | O | CH |
| B-75 | H | Ph | O | CH |
| B-76 | H | Ph | O | C(Ph) |
| B-77 | Ph | Ph | O | CH |
| B-78 | H | 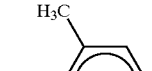 | O | CH |
| B-79 | H | 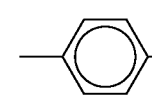 | O | CH |
| B-80 | H | H | S | CH |
| B-81 | H | C$_2$H$_5$ | S | CH |
| B-82 | C$_2$H$_5$ | C$_2$H$_5$ | S | CH |
| B-83 | H | nC$_4$H$_9$ | O | C(CH$_2$Ph) |
| B-84 | H | Ph | O | C(CH$_3$) |
| B-85 | H | Ph | S | CH |

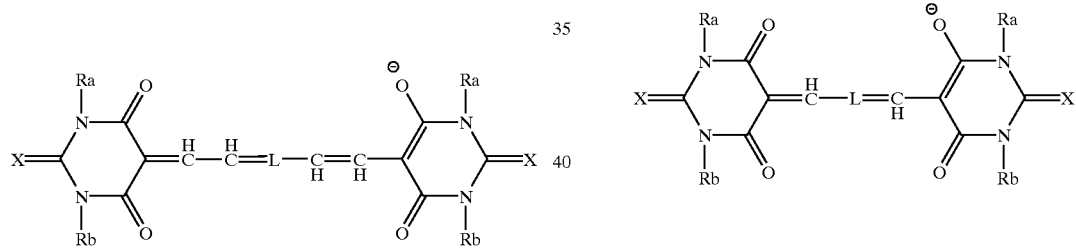

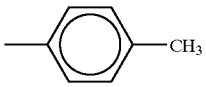

wherein specific examples of Ra, Rb, X and L are as follows.

| No. | Ra | Rb | x | L |
|---|---|---|---|---|
| B-86 | H | nC$_4$H$_9$ | O | CH |
| B-87 | H | Ph | O | CH |
| B-88 | CH$_3$ | CH$_3$ | O | CH |
| B-89 | Ph | Ph | O | CH |
| B-90 | H | Ph | O | C(CH$_3$) |
| B-91 | H | —⟨C$_6$H$_4$⟩—CH$_3$ | O | C(CH$_2$Ph) |
| B-92 | H | nC$_4$H$_9$ | S | CH |
| B-93 | H | Ph | S | CH |
| B-94 | Ph | Ph | S | CH |
| B-95 | Et | Et | S | CH |
| B-96 | H | Ph | S | C(CH$_3$) |

-continued
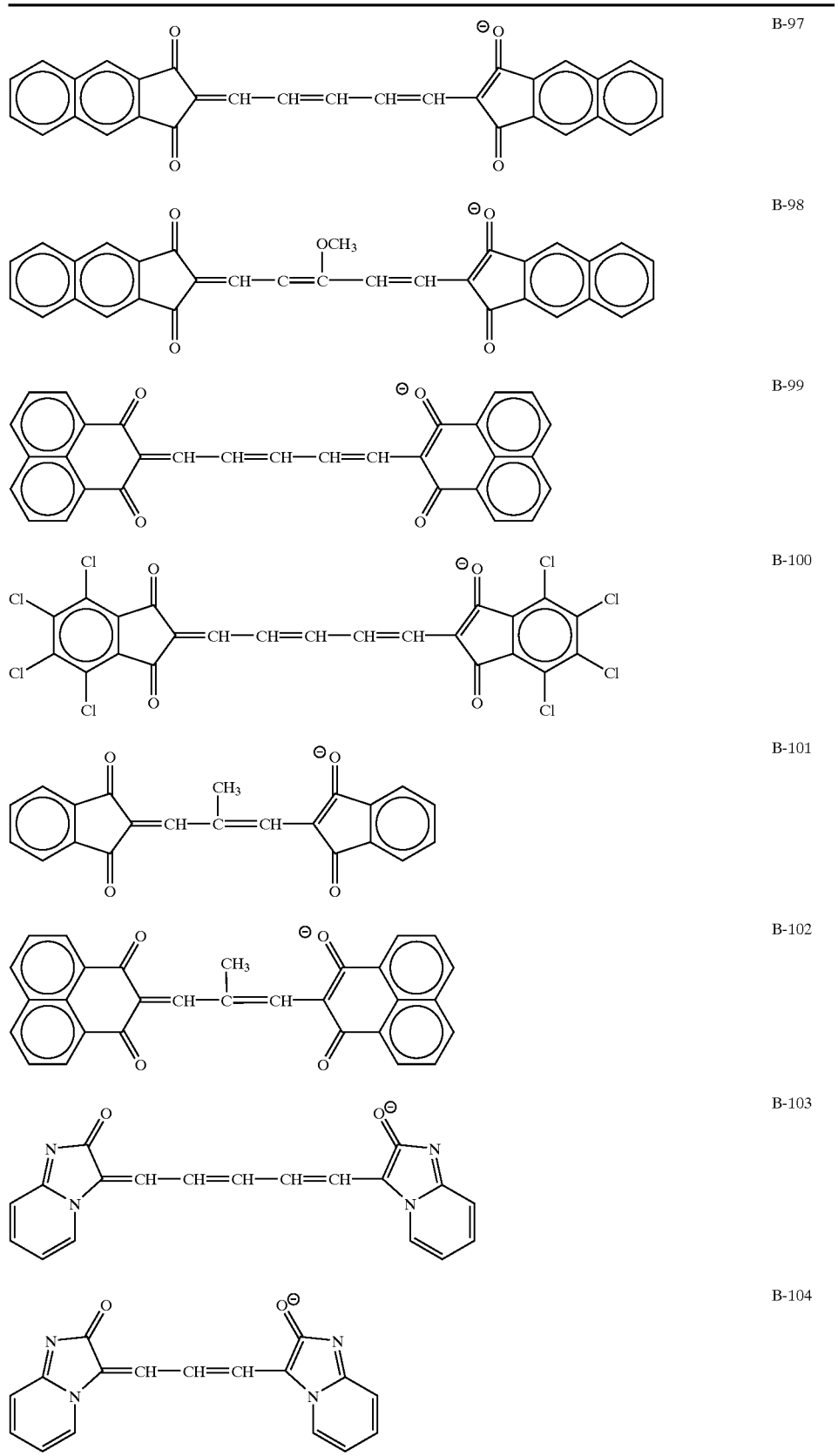

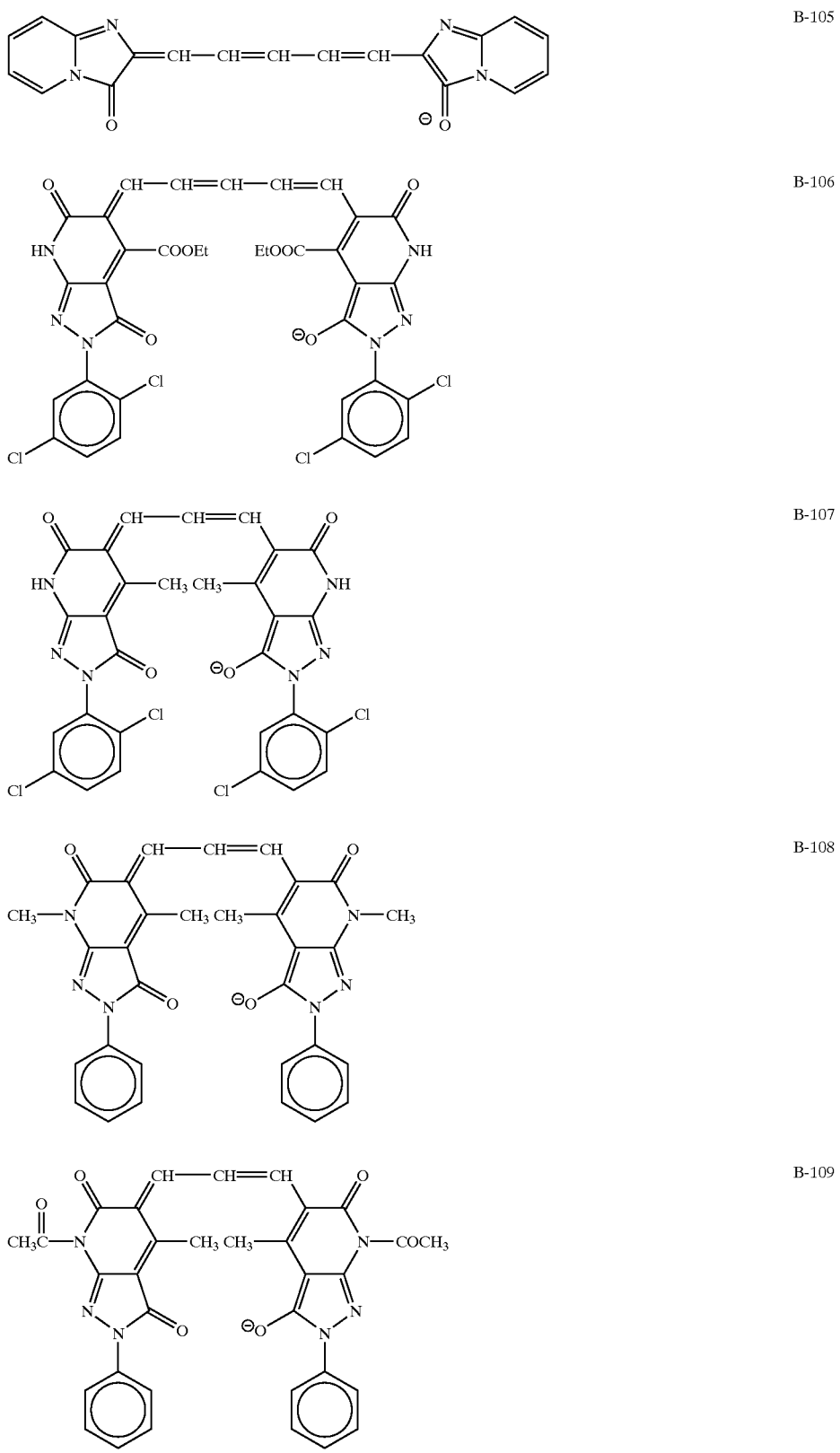

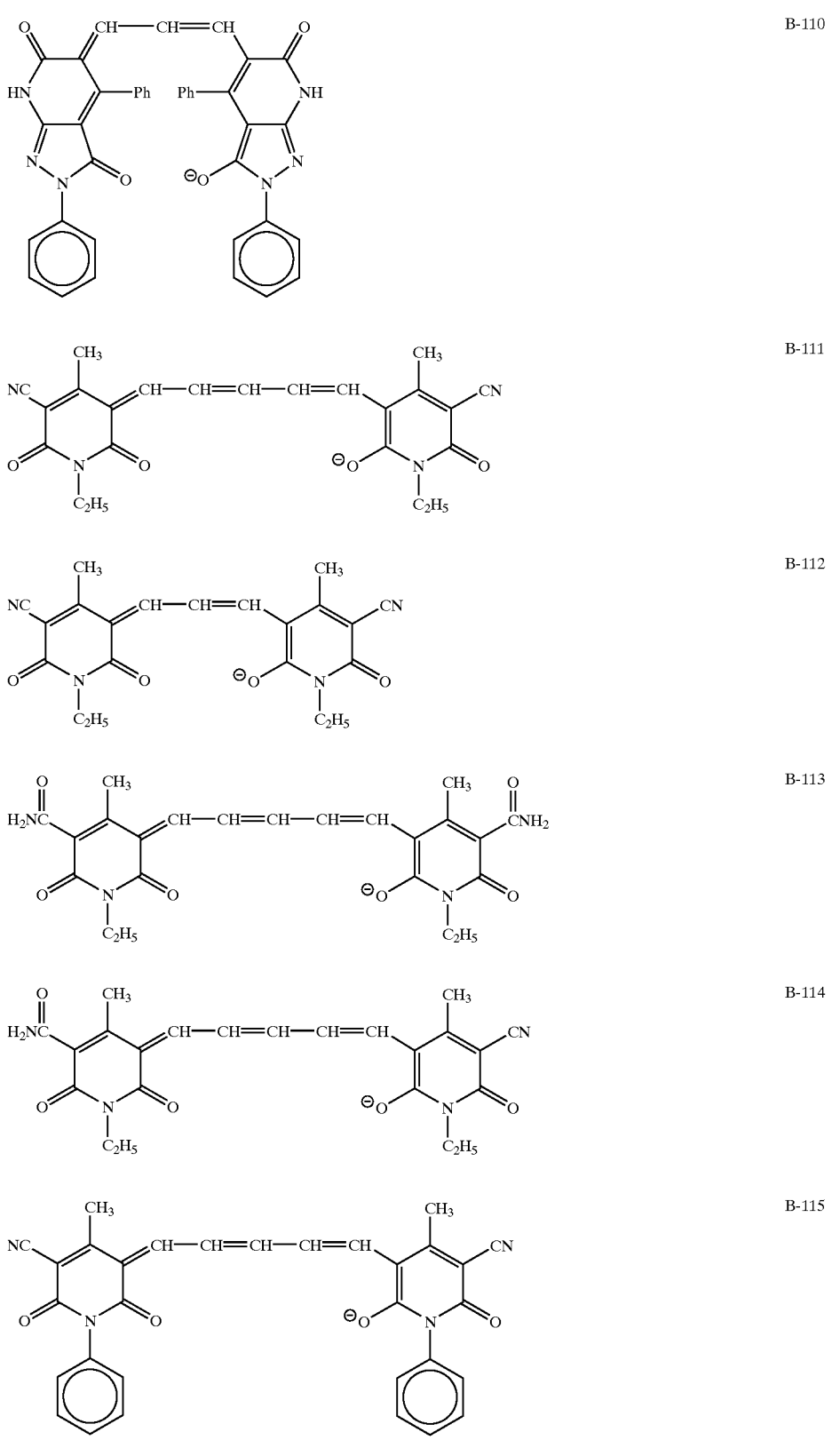

-continued
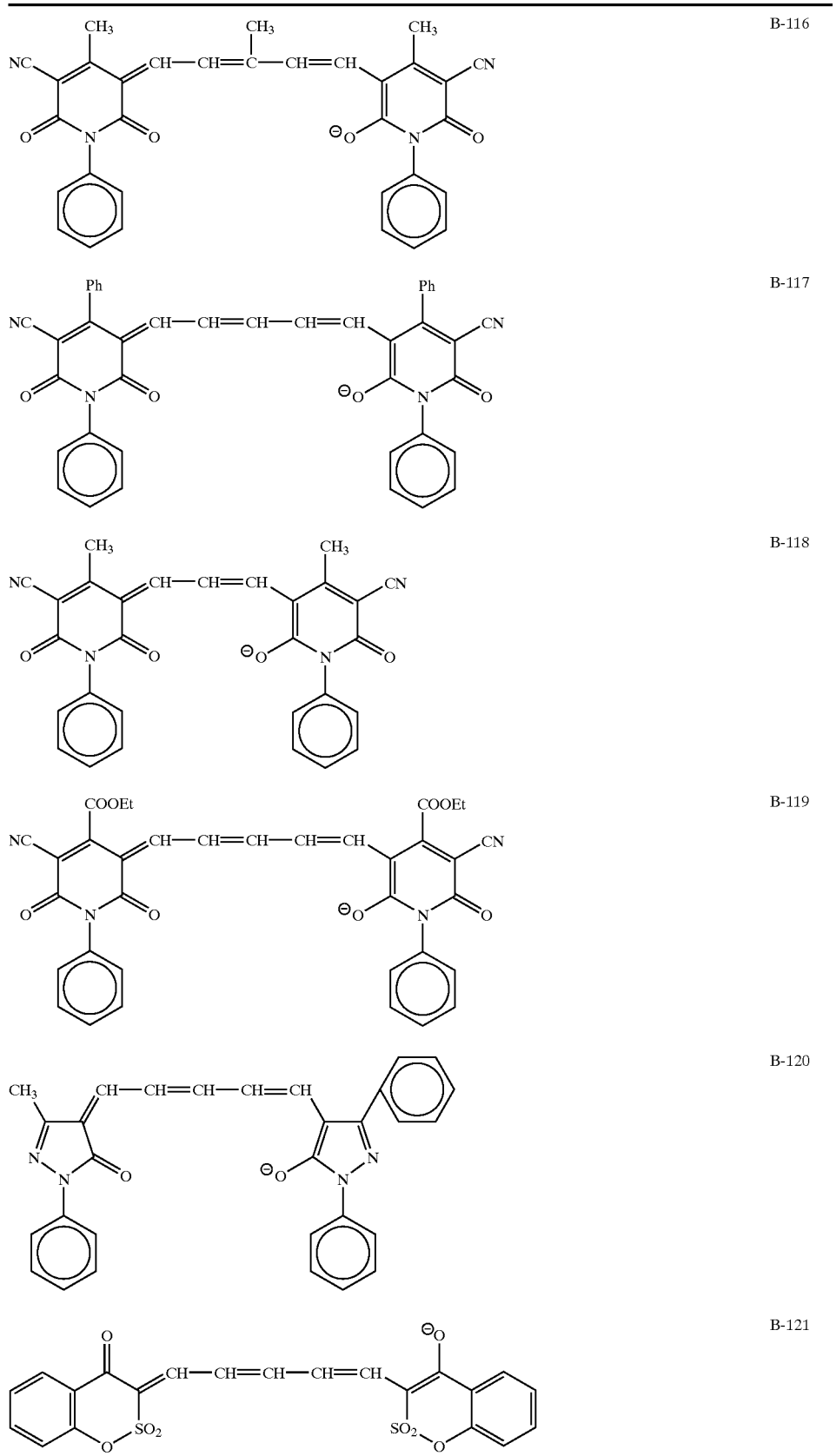

-continued
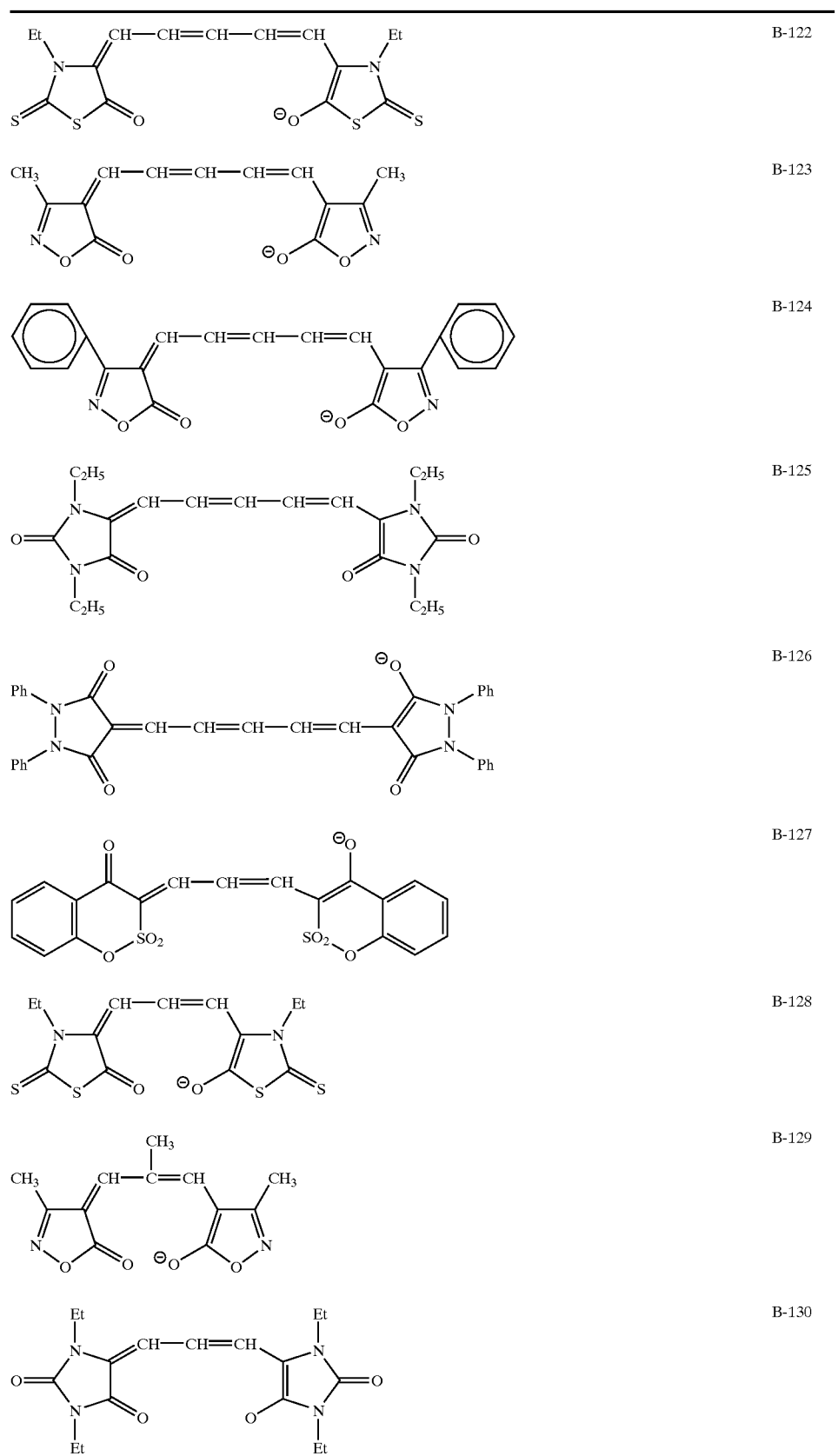

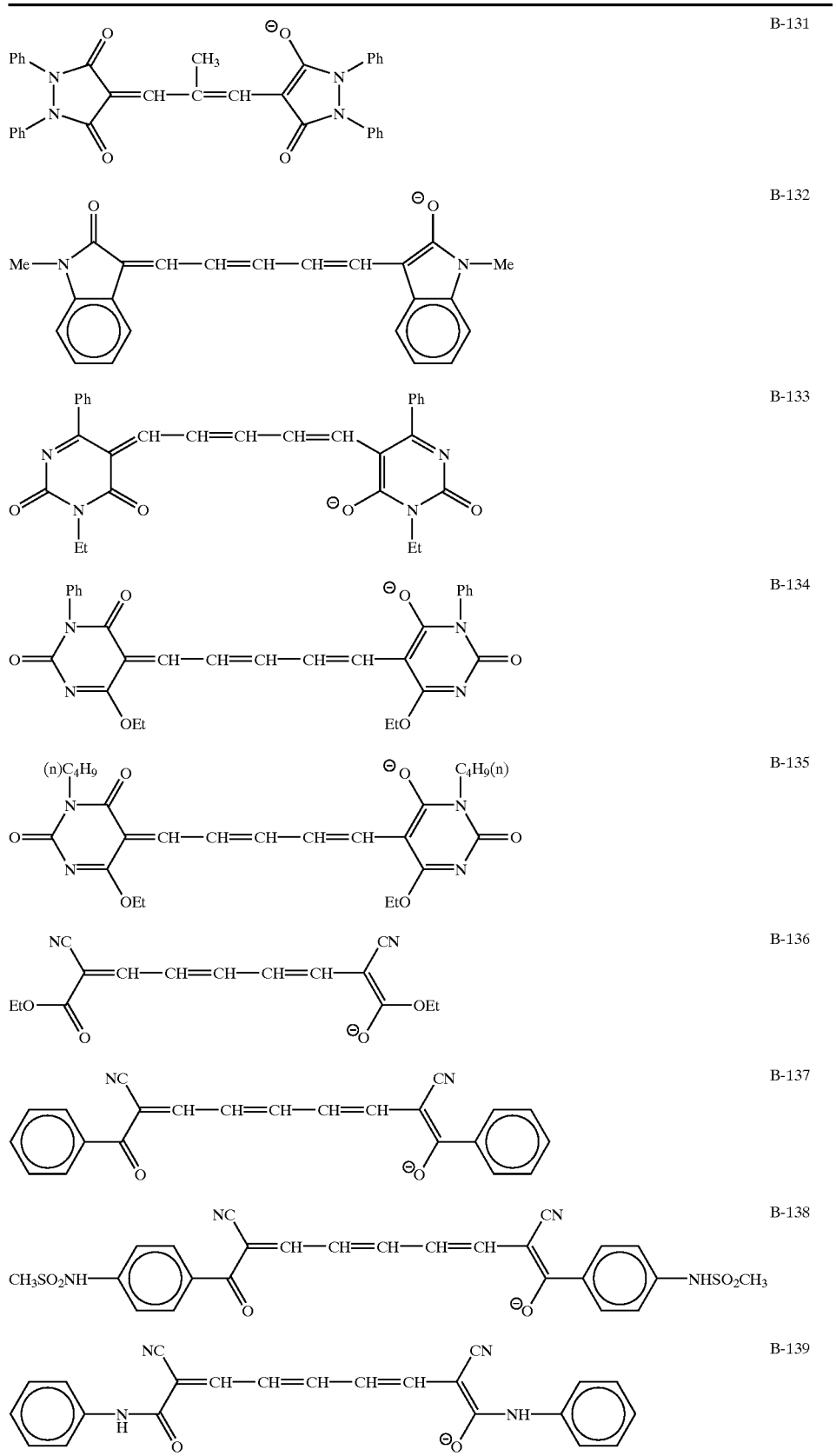

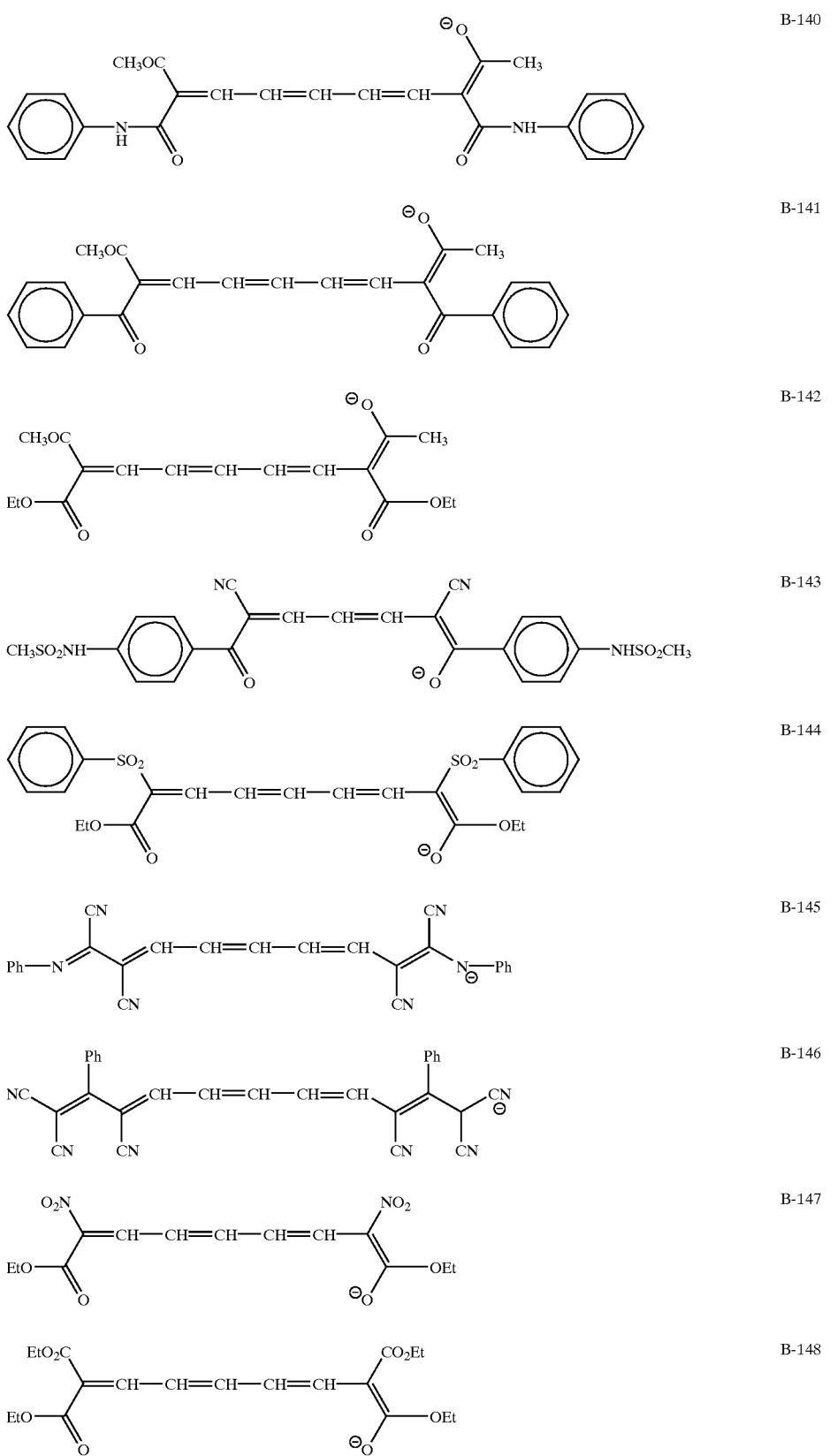

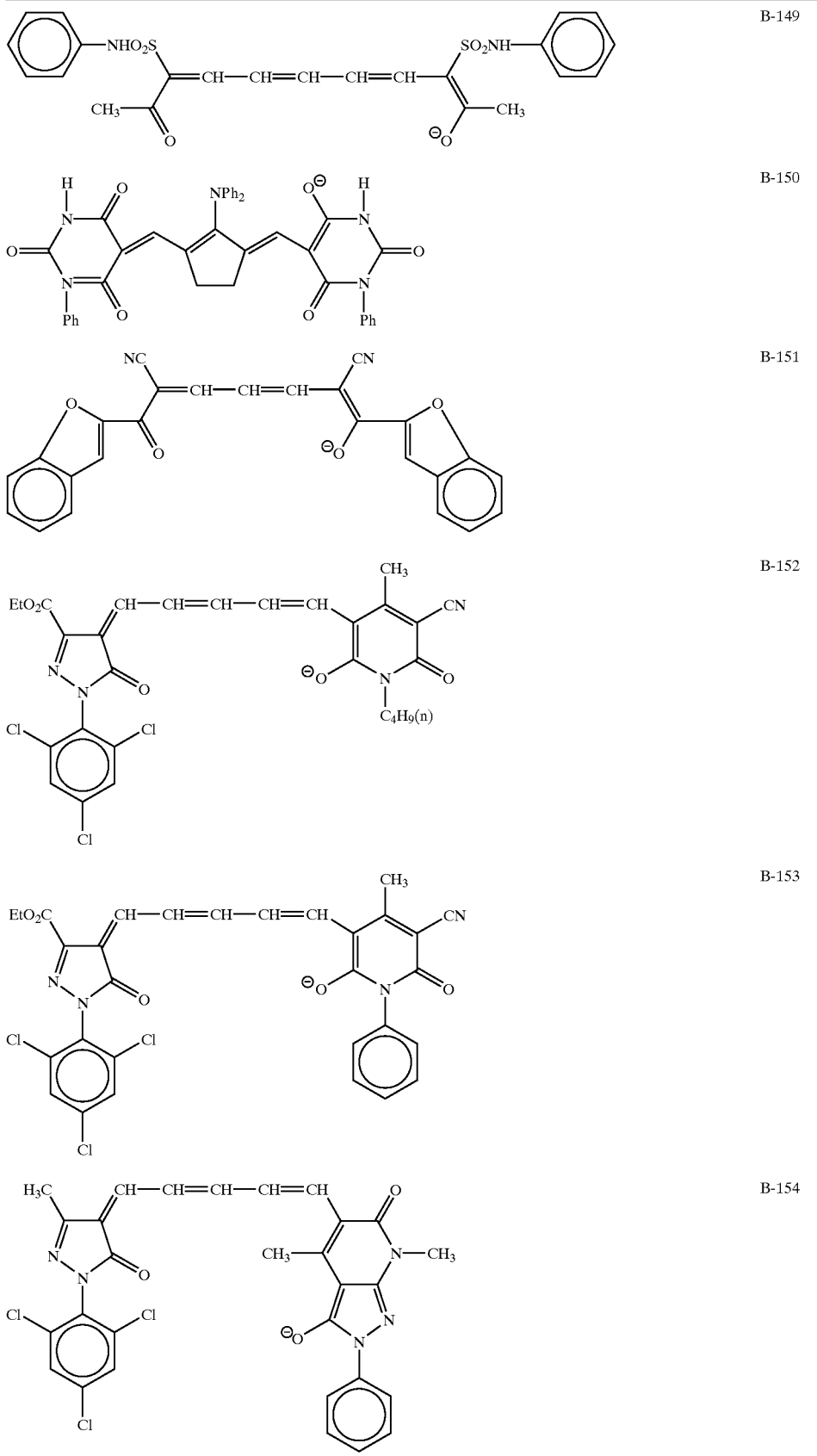

-continued
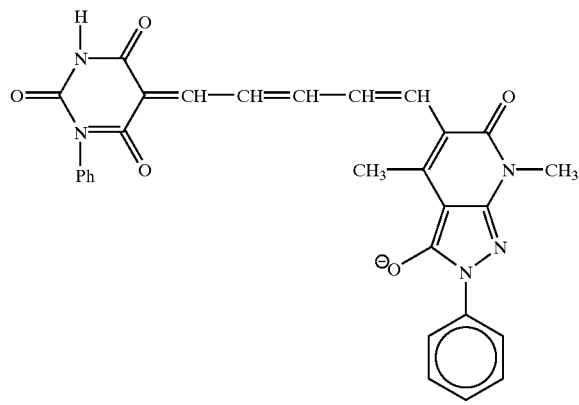
B-155
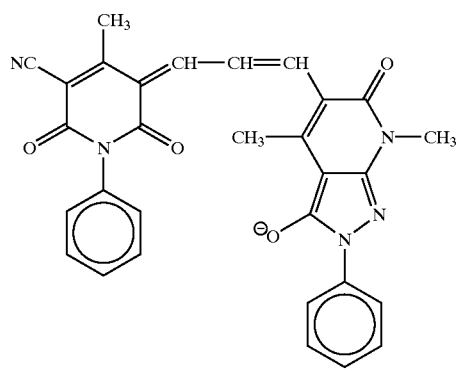
B-156
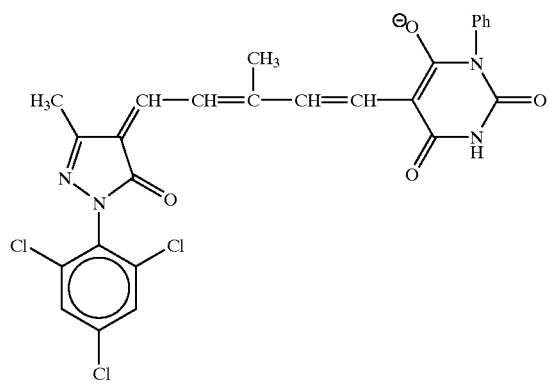
B-157
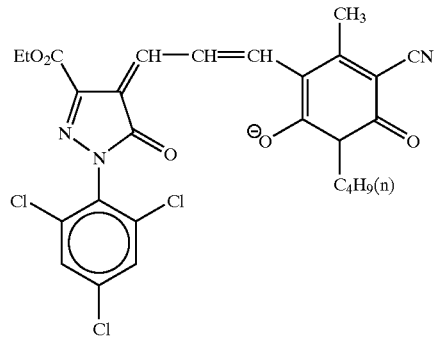
B-158

-continued
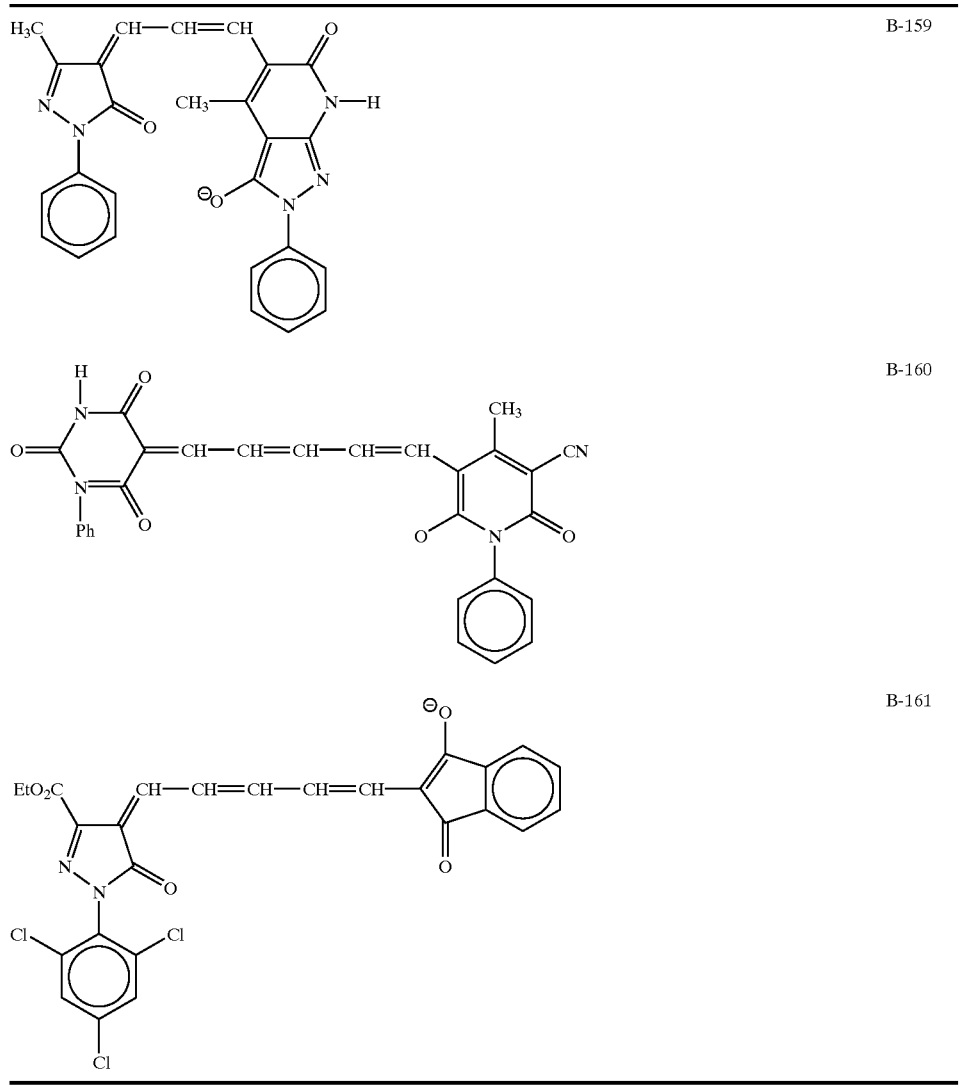
B-159
B-160
B-161
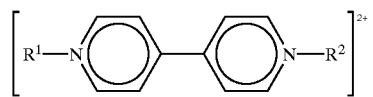
wherein specific examples of $R_1$ and $R_2$ are as follows.
| No. | $R_1$ | $R_2$ | No. | $R_1$ | $R_2$ |
|---|---|---|---|---|---|
| C-17 | $CH_3$ | $CH_3$ | C-36 | $CH_3O$—〈C6H4〉— | $CH_3O$—〈C6H4〉— |
| C-18 | $C_2H_5$ | $C_2H_5$ | | | |
| C-19 | $nC_3H_7$ | $nC_3H_7$ | C-37 | $F$—〈C6H4〉— | $F$—〈C6H4〉— |
| C-20 | $nC_4H_9$ | $nC_4H_9$ | | | |

-continued

| | | | | |
|---|---|---|---|---|
| C-21 | isoC$_4$H$_9$ | isoC$_4$H$_9$ | C-38 | 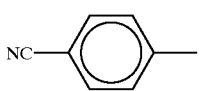 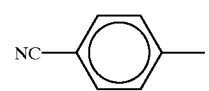 |
| C-22 | nC$_6$H$_{13}$ | nC$_6$H$_{13}$ | | |
| C-23 | PhCH$_2$ | PhCH$_2$ | C-39 | CH$_3$(CH$_2$)$_3$—CHCH$_2$-    CH$_3$(CH$_2$)$_3$—CHCH$_2$- <br>          |                                     | <br>          C$_2$H$_5$                           C$_2$H$_5$ |
| C-24 | CH$_3$—CH=CH—CH$_2$ | CH$_3$—CH=CH—CH$_2$ | | |
| C-25 | CH$_2$=CH | CH$_2$=CH | C-40 | 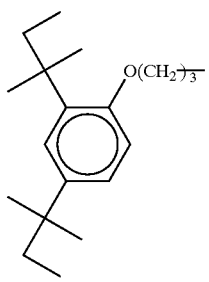 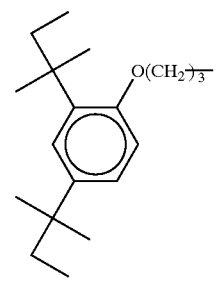 |
| C-26 | NCCH$_2$ | NCCH$_2$ | | |
| C-27 | EtO$_2$C—CH$_2$— | EtO$_2$CCH$_2$— | | |
| C-28 | HOCH$_2$CH$_2$ | HOCH$_2$CH$_2$ | | |
| C-29 | EtOCH$_2$CH$_2$ | EtOCH$_2$CH$_2$ | | |
| C-30 | CH$_3$ | nC$_4$H$_9$ | | |
| C-31 | CH$_3$ | PhCH$_2$ | | |
| C-32 | CH$_3$COCH$_2$ | CH$_3$COCH$_2$ | | |
| C-33 | $\underset{H_2NCCH_2}{\overset{O}{\|\|}}$ | $\underset{H_2NCCH_2}{\overset{O}{\|\|}}$ | | |
| C-34 | CF$_3$CH$_2$ | CF$_3$CH$_2$ | | |
| C-35 | Ph | Ph | | |

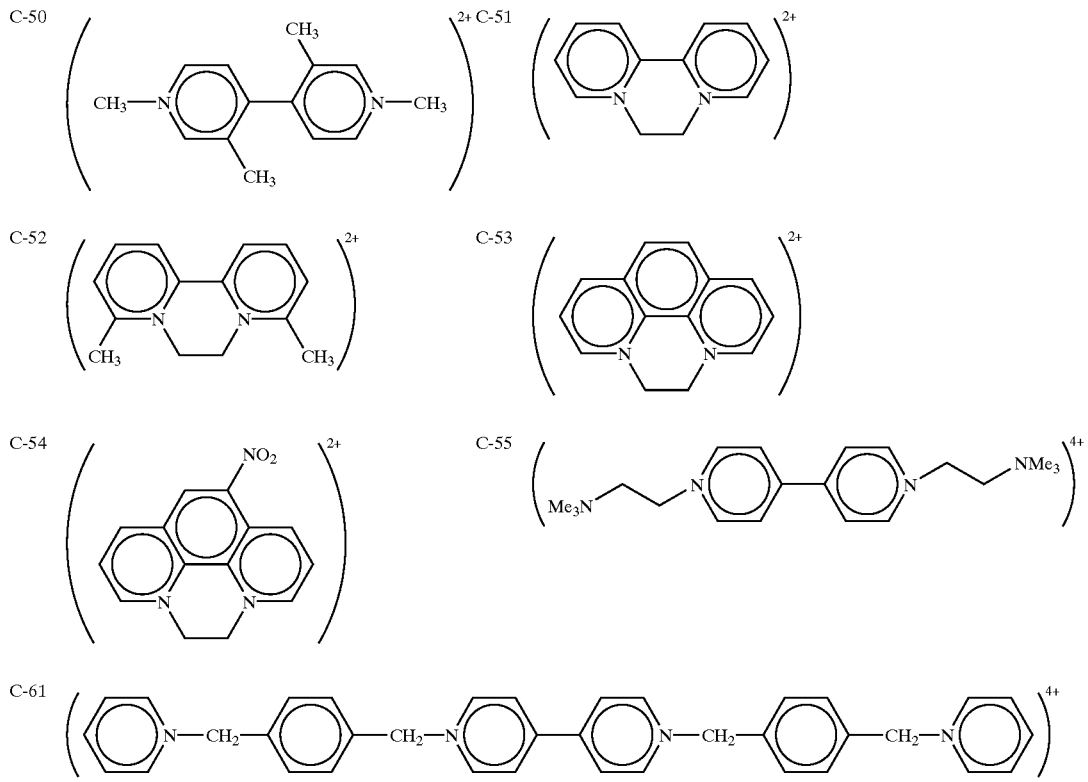

-continued

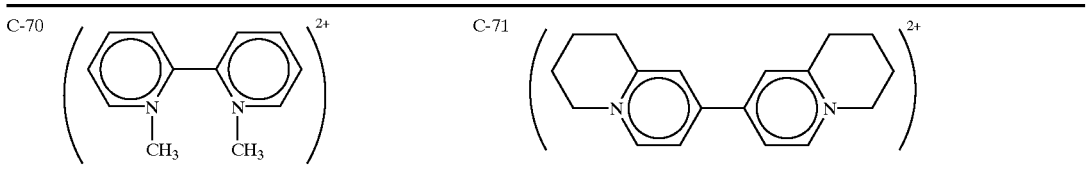

Specific examples of preferred dye compounds represented by the general formulae (II-1) and, (II-2) are listed in the following table 2. In table 2, each compound is represented by a combination of the anion part and the cation part. For example, No.3 compound in the table 2 represented by a combination of (B-3) and (C-20) has the following structure.

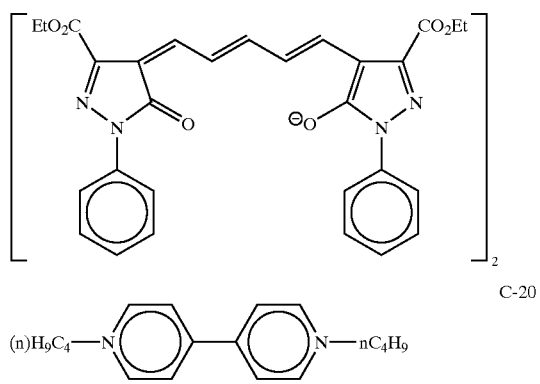

TABLE 2

| compound No. | anion | cation |
|---|---|---|
| 3 | B-3 | C-20 |
| 4 | B-3 | C-21 |
| 5 | B-3 | C-22 |
| 6 | B-3 | C-39 |
| 7 | B-3 | C-40 |
| 9 | B-3 | C-53 |
| 12 | B-6 | C-39 |
| 13 | B-6 | C-40 |
| 16 | B-74 | C-39 |
| 17 | B-74 | C-40 |
| 20 | B-111 | C-39 |
| 21 | B-111 | C-40 |
| 23 | B-111 | C-53 |
| 24 | b-98 | C-39 |
| 25 | b-98 | C-40 |

Compound No. 26

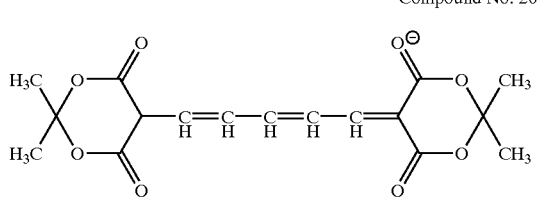

-continued

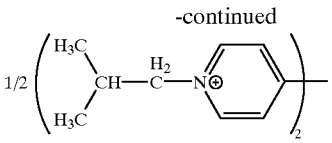

The compounds represented by the general formulae (II-1) and (II-2) can be easily synthesized by salt exchange reaction in water or organic solvent (e.g., methanol, ethanol, isopropanol or dimethylformamide) of a salt such as an alkaline metal salt (e.g., Li salt, Na salt, or K salt) or ammonium salt ($NH^{4+}$ salt) or triethylammonium salt ($Et_3NH^+$ salt) of a dye compound represented by the following general formula (II-9) or (II-10), and an onium salt represented by the following general formula (II-11).

General formula (II-9)

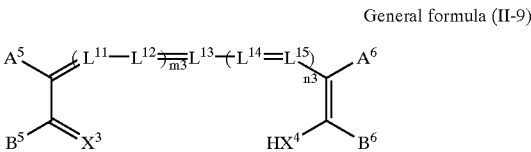

General formula (II-10)

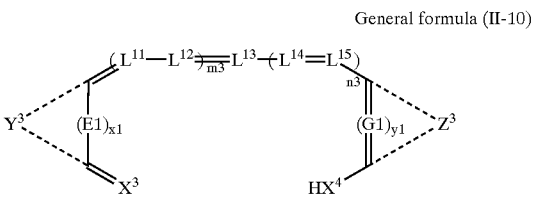

wherein $A^5$, $A^6$, $B^5$, $B^6$, $Y^3$, $Z^3$, $L^{11}$, $L^{12}$, $L^{13}$, $L^{14}$, $L^{15}$, $X^3$, $X^4$, E1, G1, m3, n3, x1 and y1 are the same as $A^1$, $A^2$, $B^1$, $B^2$, $Y^1$, $Z^1$, $L^1$, $L^2$, $L^3$, $L^4$, $L^5$, $X^1$, $X^2$, E, G, m, n, x and y in the aforesaid general formulae (II-1) and (II-2).

$$M^{k+} \cdot k/r \, X^{r-}$$  General formula (II-11)

wherein $X^{r-}$ represents an anion and r represents an integer (preferably 1 to 4, and more preferably 1 or 2).

As the anion, a halide ion (e.g., $Cl^-$, $Br^-$ or $I^-$), a sulfonato ion (e.g., $CH_3SO_3^-$, p-toluenesulfonato ion or naphthalene-1,5-disulfonato ion), $ClO_4^-$, $BF_4^-$, and $PF_6^-$ may be included.

The dye compounds represented by (II-9) and (II-10) can be generally synthesized by condensation reaction of active methylene compounds (e.g., pyrazolone, thiobarbituric acid, barbituric acid, indandionic acid, and hydroxyphenalenone) and a methyne source for introducing a methyne group or polymethyne group into methyne dye. These compounds are disclosed in detail Japanese Patent Publication Nos. 39(1964)-22069, 43(1968)-3504, 52(1977)-38056, 54(1979)-38129, 55(1980)-10059 and 58(1983)-35544, Japanese Unexamined Patent Publication Nos. 49(1974)-99620, 52(1977)-92716, 59(1984)-16834, 63(1988)-316853 and 64(1989)-40827, British Patent No. 1133986, and U.S. Pat. Nos. 3,247,127, 4,042,397, 4,181,225, 5,213,956, and 5,260,179.

Specifically, orthoesters such as ethyl orthoformate and ethyl orthoacetate, N,N-diphenylformamidine hydrochloride, and the like are used for introduction of a monomethyne group, trimethoxypropene, 1,1,3,3-tetramethoxypropene and malonaldehydedianil hydrochloride (and derivatives of these compounds) are used for introduction of a trimethyne chain, and glutaconealdehyde-dianil hydrochloride and 1-(2,4-dinitrophenyl)-pyridinium chloride (and derivatives of these compounds) are used for introduction of a pentamethyne chain.

An example of synthesis of a dye compound represented by the general formulae (II-1) and (II-2) will be described hereinbelow.

Synthesis of No. 5 Compound 1 g of the following compound a was added to 20 mL of 0.1N aqueous solution of sodium hydroxide at room temperature and stirred. Aqueous solution of 0.5 g of the following compound b in 5 mL of water was added to the solution, and stirred for 30 minutes at the same temperature. Thereafter deposited crystals were filtered out and washed with water and methanol. Then the crystals were dried and 0.23 g of the object compound was obtained. λmax was 654 nm in methanol.

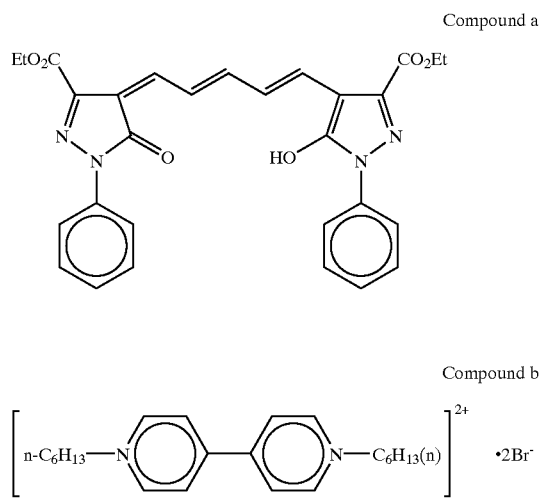

Compound a

Compound b

The photo-functional film may be formed of one or more of the compounds represented by the general formulae (II-1) and (II-2). Further combinations of one or more of the compounds represented by the general formula (II-1) and one or more of the compounds represented by the general formula (II-2) may also be employed.

Further, a photo-functional film formed of an organic dye compound represented by the following general formula (III) may also be suitably employed.

General formula (III)

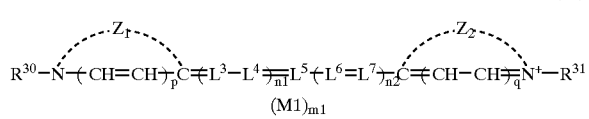

wherein $Z^1$ and $Z^2$ represent independently of each other a group of atoms required to form a five- or six-membered nitrogen-containing heterocycle; $R^{30}$ and $R^{31}$ represent independently of each other an alkyl group; $L^3$, $L^4$, $L^5$, $L^6$ and $L^7$ represent a methyne group; n1, n2, p and q respectively represent an integer from 0 to 2 and $(M1)_{m1}$ represents a charge-balancing counter ion.

A photo-functional film 13 formed of a combination of an organic dye compound represented by the general formula (III) and an organic oxidizing agent represented by the following general formula (IV) may be further suitably employed.

General formula (IV)

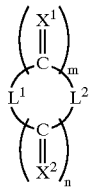

wherein m and n represents independently of each other an integer 0 to 2, $X^1$ and $X^2$ represent $=NR^1$ or $=CR^2R^3$ ($R^1$, $R^2$ and $R^3$ being a substituent group) and $L^1$ and $L^2$ represent independently of each other a divalent bonding group.

The organic oxidizing agents and the organic dyes which can be employed in this invention will be described hereinbelow.

The organic oxidizing agents will be described first. In general formula (IV), it is preferred that m and n are both 1.

The substituent groups represented by $R^1$, $R^2$ and $R^3$ include substituent groups formed by combinations of halogen atoms (or carbon atoms), oxygen atoms and nitrogen atoms (or sulfur atoms), e.g., alkyl groups, alkenyl groups, aralkyl groups, aryl groups, heterocycles, halogen atoms, cyano groups, nitro groups, mercapto groups, hydroxy groups, alkoxy groups, aryloxy groups, alkylthio groups, arylthio groups, acyl group groups, aryloxy groups, alkylthio groups, arylthio groups, acyloxy groups, amino groups, alkylamino groups, admide groups, sulfonamide groups, sulfamoylamino groups, alkoxycarbonylamino groups, alkoxysulfonylamino groups, ureido groups, thioureido groups, acyl groups, alkoxycarbonyl groups, carbamoyl groups, alkylsulfonyl groups, alkylsulfinyl groups, sulfamoyl groups, carboxyl groups (including salts thereof), sulfo groups (including salts thereof), and the like. Further these substituent groups may be substituted by these substituent groups.

The examples of the substituent groups represented by $R^1$, $R^2$ and $R^3$ will be described in more detail, hereinbelow.

The alkyl group is a straight-chain, cyclic or branched alkyl group which has 1 to 18 (preferably 1 to 6) carbon atoms and may have a substituent group. Such an alkyl group includes methyl, ethyl, propyl, isopropyl, t-butyl, cyclopentyl, cyclohexyl, 2-hydroxyethyl, 3-hydroxypropyl, 4-hydroxybutyl, 3-methoxypropyl, 2-aminoethyl, acetoamidemethyl, 2-acetoamideethyl, carboxymethyl, 2-carobxyethyl, 2-sulfoethyl, ureidoethyl, carbamoylmethyl, 2- carbamoylethyl, 3-carbomoylpropyl, pentyl, hexyl, octyl, decyl, undecyl, dodecyl, hexadecyl, octadecyl and the like.

The alkenyl group is a straight-chain, cyclic or branched alkenyl group having 2 to 18 (more preferably 2 to 6) carbon atoms. Such an alkenyl group includes vinyl, allyl, 1-propenyl, 2-pentenyl, 1,3-butadienyl, 2-octenyl, 3-dodecenyl and the like.

The aralkyl group is an aralkyl group having 7 to 10 carbon atoms such as benzyl.

The aryl group is an aryl group which has 6 to 10 carbon atoms and may have a substituent group. Such an aryl group includes phenyl, naphthyl, p-dibutylaminophenyl, p-methoxyphenyl and the like.

The heterocycle is a five-or six-membered saturated or unsaturated heterocycle composed of carbon atom, nitrogen atom, oxygen atom and/or sulfur atom. The number of hetero atoms and kinds of elements forming the heterocyle may be single or plural. Such a heterocycle includes furil, benzofuril, pyranyl, pyrrolil, imidazolyl, isooxazolyl, pyrazolyl, benzotrizolyl, pyridyl, pyrimidyl, pyridazinyl, thienyl, indolyl, quinolyl, phthalazinyl, quinoxalinyl, pyrrolidinyl, pyrrolinyl, imidazolidinyl, imidazolinyl, pyrazoldinyl, piperidyl, piperadinyl, indolinyl, morphorinyl and the like.

The halogen atom may be F atom, Cl atom, Br atom or the like.

The alkoxy group is a straight-chain, cyclic or branched alkoxy which has 1 to 18 (preferably 1 to 6) carbon atoms and may have a substituent group. Such an alkoxy group includes methoxy, ethoxy, propoxy, isopropoxy, butoxy, 2-methoxyethoxy, 2-methanesulfonylethoxy, pentyloxy, hexyloxy, octyloxy, undecyloxy, dodecyloxy, octadecyloxy and the like.

The aryloxy group is an arylkoxy group which has 6 to 10 carbon atoms and may have a substituent group. Such an aryloxy group includes phenoxy, p-methoxyphenoxy and the like.

The alkylthio group is an alkylthio group having 1 to 18 (preferably 1 to 6) carbon atoms. Such an alkylthio group includes methylthio, ethylthio, octylthio, undecylthio, dodecylthio, hexadecylthio, octadecylthio and the like.

The arylthio group is an arylthio group which has 6 to 10 carbon atoms and may have a substituent group. Such anarythio group includes phenylthio, 4-methoxyphenylthio, and the like.

The acyloxy group is an acyloxy group having 1 to 18 (preferably 1 to 6) carbon atoms. Such an acyloxy group includes acetoxy, propanoyloxy, pentanoyloxy, octanoyloxy, dodecanoyloxy, octadecanoyloxy and the like.

The alkylamino group is an alkylamino group having 1 to 18 (preferably 1 to 6) carbon atoms. Such an alkylamino group includes methylamino, dimethylamino, diethylamino, dibutylamino, octylamino, dioctylamino, undecylamino, and the like.

The amide group is an amide group having 1 to 18 (preferably 1 to 6) carbon atoms. Such an amide group includes acetamide, acetylmethylamino, acetyloctylamino, acetyldecylamino, acetylundecylamino, acetyloctadecylamino, propanoylamino, pentanoylamino, octanoylamino, octanoylmethylamino, dodecanoylamino, dodecanoylmethylamino, octadecanoylamino and the like.

The sufonamide group is a sulfonamide group which has 1 to 18 (preferably 1 to 6) carbon atoms and may have a substituent group. Such an sufonamide group includes methanesulfonamide, ethanesulfonamide, propylsulfonamide, 2-methoxyethylsulfonamide, 3-aminopropylsulfonamide, 2-acetamideethylsulfonamide, octylsulfonamide, undecylsulfonamide, and the like.

The alkoxycarbonylamino group is an alkoxycarbonylamino group having 2 to 18 (preferably 2 to 6) carbon atoms. Such an alkoxycarbonylamino group includes methoxycarbonylamino, ethoxycarbonylamino, octyloxycarbonylamino, undecyloxycarbonylamino, and the like.

The alkoxysulfonylamino group is an alkoxysulfonylamino group having 1 to 18 (preferably 1 to 6) carbon atoms. Such an alkoxysulfonylamino group includes methoxysulfonylamino, ethoxysulfonylamino, octyloxysulfonylamino, undecyloxysulfonylamino and the like.

The sulfamoylamino group is a sulfamoylamino group having 0 to 18 (preferably 0 to 6) carbon atoms. Such a sulfamoylamino group includes methylsulfamoylamino, dimethylsulfamoylamino, ethylsulfamoylamino, propylsulfamoylamino, octylsulfamoylamino, undecylsulfamoylamino and the like.

The ureido group is an ureido group which has 1 to 18 (preferably 1 to 6) carbon atoms and may have a substituent group. Such an ureido group includes ureido, methylureido, N,N-dimethylureido, octylureido, undecylureido and the like.

The thioureido group is a thioureido group which has 1 to 18 (preferably 1 to 6) carbon atoms and may have a substituent group. Such a thioureido group includes thioureido, methythiolureido, N,N-dimethylthioureido, octylthioureido, undecylthioureido and the like.

The acyl group is an acyl group which has 1 to 18 (preferably 1 to 6) carbon atoms and may have a substituent group. Such an acyl group includes acetyl, benzoyl, octanoyl, decanoyl, undecanoyl, octadecanoyl and the like.

The alkoxycarbonyl group is an alkoxycarbonyl having 2 to 18 (preferably 2 to 6) carbon atoms such as methoxycarbonyl, ethoxycarbonyl, octyloxycarbonyl, undecyloxycarbonyl and the like.

The carbamoyl group is a carbamoyl group which has 1 to 18 (preferably 1 to 6) carbon atoms and may have a substituent group. Such a carbamoyl group includes carbamoyl, N,N-dimethylcarbamoyl, N-ethylcarbamoyl, N-octylcarbamoyl, N,N-dioctylcarbamoyl, N-undecylcarbamoyl, and the like.

The alkylsulfonyl group is an alkylsulfonyl group which has 1 to 18 (preferably 1 to 6) carbon atoms and may have a substituent group. Such an alkylsulfonyl group includes methanesulfonyl, ethanesulfonyl, 2-chloroethanesulfonyl, octanesulfonyl, undecanesulfonyl and the like.

The alkylsulfinyl group is an alkylsulfinyl group having 1 to 18 (preferably 1 to 6) carbon atoms. Such an alkylsulfinyl group includes methanesulfinyl, ethanesulfinyl, octanesulfinyl, and the like.

The sulfamoyl group is a sulfamoyl group which has 0 to 18 (preferably 0 to 6) carbon atoms and may have a substituent group. Such a sulfamoyl group includes a sulfamoyl, dimethylsulfamoyl, ethylsulfamoyl, octylsulfamoyl, dioctylsulfamoyl, undecylsulfamoyl and the like.

$L^1$ and $L^2$ represent independently of each other a divalent bonding group. The divalent bonding group is a group which is composed of carbon atoms, nitrogen atoms, oxygen atoms and/or sulfur atoms and forms a four- to eight-membered ring together with the carbon atom to which $X^1$ and $X^2$ are bonded. For example, the divalent bonding group may be groups each formed by a combination of —C($R^4$)($R^5$)—, —C($R^6$)—, —N($R^7$)—, —N=, —O— and —S—, wherein $R^4$, $R^5$, $R^6$ and $R^7$ represent independently of each other a hydrogen atom or a substituent group. The substituent groups represented by $R^4$, $R^5$, $R^6$ and $R^7$ are the same as those described above in conjunction with $R^1$, $R^2$ and $R^3$. The four- to eight-membered rings may form a saturated or unsaturated fused ring such as a cycloalkyl ring, an aryl ring or a heterocyclic as described above in conjunction with $R^1$, $R^2$ and $R^3$.

The four- to eight-membered rings will be described in more detail, hereinbelow.

Examples of four-membered rings include cyclobutanedione, cyclobutenedione, benzocyclobutenequinone and the like.

Examples of five-membered rings include cyclopentanedione, cyclopentenedione, cyclepentanetrione, cyclepentenetrione, indandione, indantrione, tetrahydrofurandione, tetrahydrofurantrione, tetrahydropyrroledione, tetrahydropyrroletrione, tetrahydrothiophenedione, tetrahydrothiophenetrione and the like.

Examples of six-membered rings include benzoquinone, guinomethane, quinodimethane, quinoneimine, quinonediimine, thiobenzoquinone, dithiobenzoquinone, naphthoquinone, antraquinone, dihydrochromenetrione, dihydropyridinedione, dihydropyrazinedione, dihydropyrimidinedione, dihydropyridazinedione, dihydrophthalazinedione, dihydroisoquinolinedione, tetrahydroquinolinedione, and the like.

Examples of seven-membered rings include cycloheptanedione, cycloheptanetrione, azacycloheptanetrione, diazacycloheptanetrione, oxocycloheptanetrione, dioxocycloheptanetrione, oxoazacycloheptanetrione, and the like.

Examples of eight-membered rings include cyclooctanedione, cyclooctanetrione, azacyclooctanetrione, diazacyclooctanetrione, oxocyclooctanetrione, dioxocyclooctanetrione, oxoazacyclooctanetrione, cyclooctenedione, cyclooctadienedione, dibenzocyclooctenedione, and the like.

The ring which $L^1$ and $L^2$ form together with the carbon atom to which $X^1$ and $X^2$ are bonded is preferably a six-membered ring.

It is further preferred that the organic oxidizing agent be a compound represented by the following general formula (IV-1).

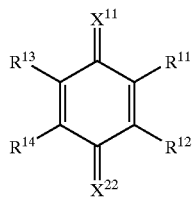

General formula (IV-1)

wherein $X^{11}$ and $X^{12}$ represent $NR^8$ or $CR^9R^{10}$ which is the same as $NR^1$ or $CR^2R^3$ represented by $X^1$ or $X^2$ in the aforesaid general formula (IV). The preferred examples of $NR^8$ and $CR^9R^{10}$ are also the same as those of $NR^1$ and $CR^2R^3$. Further the substituent groups represented by $R^8$, $R^9$ and $R^{10}$ are same as those represented by $R^1$, $R^2$ and $R^3$. The preferred examples of $R^8$, $R^9$ and $R^{10}$ are also the same as those of $R^1$, $R^2$ and $R^3$.

$R^{11}$, $R^{12}$, $R^{13}$ and $R^{14}$ represent independently of each other a hydrogen atom or a substituent group. When $R^{11}$, $R^{12}$, $R^{13}$ and $R^{14}$ simulatneously represent substituent groups, the substituent groups may be bonded to each other to form an unsaturated fused ring. The unsaturated fused ring may have a substituent group, which may be those described above in conjunction with $R^1$, $R^2$ and $R^3$.

It is preferred that $X^{11}$ and $X^{12}$ represent independently of each other an oxygen atom or $=CR^9R^{10}$ and it is further preferred that $X^{11}$ and $X^{12}$ both represent an oxygen atom or both represent $=CR^9R^{10}$. It is preferred that $R^9$ and $R^{10}$ represent independently of each other a halogen atom, a cyano group, an acyl group, an alkoxycarbonyl group or an alkylsulfonyl group.

The case where $X^{11}$ and $X^{12}$ both represent an oxygen atom will be described, hereinbelow.

When $X^{11}$ and $X^{12}$ both represent an oxygen atom, it is preferred that at least two of $R^{11}$, $R^{12}$, $R^{13}$ and $R^{14}$ represent an electron attractive group. The electron attractive group is a substituent group whose Hammette substituent constant σp is positive. For example, a halogen atom, a cyano group, a nitro group, an acyl group, an alkoxycarbonyl group, a carbamoyl group, an alkyl sulfonyl group, and an alkyl sulfinyl group are the electron attractive groups.

When $X^{11}$ and $X^{12}$ both represent an oxygen atom, it is especially preferred that $R^{11}$, $R^{12}$ $R^{13}$ and $R^{14}$ represent independently of each other a hydrogen atom, an alkyl group, a halogen atom, a cyano group, a nitro group, an alkoxy group, an alkylthio group, an amino group, an alkylamino group, anamide group, a sulfonamide group, a sulfamoylamino group, an alkoxycarbonylamino group, an alkoxysulfonylamino group, an ureido group, a thioureido group, an acyl group, an alkoxycarbonyl group, a carbamoyl group, an alkylsulfonyl group, an alkylsulfinyl group, or a sulfamoyl group with at least two of these groups or atoms being electron attractive groups or atoms.

It is most preferred that $R^{11}$, $R^{12}$, $R^{13}$ and $R^{14}$ represent independently of each other a hydrogen atom, an alkyl group having 1 to 6 carbon atoms, a halogen atom, a cyano group, a nitro group, an alkoxy group having 1 to 6 carbon atoms, an alkylthio group having 1 to 6 carbon atoms, an amide group having 1 to 6 carbon atoms, a sulfonamide group having 1 to 6 carbon atoms, an ureido group having 1 to 6 carbon atoms, an acyl group having 1 to 6 carbon atoms, an alkoxycarbonyl group having 2 to 6 carbon atoms, a carbamoyl group having 1 to 6 carbon atoms, an alkylsulfonyl group having 1 to 6 carbon atoms, or an alkylsulfinyl group having 1 to 6 carbon atoms with at least two of $R^{11}$, $R^{12}$, $R^{13}$ and $R^{14}$ represent a halogen atom, a cyano group, an alkylsulfonyl group, or an alkylsulfinyl group.

When $X^{11}$ and $X^{12}$ both represent $=CR^9R^{10}$, it is preferred that the organic oxidizing agent be a compound represented by the following general formula (IV-2).

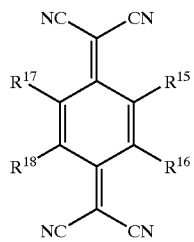

General formula (IV-2)

wherein $R^{11}$, $R^{16}$, $R^{17}$ and $R^{18}$ are the same as $R^{11}$, $R^{12}$, $R^{13}$ and $R^{14}$.

It is most preferred that the organic oxidizing agent be a compound represented by the following general formula (IV-3) or (IV-4).

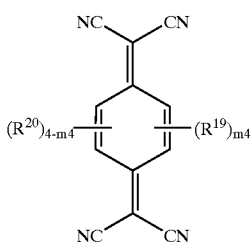

General formula (IV-3)

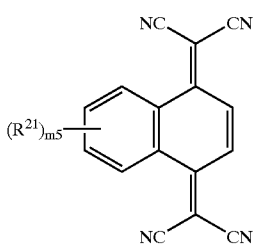

General formula (IV-4)

In the general formula (IV-3), $R^{19}$ represents a halogen atom, a cyano group, an alkoxy group, an alkylthio group, an amide group, a sulfonamide group, an ureido group, an acyl group or an alkoxycarbonyl group. $R^{20}$ represents the same substituent groups or atoms as those represented by the aforesaid $R^1$ to $R^3$. m4 represents an integer 1 to 4, and when m4 or 4-m4 represents an integer not smaller than 2, that is, when there are a plurality of $R^{19}$'s or $R^{20}$'s, they may be either equal to each other or different from each other.

In the general formula (IV-4), $R^{21}$ represents a hydrogen atom or a substituent group. The substituent group may be the same substituent groups as those represented by the aforesaid $R^1$ to $R^3$. m5 represents an integer 0 to 6, and when m5 represents an integer not smaller than 2, that is, when there are a plurality of $R^{21}$'s, they may be either equal to each other or different from each other.

Preferred combinations of $R^{19}$ and $R^{20}$ in the general formula (IV-3) will be described, hereinbelow.

It is preferred that $R^{19}$ represents a halogen atom, a cyano group, an alkoxy group having 1 to 6 carbon atoms, an acyl group having 1 to 8 carbon atoms or an alkoxycarbonyl group having 2 to 6 carbon atoms with $R^{20}$ representing a hydrogen atom or an alkyl group having 1 to 6 carbon atoms, and it is most preferred that $R^{19}$ represents an alkoxy group having 1 to 6 carbon atoms with $R^{20}$ representing a hydrogen atom.

It is especially preferred that the organic oxidizing agent be a compound represented by the following formula.

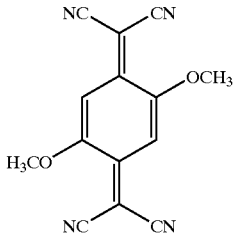

In the general formula (IV-4), $R^{21}$ preferably represents a hydrogen atom, an alkyl group, a halogen atom, a cyano group, an alkoxy group, an alkylthio group, an amide group, a sulfonamide group, an ureido group or an acyl group, and more preferably a hydrogen group, an alkyl group having 1 to 6 carbon atoms, a halogen atom, a cyano group, an alkoxy group having 1 to 6 carbon atoms, an alkylthio group having 1 to 6 carbon atoms, an amide group having 1 to 6 carbon atoms, a sulfonamide group having 1 to 6 carbon atoms, an ureido group having 1 to 6 carbon atoms or an acyl group having 1 to 6 carbon atoms. It is further preferred that $R^{21}$ represents a hydrogen atom, an alkyl group having 1 to 6 carbon atoms, a fluorine atom, a chlorine atom, a bromine atom, a cyano group, an alkoxy group having 1 to 6 carbon atoms, and it is most preferred that $R^{21}$ represents a hydrogen atom.

Specific examples of the organic oxidizing agents employed in this invention are as follows.

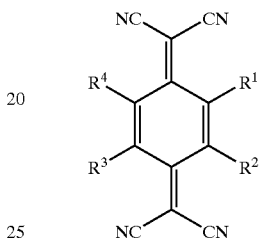

wherein specific examples of $R^1$, $R^2$, $R^3$ and $R^4$ are as follows.

| compound No. | $R^1$ | $R^2$ | $R^3$ | $R^4$ |
|---|---|---|---|---|
| A-1 | H | H | H | H |
| A-2 | | H | H | H |
| A-3 | $CH_3$ | H | $OCH_3$ | H |
| A-4 | $OCH_3$ | H | $OCH_3$ | H |
| A-5 | $C_{18}H_{37}$ | H | H | H |
| A-6 | F | H | H | H |
| A-7 | Cl | H | H | H |
| A-8 | Br | H | H | H |
| A-9 | $OCH_3$ | H | H | H |
| A-10 | $CH_2Ph$ | H | H | H |
| A-11 | $CH_2CO_2H$ | H | H | H |
| A-12 | $OC_2H_5$ | H | $OC_2H_5$ | H |
| A-13 | $OC_2H_5$ | H | $SCH_3$ | H |
| A-14 | Cl | H | Cl | H |
| A-15 | $CH_3$ | H | Br | H |
| A-16 | $CH_3$ | H | $CH_3$ | H |
| A-17 | $CO_2CH_3$ | H | H | H |
| A-18 | $COC_{11}H_{23}$ | H | H | H |
| A-19 | Br | H | $OCH_2CH_2OH$ | H |
| A-20 | $CH_3$ | $CH_3$ | $CH_3$ | $CH_3$ |
| A-21 | $CH_3$ | $OCH_3$ | $CH_3$ | $OCH_3$ |
| A-22 | F | H | F | H |
| A-23 | F | F | F | F |
| A-24 | CN | H | CN | H |
| A-25 | $CO_2CH_3$ | H | $CO_2CH_3$ | H |
| A-26 | Cl | $NHCOC_{11}H_{23}$ | Cl | $NHCOC_{11}H_{23}$ |

A-27

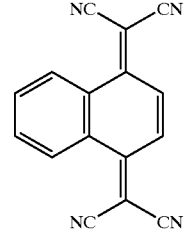

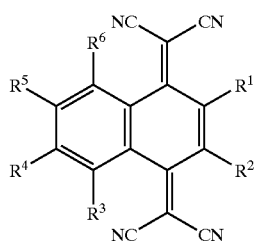
wherein specific examples of $R^1$, $R^2$, $R^3$, $R^4$, $R^5$ and $R^6$ are as follows.
| No. | $R^1$ | $R^2$ | $R^3$ | $R^4$ | $R^5$ | $R^6$ |
|---|---|---|---|---|---|---|
| A-28 | $CH_3$ | H | H | H | H | H |
| A-29 | $CH_3$ | Cl | H | H | H | H |
| A-30 | $CH_3$ | $CH_3$ | H | H | H | H |
| A-31 | H | H | H | $OCH_3$ | H | H |
| A-32 | H | H | H | $C_8H_{17}$ | H | H |
| A-33 | H | H | H | $SCH_3$ | H | H |
A-34
A-35
A-36
A-37
A-38
A-39
A-40
wherein specific examples of $R^1$, $R^2$, $R^3$ and $R^4$ are as follows.
| No. | $R^1$ | $R^2$ | $R^3$ | $R^4$ |
|---|---|---|---|---|
| A-41 | H | H | H | H |
| A-42 | H | $CO_2CH_3$ | H | H |
| A-43 | | | | |

-continued

| No. | R¹ | R² | R³ | R⁴ |
|---|---|---|---|---|
| A-44 | | 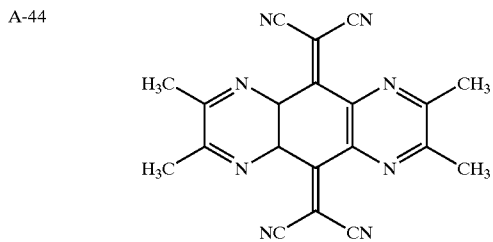 | | |
| A-45 | | 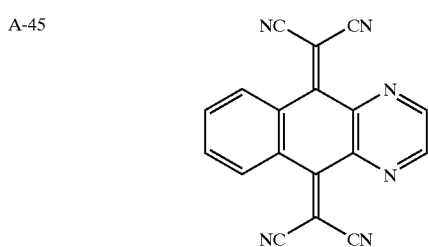 | | |
| A-46 | | 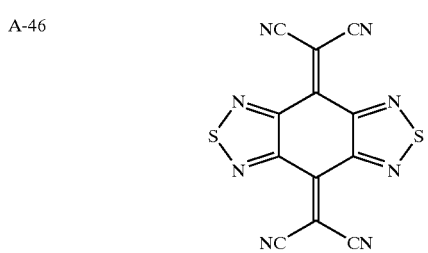 | | |
| A-47 | | 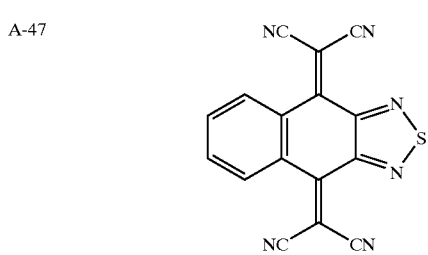 | | |
| A-48 | | 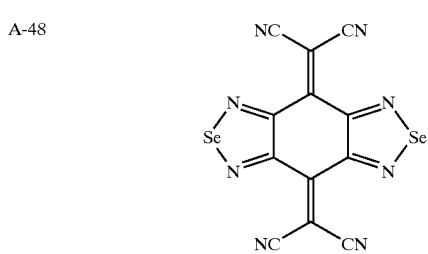 | | |
| A-49 | | 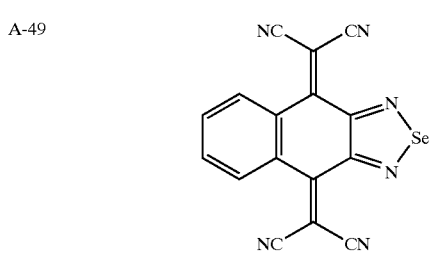 | | |

-continued

| No. | R¹ | R² | R³ | R⁴ |
|---|---|---|---|---|
| A-50 | | 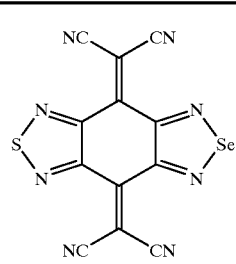 | | |
| A-51 | | 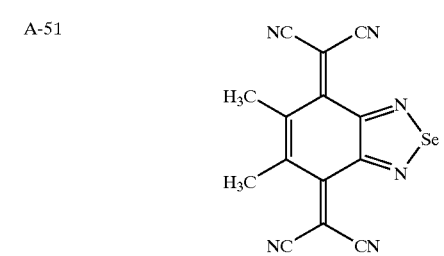 | | |

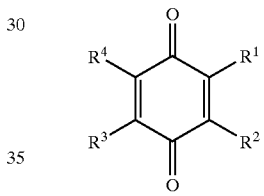

wherein specific examples of $R^1$, $R^2$, $R^3$ and $R^4$ are as follows.

| No. | R¹ | R² | R³ | R⁴ |
|---|---|---|---|---|
| A-52 | Cl | Cl | Cl | Cl |
| A-53 | Cl | H | Cl | H |
| A-54 | F | F | F | F |
| A-55 | Cl | Cl | Cl | NHCOCH₃ |
| A-56 | Cl | Cl | Cl | ![N(COCH₃)(C₁₀H₂₁)] |
| A-57 | Cl | NHCOC₅H₁₁ | Cl | NHCOC₅H₁₁ |
| A-58 | Cl | NHCOC₁₁H₂₃ | Cl | NHCOC₁₁H₂₃ |
| A-59 | Cl | NHCONHC₂H₅ | Cl | NHCONHC₂H₅ |
| A-60 | Cl | NHSO₂CH₃ | Cl | NHSO₂CH₃ |
| A-61 | Cl | CO₂C₂H₅ | Cl | CO₂C₂H₅ |
| A-62 | Cl | CONHC₈H₁₇ | Cl | CONHC₈H₁₇ |
| A-63 | Cl | H | SC₂H₅ | H |
| A-64 | H | H | H | H |
| A-65 | CO₂C₂H₅ | CO₂C₂H₅ | CO₂C₂H₅ | CO₂C₂H₅ |
| A-66 | COC₈H₁₇ | COC₈H₁₇ | COC₈H₁₇ | COC₈H₁₇ |
| A-67 | CO₂C₂H₅ | H | CO₂C₂H₅ | H |
| A-68 | SC₁₂H₂₅ | H | H | H |
| A-69 | Cl | Cl | CN | CN |

-continued

| No. | R¹ | R¹ | R³ | R⁴ |
|---|---|---|---|---|
| A-70 | | | | |

[Structure A-70: quinone with H₃CNHSO₂NH, Cl, NHSO₂NHCH₃, Cl substituents]

[Structure A-71: quinone with Br, Br, Br, OCOC₂H₅ substituents]

[Structure A-72: quinone with H₅C₂O₂CNH, Br, Br, NHCO₂C₂H₅ substituents]

[Structure A-73: quinone with Cl, Cl, Cl, and N-octylimidazole substituents]

[Structure A-74: tetrachloro-1,4-benzoquinone]

[General structure: benzoquinone with R¹, R², R³, R⁴ substituents]

wherein specific examples of R¹, R², R³ and R⁴ are as follows.

| No. | R¹ | R² | R³ | R⁴ |
|---|---|---|---|---|
| A-75 | SO₂C₂H₅ | SO₂C₂H₅ | SO₂C₂H₅ | SO₂C₂H₅ |
| A-76 | SO₂C₂H₅ | SO₂C₂H₅ | SO₂C₂H₅ | OC₂H₅ |
| A-77 | SO₂C₂H₅ | OC₂H₅ | SO₂C₂H₅ | OC₂H₅ |
| A-78 | SO₂C₂H₅ | H | SO₂C₂H₅ | H |

-continued

| No. | R¹ | R² | R³ | R⁴ |
|---|---|---|---|---|
| A-79 | C₂H₅ | SOC₂H₅ | SOC₂H₅ | SOC₂H₅ |
| A-80 | SO₂Ph | SO₂Ph | SO₂Ph | Cl |
| A-81 | SO₂Ph | SO₂Ph | CN | CN |
| A-82 | SO₂Ph | SO₂Ph | SO₂Ph | SO₂Ph |
| A-83 | SCF₃ | SCF₃ | SCF₃ | SCF₃ |
| A-84 | SOCF₃ | SOCF₃ | SOCF₃ | SOCF₃ |
| A-85 | SO₂CF₃ | SO₂CF₃ | SO₂CF₃ | SO₂CF₃ |
| A-86 | SO₂CF₃ | H | SO₂CF₃ | H |
| A-87 | H | H | SO₂CF₃ | H |
| A-88 | Cl | SO₂CF₃ | SO₂CF₃ | Cl |
| A-89 | | | | |

[Structure A-89: anthraquinone]

[Structure A-90: 1,4,5,8-tetrachloroanthraquinone]

[Structure A-91: trichloroanthraquinone]

[Structure A-92: 1,4-naphthoquinone]

[Structure A-93: 2,3-dichloro-1,4-naphthoquinone]

[Structure A-94: tetrachloro-benzo[g]quinoxaline-5,10-dione]

-continued

| No. | R¹ | R² | R³ | R⁴ |
|---|---|---|---|---|
| A-95 | | | | |
| A-96 | | | | |
| A-97 | | | | |
| A-98 | | | | |
| A-99 | | | | |
| A-100 | | | | |
| A-101 | | | | |

-continued

| No. | R¹ | R² | R³ | R⁴ |
|---|---|---|---|---|
| A-102 | | | | |
| A-103 | | | | |
| A-104 | | | | |
| A-105 | | | | |
| A-106 | | | | |
| A-107 | | | | |
| A-108 | | | | |

-continued
| No. | R¹ | R² | R³ | R⁴ |
|---|---|---|---|---|
| A-109 | | | 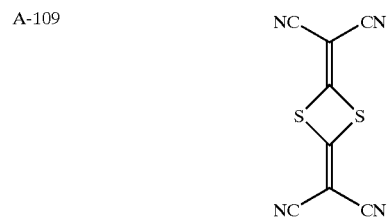 | |
| A-110 | | | 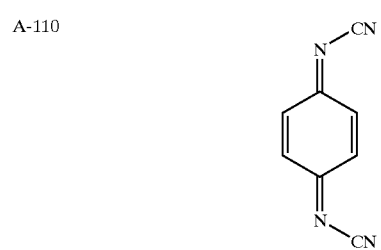 | |
| A-111 | | | 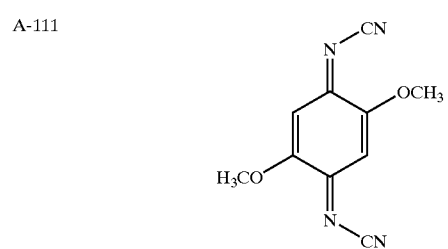 | |
| A-112 | | | 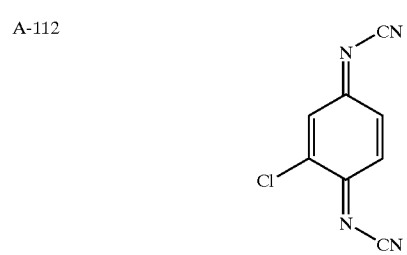 | |
| A-113 | | | 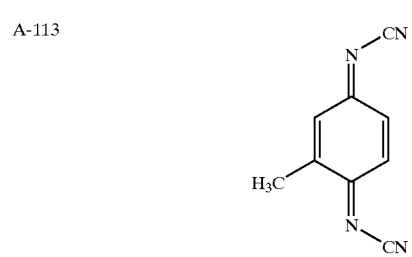 | |
| A-114 | | | 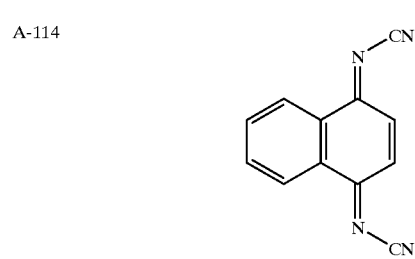 | |
-continued
| No. | R¹ | R² | R³ | R⁴ |
|---|---|---|---|---|
| A-115 | | | 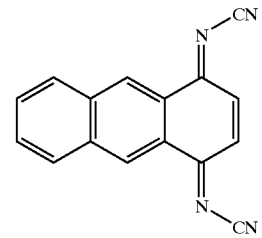 | |
| A-116 | | | 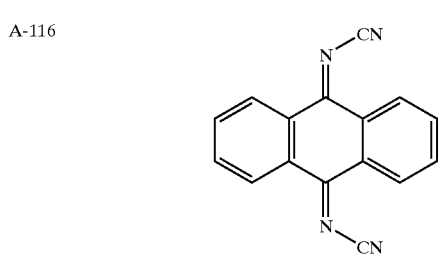 | |
| A-117 | | | 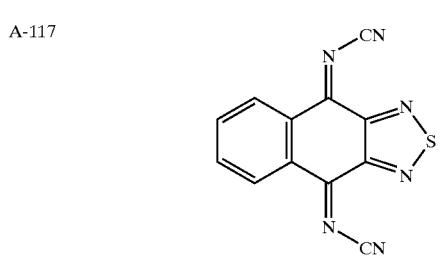 | |
| A-118 | | | 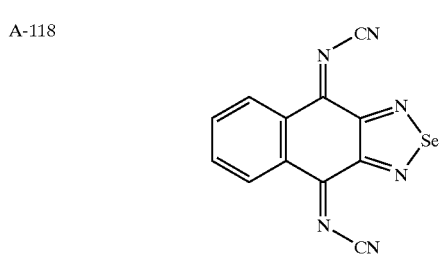 | |
| A-119 | | | 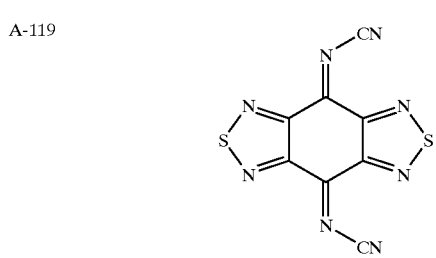 | |
| A-120 | | | 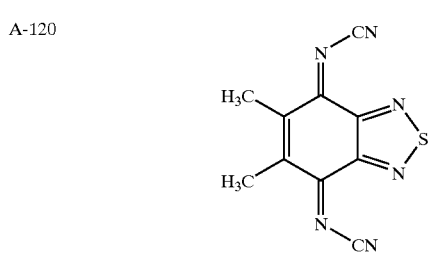 | |

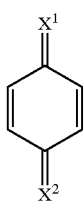

wherein specific examples of $X^1$ and $X^2$ are as follows.

| No. | $X^1$ | $X^2$ |
|---|---|---|
| A-121 | $NC_8H_{17}$ | $NC_8H_{17}$ |
| A-122 | $N^+(C_5H_{11})_2$ | O |
| A-123 | | (structure) |
| A-124 | | (structure) |

(structure with $R^1$, $R^2$, $R^3$, $R^4$ on quinodimethane)

wherein specific examples of $R^1$, $R^2$, $R^3$ and $R^4$ are as follows.

| No. | $R^1$ | $R^2$ | $R^3$ | $R^4$ |
|---|---|---|---|---|
| A-125 | CN | $CO_2CH_3$ | CN | $CO_2CH_3$ |
| A-126 | CN | $CO_2C_4H_9$ | CN | $CO_2C_4H_9$ |
| A-127 | CN | $CO_2C_{11}H_{23}$ | CN | $CO_2C_{11}H_{23}$ |
| A-128 | $CO_2C_2H_5$ | $CO_2C_2H_5$ | $CO_2C_2H_5$ | $CO_2C_2H_5$ |
| A-129 | $COCH_3$ | $COCH_3$ | $COCH_3$ | $COCH_3$ |
| A-130 | $SO_2C_2H_5$ | $SO_2C_2H_5$ | $SO_2C_2H_5$ | $SO_2C_2H_5$ |
| A-131 | Cl | Cl | CN | CN |

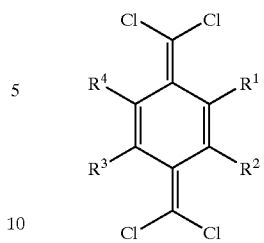

wherein specific examples of $R^1$, $R^2$, $R^3$ and $R^4$ are as follows.

| No. | $R^1$ | $R^2$ | $R^3$ | $R^4$ |
|---|---|---|---|---|
| A-132 | H | H | H | H |
| A-133 | Cl | Cl | Cl | Cl |
| A-134 | Cl | H | Cl | H |

A-135 (structure)

A-136 (structure)

A-137 (structure)

A-138 (structure)

A-139 (structure)

-continued

A-140
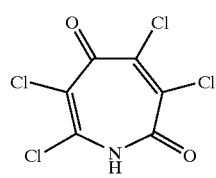

A-141
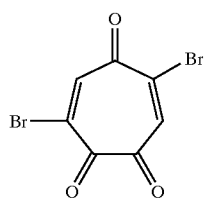

A-142
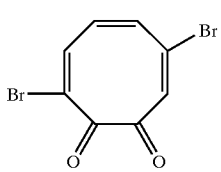

A-143
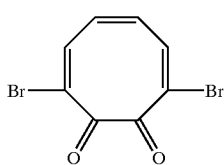

A-144
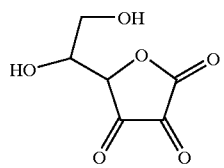

A-145
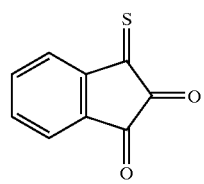

A-146
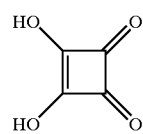

A-147
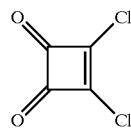

The compounds represented by the general formula (IV) can be easily synthesized in light of a general method of synthesis such as disclosed in "J. Chem. Soc. PerkinTrans.", 1,611(1992), Synthesis, 546(1971) or in accordance with the following examples.

EXAMPLE 1

Compound A-22 was synthesized in accordance with the following formula.

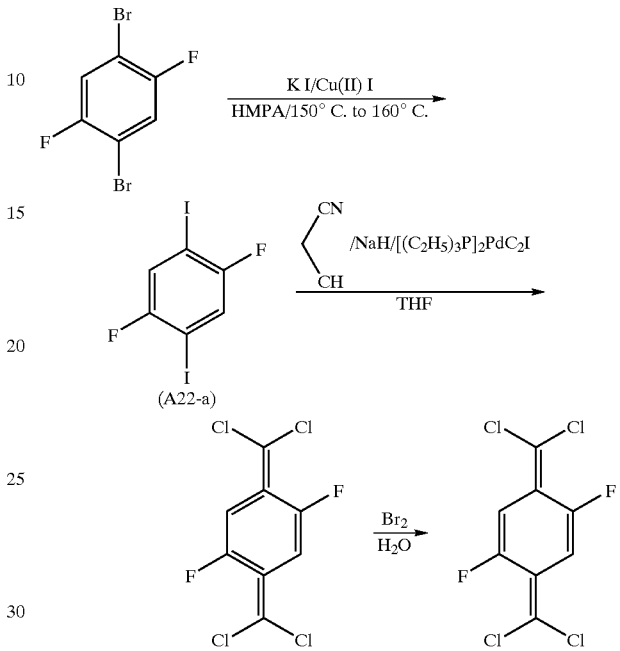

2.72 g of 1,4-dibromo-2,5-difluorobenzene, 24.9 g of potassium iodide, 9.53 g of copper iodide and 30 ml of HMPA (hexamethylphosphorictriamide) were mixed and heated to 150 to 160° C. in an atmosphere of nitrogen. After the end of reaction, dilute hydrochloric acid and ether were introduced into the reaction solution and copper salt was separated out. Thereafter an organic layer was extracted. The organic layer was washed with aqueous sulfurous acid, dried with sodium sulfate, and filtered. Then the filtrate was condensed under vacuum and 2.93 g of yellow crystals (A-22a) were obtained.

60 ml of THF (tetrahydrofuran) was added to 3.66 g of A-22a, 2.64 g of malononitrile, 1.44 g of sodium hydride and 0.21 g of bistriphenylphosphinepalladium chloride and the mixture was heated at the reflux temperature for 12 hours. After the end of reaction, the reaction solution was poured into 1N hydrochloric acid. Then white precipitate was filtered and dried, whereby 2.68 g of white solid (A-22b) was obtained.

100 ml of water was added to 3.36 g of (A-22b) and an excess amount of aqueous bromide was slowly dropped into the suspension. After leaving to stand for one night, obtained red precipitate was filtered, washed with cool water and then dissolved in 60 ml of methylene chloride. Then the solution was dried with sodium sulfate and was subjected to activated carbon treatment, thereby removing solvent and obtaining compound (A-22) in the form of yellow crystals.

EXAMPLE 2

Compound A-58 was synthesized in accordance with the following formula.

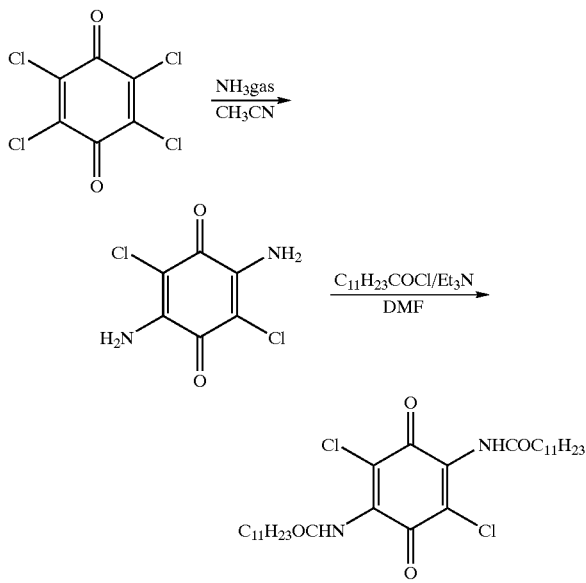

25.0 g of chloranil was dissolved in 60 ml of acetoanilil and ammonia gas was continuously introduced into the resulting suspension. Blown solid thus obtained was filtered, washed with water and then with acetonitrile, and then dried under vacuum, whereby 19.6 g of compound (A-58a) was obtained.

100 ml of DMF was added to 2.1 g of compound (A-58a), 4.4 g of lauryl chloride and 2.8 ml of triethylamine and the mixture was heated at 70° C. for 7 hours, Thereafter heated mixture was poured in 300 ml of cool water and the reaction product was extracted with methyl acetate. Then the extracted product was dried with sodium sulfate and condensed, and 1.7 g of compound (A-58) in the form of yellow crystals was obtained by recrystalization by acetonitrile.

The organic oxidizing agent represented by the aforesaid general formula (IV) may be used either alone or together with other known quenchers.

Typical quenchers which may be used together with the organic oxidizing agent represented by the aforesaid general formula (IV) include metal complexes, diimmonium salts and aminium salt represented by general formula (III), (IV) or (V) in Japanese Unexamined Patent Publication No. 3(1991)-224793 and nitroso compounds disclosed in Japanese Unexamined Patent Publication Nos. 2(1990)-300287 and 2(1990)-300288. Among these quenchers, metal complexes (e.g., PA-106: Mitui Toatsu Fine Inc.) and diimmoniumsalts (e.g., IRG-023, IRG-022: Nippon Kayaku Inc.) are especially preferred and diimmonium salts are most preferred. A plurality of these quenchers may be used according to the purpose.

The organic oxidizing agent represented by the general formula (IV) is used preferably in an amount of 1 to 100 parts by weight per 100 parts by weight of the organic dye, more preferably in an amount of 1 to 50 parts by weight per 100 parts by weight of the organic dye, especially preferably in an amount of 1 to 25 parts by weight per 100 parts by weight of the organic dye, and most preferably in an amount of 1 to 10 parts by weight per 100 parts by weight of the organic dye.

The aforesaid quencher is used preferably in an amount of 1 to 100 parts by weight per 100 parts by weight of the organic dye, more preferably in an amount of 1 to 50 parts by weight per 100 parts by weight of the organic dye, especially preferably in an amount of 1 to 25 parts by weight per 100 parts by weight of the organic dye, and most preferably in an amount of 1 to 10 parts by weight per 100 parts by weight of the organic dye.

The organic dye which may be employed in the present invention will be described in detail hereinbelow.

For example, there may be used cyanine dyes, merocyanine dyes, phthalocyanine dyes, oxocol dyes, pyrylium dyes, thiopyrylium dyes, triarylmethane dyes, polymethine dyes, squarium dyes, azulenium dyes, naphthoquinone dyes, anthraquinone dyes, indophenol dyes, indoaniline dyes, aminium dyes, diimmonium dyes and pyran dyes.

Symmetric and asymmetric cyanin dyes represented by the aforesaid general formula (III) will be described in detail hereinbelow. The nucleus formed by $Z^1$ and $Z^2$ in the general formula (III) includes, for instance, a 3,3-dialkylindolenyn nucleus, 3,3-dialkylbenzoindolenyn nucleus, a thiazole nucleus, benzothiazole nucleus, naphthathiazole nucleus, thiazoline nucleus, oxazole nucleus, benzooxazole nucleus, naphthaoxazole nucleus, oxazoline nucleus, selenazole nucleus, benzoselenazole nucleus, naphthaselenozole nucleus, selenazoline nucleus, tellurazole nucleus, benzotellurazole nucleus, naphthatellurazole nucleus, tellurazoline nucleus, imidazole nucleus, benzoimidazole nucleus, naphthaimidazole nucleus, pyridine nucleus, quinoline nucleus, isoquinoline nucleus, imidazo[4,5-b]quinoxaline nucleus, oxadiazole nucleus, thiadiazole nucleus, tetrazole nucleus and pyrimidine nucleus. These five- or six-membered nitrogen-containing heterocycles may have a substituent group, if possible. Such a substituent group includes the same substituent groups as those represented by $R^1$, $R^2$ and $R^3$ in the aforesaid general formula (IV).

Examples of the substituent groups will be described in more detail, hereinbelow.

A straight-chain, cyclic or branched alkyl group which has 1 to 18 (preferably 1 to 8) carbon atoms and may have a substituent group. Such an alkyl group includes methyl, ethyl, propyl, isopropyl, butyl, isobutyl, pentyl, 2-hydroxyethyl, 3-hydroxypropyl, 4-carboxybutyl, hexyl, octyl, benzyl, phenetyl and the like.

A straight-chain, cyclic or branched alkenyl group having 2 to 18 (more preferably 2 to 8) carbon atoms. Such an alkenyl group includes vinyl, allyl, 1-propenyl, 2-pentenyl, 1,3-butadienyl, 2-octenyl and the like.

An aralkyl group having 7 to 10 carbon atoms such as benzyl.

An aryl group which has 6 to 10 carbon atoms and may have a substituent group. Such an aryl group includes phenyl, naphthyl, 4-carboxyphenyl, 3,5-dicarboxyphenyl, 4-methanesulfonamidephenyl, 4-butanesulfonamidephenyl and the like.

A five- or six-membered saturated or unsaturated heterocycle composed of carbon atom, nitrogen atom, oxygen atom and/or sulfur atom. The number of hetero atoms and kinds of elements forming the heterocyle may be single or plural. Such a heterocycle includes oxazole ring, benzooxazole ring, 5-carboxybenzooxazole ring, thiazole ring, imidazole ring, pyridine ring, sulfolane ring, furan ring, thiophene ring, pyrazole ring, pyrrole ring, chroman ring, coumarin ring and the like.

A halogen atom such as F atom, Cl atom, Br atom or the like.

An alkoxy group having 1 to 18 (preferably 1 to 8) carbon atoms. Such an alkoxy group includes methoxy, ethoxy, propoxy, butoxy, and the like.

An arylkoxy group which has 6 to 10 carbon atoms and may have a substituent group. Such an aryloxy group includes phenoxy, p-methoxyphenoxy and the like.

An alkylthio group having 1 to 18 (preferably 1 to 8) carbon atoms. Such an alkylthio group includes methylthio, ethylthio, and the like.

An arylthio group having 6 to 10 carbon atoms. Such an arythio group includes phenylthio and the like.

An acyloxy group having 1 to 18 (preferably 1 to 8) carbon atoms. Such an acyloxy group includes acetoxy, propanoyloxy, pentanoyloxy, octanoyloxy and the like.

An alkylamino group having 1 to 18 (preferably 1 to 8) carbon atoms. Such an alkylamino group includes methylamino, dimethylamino, diethylamino, dibutylamino, octylamino and the like.

An amide group having 1 to 18 (preferably 1 to 8) carbon atoms. Such an amide group includes acetamide, propanoylamino, pentanoylamino, octanoylamino, octanoylmethylamino, benzamino and the like.

A sulfonamide group having 1 to 18 (preferably 1 to 8) carbon atoms. Such an sufonamide group includes methanesulfonamide, ethanesulfonamide, propylsulfonamide, butanesulfonamide, bezenesulfonamide, and the like.

An alkoxycarbonylamino group having 1 to 18 (preferably 1 to 8) carbon atoms. Such an alkoxycarbonylamino group includes methoxycarbonylamino, ethoxycarbonylamino and the like.

An alkoxysulfonylamino group having 1 to 18 (preferably 1 to 8) carbon atoms. Such an alkoxysulfonylamino group includes methoxysulfonylamino, ethoxysulfonylamino and the like.

A sulfamoylamino group having 0 to 18 (preferably 0 to 8) carbon atoms. Such a sulfamoylamino group includes methylsulfamoylamino, dimethylsulfamoylamino, ethylsulfamoylamino, propylsulfamoylamino, octylsulfamoylamino and the like.

An ureido group which has 1 to 18 (preferably 1 to 8) carbon atoms and may have a substituent group. Such an ureido group includes ureido, methylureido, N,N-dimethylureido, octylureido and the like.

A thioureido group which has 1 to 18 (preferably 1 to 8) carbon atoms and may have a substituent group. Such a thioureido group includes thioureido, methythioureido, N,N-dimethylthioureido, octylthioureido and the like.

An acyl group having 1 to 18 (preferably 1 to 8) carbon atoms. Such an acyl group includes acetyl, benzoyl, propanoyl and the like.

An alkoxycarbonyl having 1 to 18 (preferably 1 to 8) carbon atoms such as methoxycarbonyl, ethoxycarbonyl, octyloxycarbonyl and the like.

A carbamoyl group which has 1 to 18 (preferably 1 to 8) carbon atoms and may have a substituent group. Such a carbamoyl group includes carbamoyl, N,N-dimethylcarbamoyl, N-ethylcarbamoyl and the like.

An alkylsulfonyl group or arylsulfonyl group having 1 to 18 (preferably 1 to 8) carbon atoms such as methanesulfonyl, ethanesulfonyl, benzenesulfonyl and the like.

An alkylsulfinyl group having 1 to 18 (preferably 1 to 8) carbon atoms. Such an alkylsulfinyl group includes methanesulfinyl, ethanesulfinyl, octanesulfinyl, and the like.

A sulfamoyl group which has 0 to 18 (preferably 0 to 8) carbon atoms and may have a substituent group. Such a sulfamoyl group includes a sulfamoyl, dimethylsulfamoyl, ethylsulfamoyl, butylsulfamoyl, octylsulfamoyl, phenylsulfamoyl and the like.

Preferably $Z^1$ and $Z^2$ are a substituted or non-substituted 3,3-dialkylindolenyn nucleus or 3,3-dialkylbenzoindolenyn nucleus.

$R^{30}$ and $R^{31}$ represent independently of each other an alkyl group.

The alkyl group represented by $R^{30}$ and $R^{31}$ is a substituted or non-substituted, straight-chain, cyclic or branched, alkyl group having 1 to 18 (more preferably 1 to 8) carbon atoms. The substituent groups for the alkyl groups are the same as those listed above as the substituent groups for the aforesaid nitrogen-containing heterocycles. Preferably the substituent group is a non-substituted alkyl group, an aryl group, a halogen atom, a hydroxy group, an alkoxy group, an acyloxy group, an amide group, a sulfonamide group, an alkoxycarbonyl group or an alkyl group substituted by a carboxyl group or a sulfo group. Examples of these substituent groups include methyl, ethyl, propyl, butyl, isobutyl, 2-ethylhexyl, octyl, benzyl, 2-phenylethyl, 2-hydroxyethyl, 3-hydroxypropyl, 2-carboxyethyl, 3-carboxypropyl, 4-carobxybutyl, carboxymethyl, 2-methoxyethyl, 2-(2-methoxyethoxy)ethyl, 2-sulfoethyl, 3-sulfopropyl, 3-sulfobutyl, 4-sulfobutyl, 2-(3-sulfopropoxy)ethyl, 2-hydroxy-3-sulfopropyl, 3-sulfopropoxyethoxyethyl, 2-acetoxyethyl, carbomethoxymethyl, 2-methanesulfonylaminoethyl and the like.

The methyne groups represented by $L^3$, $L^4$, $L^5$, L6 and $L^7$ are a non-substituted or substituted methyne group independently of each other, and the substituent groups for the methyne groups are the same as those described above as the substituent groups for the aforesaid nitrogen-containing heterocycles. When the methyne groups have substituent groups, the substituent groups may be bonded together to form a five- to seven-membered ring or may be bonded to a promoter to form a ring such as cyclopentene ring, 1-dimethylcyclopentene ring, 1-diphenylaminocyclopentene ring, cyclohexene ring, 1-chlorocyclohexene ring, isophorone ring, 1-morpholinocyclopentene ring or cycloheptene ring.

It is preferred that one of n1 and n2 represents 0 and the other represents 2.

M1 represents a charge-balancing ion pair which may be either a cation or an anion.

Such a cation includes an alkaline metal ion such as a sodium ion, a potassium ion and a lithium ion and an organic ion such as a tetraalkylammonium ion and a pyridinium ion.

Such an anion may be either an inorganic ion or an organic ion and includes a halogen anion (e.g., a fluorine ion, a chlorine ion, a bromine ion or an iodine ion), a sulfonate ion (e.g., a methanesulfonic acid ion, a trifluorumethanesulfonic aid ion, a methylsulfuric acid ion, a p-toluenesulfonic acid ion, a p-chlorobenzenesulfonic acid ion, a 1,3-benzenedisulfonic acid ion, a 1,5-naphthalenedisulfonic acid ion or a 2,6-naphthalenedisulfonic acid ion), a sulfuric acid ion, a thiocyanic acid ion, a perchloric acid ion, a tetrafluoroborate ion, a picric acid ion, an acetic acid ion, a metal complex ion represented by the following formula:

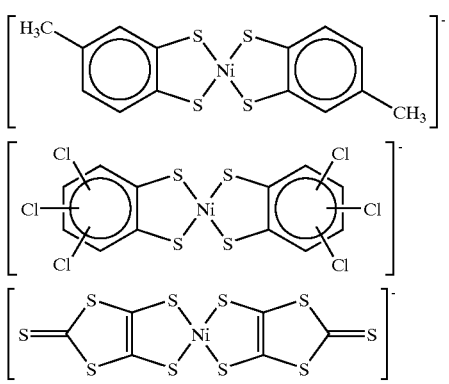

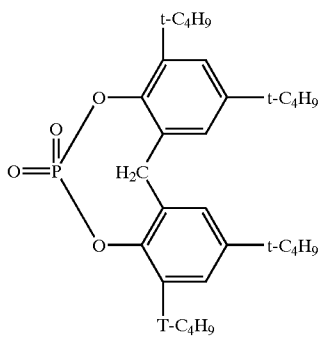

m1 represents a number of the charge-balancing ion pairs which is required to balance electric charges and should be not smaller than 0 and preferably 0 to 4. p and q represent independently of each other 0 or 1. Preferably p and q both represent 0.

Two kinds of compounds represented by the aforesaid general formula (III) may be bonded together on any carbon atom to form a bis-structure.

It is preferred that the organic dye be a cyanine dye represented by the following general (III-1).

General formula (III-1)

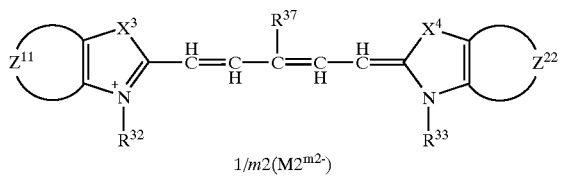

Among the cyanine dyes represented by the general formula (III-1), dyes formed by the following combinations are preferred.

That is, $X^3$ and $X^4$ are an oxygen atom, —C($R^{34}$)($R^{35}$)— or —N($R^{36}$)— independently of each other, wherein $R^{34}$, $R^{35}$ and $R^{36}$ are a non-substituted alkyl group having 1 to 6 carbon atoms independently of each other, $R^{32}$ and $R^{33}$ are a non-substituted or alkoxy group- or alkylthio group-substituted alkyl group having 1 to 6 carbon atoms, $R^{37}$ is a hydrogen atom, an alkyl group which may have a substituent group and has 1 to 6 carbon atoms, a phenyl group, a pyridyl group, a sccuinimide group, a benzoxazole group or a halogen atom, $Z^{11}$ and $Z^{12}$ are independently of each other a group of atoms required to form a benzene ring, a naphthalene ring or a quinoxaline ring or a group of atoms required to form a benzene ring substituted by one or two group selected from the group consisting of a methyl group, a chlorine atom, a fluorine atom, a methoxy group and an ethoxy group, and M2 is a perchloric acid ion, a hexafluorophosphoric acid ion, a metal complex ion represented by the following formula,

or a sulfonate ion represented by the following formula, m2 representing the valence of M2.

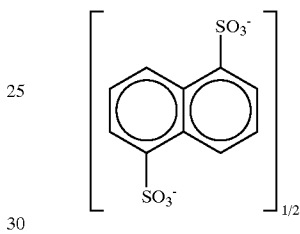

Among the cyanine dyes represented by the general formula (III-1), dyes formed by the following combinations are most preferred.

That is, $X^3$ and $X^4$ are both —C($R^{34}$)($R^{35}$)— or both —N($R^{36}$)—, wherein $R^{34}$, $R^{35}$ and $R^{36}$ are a methyl group or an ethyl group independently of each other, $R^{32}$ and $R^{33}$ are a non-substituted alkyl group, preferably a methyl group, an ethyl group, a propyl group, an isopropyl group or a butyl group, $R^{37}$ is a hydrogen atom, a methyl group, an ethyl group, a chlorine atom, or a bromine atom and $Z^{11}$ and $Z^{12}$ are both a group of atoms required to form a non-substituted benzene ring, naphthalene ring or quinoxaline ring.

Specific examples of the organic dyes which are represented by the general formula (III) and may be employed in this invention are as follows.

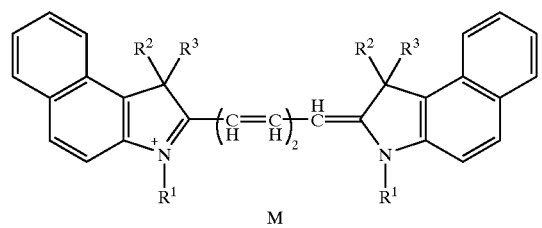

wherein specific examples of $R^1$, $R^2$, $R^3$ and M are as follows.

| No. | R¹ | R² | R³ | M |
|---|---|---|---|---|
| B-1 | CH₃ | CH₃ | CH₃ | ClO₄⁻ |
| B-2 | CH₃ | CH₃ | C₂H₅ | 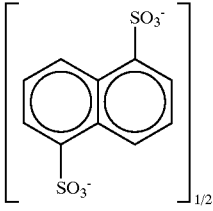 |
| B-3 | CH₃ | CH₃ | C₂H₅ | PF₆⁻ |
| B-4 | C₂H₅ | CH₃ | CH₃ |  |
| B-5 | n-C₃H₇ | CH₃ | CH₃ | CF₃SO₃⁻ |
| B-6 | n-C₄H₉ | CH₃ | CH₃ | ClO₄⁻ |
| B-7 | n-C₄H₉ | CH₃ | CH₃ | 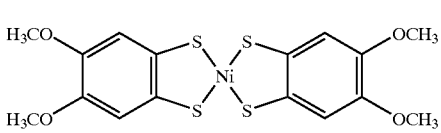 |
| B-8 | CH₂CH(CH₃)₂ | CH₃ | CH₃ | 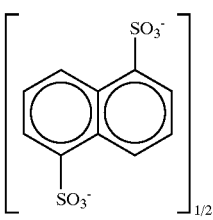 |
| B-9 | CH₂CH₂CF₂H | CH₃ | CH₃ | ClO₄⁻ |
| B-10 | CH₂CH(C₂H₅)-n-C₄H₉ | CH₃ | CH₃ | PF₆⁻ |
| B-11 | CH₃ | CH₃ | CH₃ | 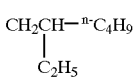 |
| B-12 | CH₂CH₂OC₂H₅ | CH₃ | CH₃ | ClO₄⁻ |
| B-13 | n-C₄H₉ | CH₃ | C₂H₅ | ClO₄⁻ |
| B-14 | n-C₄H₉ | CH₃ | C₂H₅ | PF₆⁻ |
| B-15 | C₂H₅ | CH₃ | C₂H₅ | ClO₄⁻ |

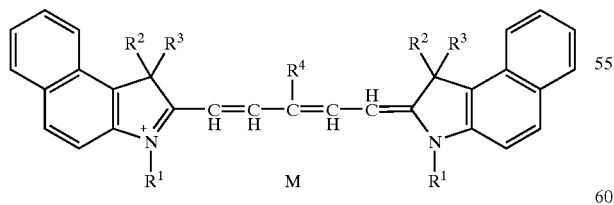

wherein specific examples of $R^1$, $R^2$, $R^3$, $R^4$ and M are as follows.

| No. | R¹ | R² | R³ | R⁴ | M |
|---|---|---|---|---|---|
| B-16 | $CH_3$ | $CH_3$ | $CH_3$ | $CH_3$ | $ClO_4^-$ |
| B-17 | $C_2H_5$ | $CH_3$ | $CH_3$ | $CH_3$ | 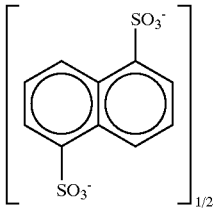 |
| B-18 | $n-C_3H_7$ | $CH_3$ | $CH_3$ | $CH_3$ | $ClO_4^-$ |
| B-19 | $n-C_4H_9$ | $CH_3$ | $CH_3$ | $CH_3$ | $ClO_4^-$ |
| B-20 | $CH_3$ | $CH_3$ | $CH_3$ | 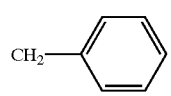 | $ClO_4^-$ |
| B-21 | $CH_3$ | $CH_3$ | $CH_3$ | 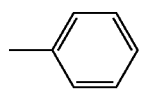 | $ClO_4^-$ |
| B-22 | $CH_3$ | $CH_3$ | $CH_3$ | 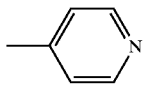 | $ClO_4^-$ |
| B-23 | $CH_3$ | $CH_3$ | $CH_3$ | 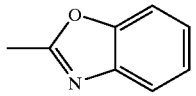 | $ClO_4^-$ |
| B-24 | $CH_3$ | $CH_3$ | $CH_3$ | Br | $ClO_4^-$ |
| B-25 | $CH_3$ | $CH_3$ | $CH_3$ | Cl | $ClO_4^-$ |
| B-26 | $CH_2CO_2C_2H_5$ | $CH_3$ | $CH_3$ | H | 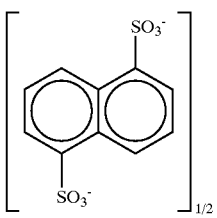 |
| B-27 | 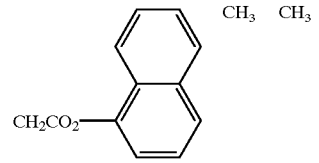 | $CH_3$ | $CH_3$ | H | $ClO_4^-$ |
| B-28 | 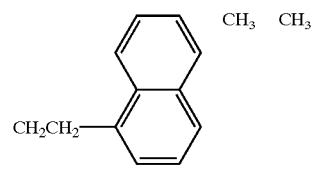 | $CH_3$ | $CH_3$ | H | $ClO_4^-$ |

-continued

| No. | R¹ | R² | R³ | R⁴ | M |
|---|---|---|---|---|---|
| B-29 | | | | | |

[Structure of B-29: bis-naphthoindolium pentamethine cyanine with CH₃/CH₃ gem-dimethyl groups, n-C₃H₇ and n-C₄H₉ on nitrogens, ClO₄⁻ counterion, connected by -(CH=CH)₂-CH= bridge]

[Structure showing bis-indolium cyanine with R², R³ gem-substituents, R⁴ on central methine, R¹ on N, counterion M]

wherein specific examples of $R^1$, $R^2$, $R^3$, $R^4$ and M are as follows.

| No. | R¹ | R² | R³ | R⁴ | M |
|---|---|---|---|---|---|
| B-30 | CH₃ | CH₃ | CH₃ | H | $CH_2\text{-}C_6H_4\text{-}SO_3^-$ |

-continued

| No. | R¹ | R² | R³ | R⁴ | M |
|---|---|---|---|---|---|
| B-31 | CH₃ | CH₃ | C₂H₅ | H | ClO₄⁻ |
| B-32 | C₂H₅ | CH₃ | CH₃ | CH₃ | ClO₄⁻ |

[Structure showing X-substituted bis-indolium pentamethine cyanine with R², R³ gem-substituents, R⁴ on central methine, R¹ on N, X on aromatic ring, counterion M]

wherein specific examples of $R^1$, $R^2$, $R^3$, $R^4$, X and M are as follows.

| No. | R¹ | R² | R³ | R⁴ | X | M |
|---|---|---|---|---|---|---|
| B-33 | C₂H₅ | CH₃ | CH₃ | $CH_2\text{-}C_6H_5$ | H | ClO₄⁻ |
| B-34 | n-C₃H₇ | CH₃ | CH₃ | H | H | 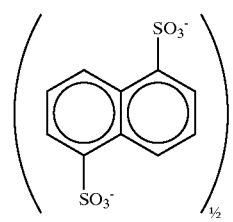 (naphthalene-1,5-disulfonate, ½) |
| B-35 | CH₂CH(CH₃)₂ | CH₃ | CH₃ | H | H | PF₆⁻ |
| B-36 | n-C₄H₉ | CH₃ | CH₃ | H | CH₃ | I⁻ |
| B-37 | CH₂CH₂OC₂H₅ | CH₃ | CH₃ | H | Cl | ClO₄⁻ |
| B-38 | n-C₃H₇ | CH₃ | CH₃ | CH₃ | OCH₃ | ClO₄⁻ |

-continued

| No. | R¹ | R² | R³ | R⁴ | X | M |
|---|---|---|---|---|---|---|
| B-39 | $CH_2CH(CH_3)_2$ | $CH_3$ | $CH_3$ | H | $SO_2NH_2$ | $ClO_4^-$ |
| B-40 | n-$C_3H_7$ | $CH_3$ | $CH_3$ | H | H | 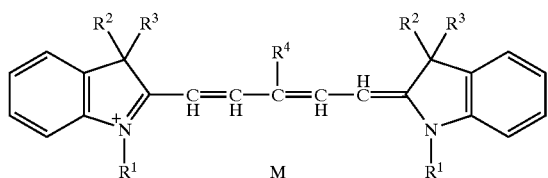 |
| B-41 | n-$C_4H_9$ | $CH_3$ | $CH_3$ | 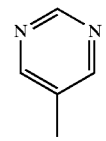 | H | $ClO_4^-$ |
| B-42 | n-$C_3H_7$ | $CH_3$ | $CH_3$ | $C_2H_5$ | Cl | $PF_6^-$ |
| B-43 | $CH_2CH(CH_3)_2$ | $CH_3$ | $CH_3$ | H | $CO_2C_2H_5$ | $PF_6^-$ |
| B-44 | n-$C_3H_7$ | $CH_3$ | $C_2H_5$ | H | H | $ClO_4^-$ |

![Structure 20]

wherein specific examples of R¹, R², R³, R⁴ and M are as follows.

| No. | R¹ | R² | R³ | R⁴ | M |
|---|---|---|---|---|---|
| B-45 | n-$C_3H_7$ | $CH_3$ | $C_2H_5$ | H | $PF_6^-$ |
| B-46 | $C_2H_5$ | $CH_3$ | $C_2H_5$ | H | $ClO_4^-$ |
| B-47 | n-$C_4H_9$ | $CH_3$ | $C_2H_5$ | H | $ClO_4^-$ |
| B-48 | $CH_3$ | $CH_3$ | $CH_3$ | Br | $ClO_4^-$ |
| B-49 | $CH_3$ | $CH_3$ | $CH_3$ | Cl | $ClO_4^-$ |
| B-50 | $CH_3$ | $CH_3$ | $CH_3$ | (pyrimidine) | $I^-$ |

-continued

| No. | R¹ | R² | R³ | R⁴ | M |
|---|---|---|---|---|---|
| B-51 | (structure shown: bis-indoline with Cl substituent, N-$CH_3$, $ClO_4^-$) | | | | |

![Benzothiazole structure]

wherein specific examples of R¹, R², R³, X and M are as follows.

| No. | R¹ | R² | R³ | X | M |
|---|---|---|---|---|---|
| B-52 | $C_2H_5$ | $C_2H_5$ | $CH_3$ | H | $I^-$ |
| B-53 | $CH_3$ | $CH_3$ | H | NHCO-Ph | $I^-$ |
| B-54 | $CH_3$ | $CH_3$ | H | $CH_3$ | 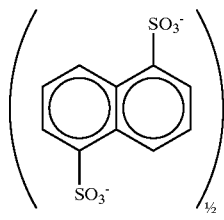 |

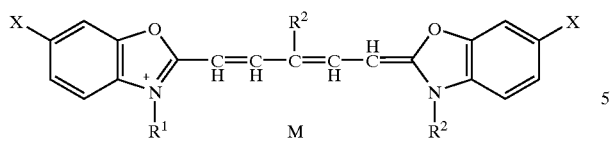

wherein specific examples of $R^1$, $R^2$, X and M are as follows.

| No. | $R^1$ | $R^2$ | X | M |
|---|---|---|---|---|
| B-55 | $CH_3$ | $CH_3$ | H | $I^-$ |
| B-56 | $C_2H_5$ | $C_2H_5$ | Br | ![naphthalene-1,5-disulfonate]½ |
| B-57 | $(CH_2)_2CO_2H$ | Br | $OCH_2CH_2OH$ (ester) | $Na^+$ |
| B-58 | \multicolumn{4}{c}{structure} |
| B-59 | \multicolumn{4}{c}{structure} |

B-58: benzoxazole-trimethine-benzothiazole with $H_3CO_2C$, $(CH_2)_3SO_3^-$ and $(CH_2)_3SO_3^-K^+$, $C_2H_5$ on central carbon, and $COCH_3$ substituent.

B-59: indoline-cyclohexenyl-benzothiazole with $H_3CNHCNH$ (O), $C_2H_5$, gem-dimethyl cyclohexene, $C_2H_5$, $NHCNHCH_3$ (O); counterion $I^-$.

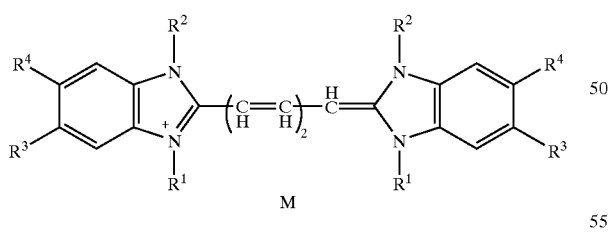

wherein specific examples of $R^1$, $R^2$, $R^3$, $R^4$ and M are as follows.

| No. | $R^1$ | $R^2$ | $R^3$ | $R^4$ | M |
|---|---|---|---|---|---|
| B-60 | $(CH_2)_4SO_3$ | | $CF_3$ | Cl | $K^+$ |
| B-61 | $(CH_2)_4SO_3^-$ | $C_2H_5$ | CN | Cl | $K^+$ |

-continued

| No. | R¹ | R² | R³ | R⁴ | M |
|---|---|---|---|---|---|

B-62, B-63, B-64, B-65, B-66, B-67 (chemical structures)

-continued
| No. | R¹ | R² | R³ | R⁴ | M |
|---|---|---|---|---|---|
| B-68 | | | | | |
| B-69 | | | | | |
| B-70 | | | | | |
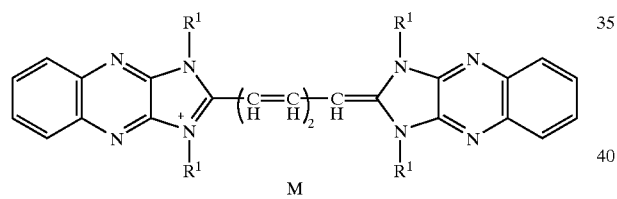
wherein specific examples of R¹ and M are as follows.
| No. | R¹ | M |
|---|---|---|
| B-71 | (CH₂)₃OC(=O)CH₃ | COl₄⁻ |
| B-72 | (CH₂)₃SCH₃ | COl₄⁻ |
| B-73 | (CH₂)₃SCH₃ | BF₄⁻ |
| B-74 | (CH₂)₃SCH₃ | BF₄⁻ |
| B-75 | | COl₄⁻ |

-continued

| No. | R¹ | M |
|---|---|---|
| B-76 | | |
| B-77 | | |
| B-78 | | |
| B-79 | | |
| B-80 | | |
| B-81 | | |
| B-82 | | |

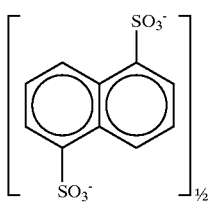

The compounds represented by the general formula (III) can be easily synthesized in light of the following papers.

F. M. Hamer, "Heterocyclic Compounds-Cyanine Dyes and Related Compounds", John Wiley & Sons, New York London, 1964; D. M. Sturmer, "Heterocyclic Compounds-Special topics in heterocyclic chemistry", chapter 18, section 14, pp. 482 to 515, John Wiley & Sons, New York London, 1977; and "Rodd's Chemistry of Carbon Compounds", (2nd Ed. vol. IV, part B, 1977, chapter 15, pp. 369 to 422, Elsvier Science Public Company Inc., New York.

Further, a photo-functional film formed of metal complex of azo dyes represented by the following general formula (V) may be also suitably employed in the present invention.

General formula (V)

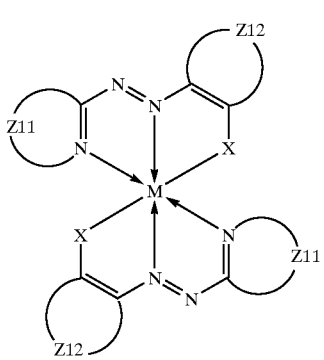

wherein M represents a metal atom, X represents an oxygen atom, a sulfur atom or $=NR^{21}$, $NR^{21}$ representing a hydrogen atom, an alkyl group, an aryl group, an acyl group, an alkylsulfonyl group or an arylsulfonyl group, $Z^{11}$ represents a group of atoms required to complete a five- or six-membered nitrogen-containing heterocycle, and $Z^{12}$ represents a group of atoms required to complete an aromatic ring or an aromatic heterocycle.

Among the compounds represented by the general formula (V), those represented by the following general formula (V-1) are preferred.

General formula (V-1)

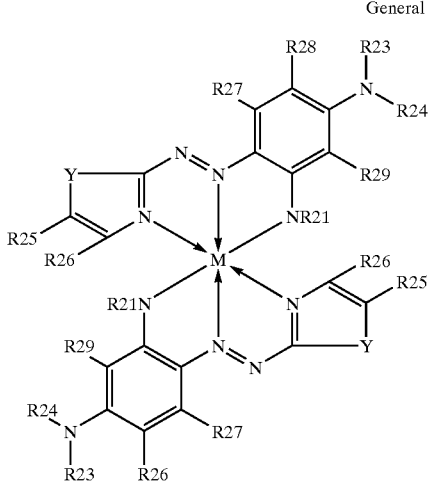

wherein M represents iron, cobalt, nickel, copper, zinc, palladium, platinum or gold, $R^{21}$ represents an alkyl sulfonyl group, an arylsulfonyl group, an alkyl group which may have a substituent group and has 1 to 12 carbon atoms or a phenyl group or a naphthyl group which may have a substituent group and has 6 to 16 carbon atoms, Y represents an oxygen atom, a sulfur atom or $=NR^{22}$, $R^{22}$, $R^{23}$ and $R^{24}$ represent independently of each other an alkyl group which may have a substituent group and has 1 to 12 carbon atoms, $R^{23}$ and $R^{24}$ may be bonded to form a ring, $R^{25}$ and $R^{26}$ represent independently of each other a hydrogen atom, a halogen atom, an alkyl group, an aryl group, a cyano group, an acyl group, an alkylsulfonyl group or an arylsulfonyl group, and $R^{27}$ and $R^{28}$ represent independently of each other a hydrogen atom, an alkyl group, an aryl group, a hydroxy group, an alkoxy group, an aryloxy group, an amino group, a carboamide group, a sulfonamide group, a cyano group, a halogen atom, an acyl group, an alkylsulfonyl group or an arylsulfonyl group.

Among the compounds represented by the general formula (V-1), those represented by the following general formula (V-2) are especially preferred.

General formula (V-2)

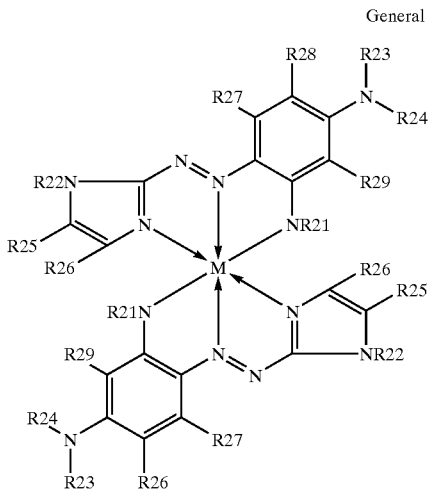

In the general formula (V-2), M is preferably iron, cobalt or nickel and more preferably nickel; $R^{21}$ is preferably an alkyl sulfonyl group which may have a substituent group and has 1 to 4 carbon atoms or an arylsulfonyl group whichmay have a substituent group and has 6 to 10 carbon atoms, and more preferably a non-substituted or fluorine-substituted alkylsulfonyl group having 1 to 4 carbon atoms (e.g., a methylsulfonyl group and a trifluoromethylsulfonyl group) or a non-substituted arylsulfonyl group having 6 to 10 carbon atoms such as a phenylsulfonnyl group; and $R^{22}$, $R^{23}$ and $R^{24}$ are preferably an alkyl group which may have a substituent group and has 1 to 4 carbon atoms. Preferable substituent groups for the alkyl group include a halogen atom, a hydroxy group, a cyano group, an alkoxy group, an alkylthio group, an arylthio group, an acyl group, an alkylsulfonyl group and an arylsulfonyl group. It is further preferred that $R^{22}$, $R^{23}$ and $R^{24}$ are a non-substituted alkyl group having 1 to 4 carbon atoms independently of each other. It is also preferred that $R^{23}$ and $R^{24}$ are bonded together to form a ring such as a pyrrolidine ring or a morpholine ring. Further it is preferred that $R^{25}$ and $R^{26}$ be a cyano group, an acyl group, an alkylsulfonyl group or an arylsulfonyl group independently of each other. It is especially preferred that $R^{25}$ and $R^{26}$ be a cyano group. $R^{27}$, $R^{28}$ and $R^{29}$ are preferably a hydrogen atom, an alkyl group, an aryl group, a hydroxy group, an alkoxy group, an aryloxy group, an amino group, a carbonamide group, or a sulfonamide group, and more preferably a hydrogen atom.

Specific examples of metal complexes of azo dyes are as follows.

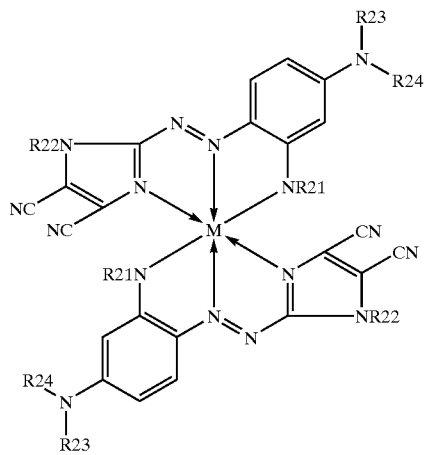

wherein specific examples of $R^{21}$, $R^{22}$, $R^{23}$ and $R^{24}$ are as follows.

| No. | $R^{21}$ | $R^{22}$ | $R^{23}$ | $R^{24}$ |
|---|---|---|---|---|
| V-1 | $SO_2CF_3$ | $C_2H_5$ | $C_2H_5$ | $C_2H_5$ |
| V-2 | $SO_2CF_3$ | $n-C_4H_9$ | $C_2H_5$ | $C_2H_5$ |
| V-3 | $SO_2CF_3$ | $n-C_4H_9$ | $C_2H_4CN$ | $C_2H_5$ |
| V-4 | $SO_2CF_3$ | $-n-C_4H_9$ | $(CH_2)_4-$* | |
| V-5 | $SO_2CF_3$ | $n-C_4H_9$ | $-CH_2CH_2OCH_2CH_2-$** | |
| V-6 | $SO_2CH_3$ | $C_2H_5$ | $C_2H_5$ | $C_2H_5$ |
| V-7 | 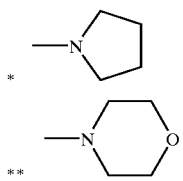 | $C_2H_5$ | $C_2H_5$ | $C_2H_5$ |
| V-8 | $SO_2CF_3$ | $C_2H_5$ | $CH_2CH_2OH$ | $C_2H_5$ |
| V-9 | $SO_2CF_3$ | $n-C_3H_7$ | $C_2H_5$ | $C_2H_5$ |
| V-10 | $SO_2CF_3$ | $CH_2CH_2OCH_3$ | $C_2H_5$ | $C_2H_5$ |

*  —N⟨pyrrolidine⟩

** —N⟨morpholine⟩O

The metal complex of azo dyes represented by the general formula (V) may be synthesized by methods such as disclosed in Japanese Unexamined Patent Publication No. 9(1997)-277703, especially in conjunction with embodiments 1 to 3.

Further, a photo-functional film formed of azo dyes represented by the following general formula (VI) may be also suitably employed in the present invention.

General formula (VI)

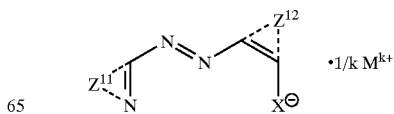

wherein k and M are the same as those employed in the aforesaid general formula (II-1) or (II-2), and X, $Z^{11}$ and $Z^{12}$ are the same as those employed in the aforesaid general formula (V).

Specific examples of azo dyes represented by the general formula (VI) are as follows.

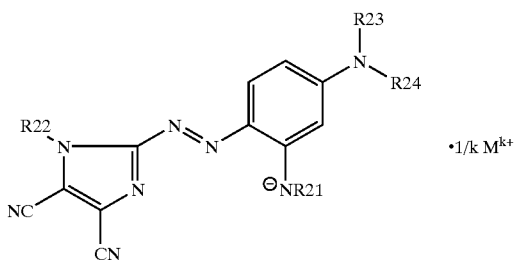

wherein specific examples of $R^{21}$, $R^{22}$, $R^{23}$, $R^{24}$, k and M are as follows.

nated polyolefin, epoxy resins, butyral resin, rubber derivatives, phenol formaldehyde resins and the like. The photo-functional film employed in this invention can be obtained by applying a compound represented by the foresaid general formula (I), (II), (III), (IV), (V) or (VI) to a metal film by a known method such as spin coating, deposition, sputtering or the like. The thickness of the photo-functional film is controlled so that surface plasmon resonance is generated when a modulating light at a wavelength in the range of 350 nm to 2000 nm is projected onto the photo-functional film and is generally in the range of 10 nm to 1000 nm.

In the surface plasmon optical modulator elements in accordance with the first to third aspects of the present invention, a silver film is employed as the metal film, and accordingly the surface plasmon resonance generating condition becomes more strict and a sufficient degree of modulation can be obtained by changing the refractive index of the photo-functional film by only a small amount. Further since the silver film is protected from oxidation by the

| No. | $R^{21}$ | $R^{22}$ | $R^{23}$ | $R^{24}$ | k | M |
|---|---|---|---|---|---|---|
| VI-1 | $SO_2CF_3$ | $C_2H_5$ | $C_2H_5$ | $C_2H_5$ | 2 | (2,6-diethylphenyl-N-pyridinium)₂ |
| VI-2 | $SO_2CF_3$ | $CH_3$ | $C_2H_5$ | $C_2H_5$ | 2 | (naphthyl-N-pyridinium)₂ |
| VI-3 | $SO_2CF_3$ | $n$-$C_4H_9$ | —$CH_2CH_2OCH_2CH_2$— | | 2 | $((CH_3)_2CHCH_2)$—N⁺-pyridinium)₂ |
| VI-4 | $SO_2CH_3$ | $C_2H_5$ | $CH_2CH_2OH$ | $CH_2CH_2OH$ | 1 | $(n$-$C_4H_4)_4N^+$ |
| VI-5 | $SO_2CF_3$ | $CH_2CH_2OCH_3$ | $C_2H_5$ | $C_2H_5$ | 1 | PhCH₂—N⁺(CH₃)₃ |

The azo compounds represented by the general formula (VI) can be synthesized by azo coupling reaction of aromatic diazonium as usual.

A high-molecular compound may be used in order to prevent crystallization of the organic dyes and the like and keep them amorphous. Examples of such a high-molecular compound include natural high polymers such as gelatin, dextran, rhodine, rubber and the like, and synthetic polymers such as cellulose derivatives (e.g., nitrocellulose, cellulose acetate, cellulose acetate butyrate and the like), hydrocarbon resins (e.g., polyethylene, polystyrene, polypropylene, polyisobutylene and the like), vinyl resins (e.g., polyvinyl chloride, polyvinylidene chloride, polyvinyl chloride-ployvinyl acetate copolymer, acrylic resins (e.g., polyether, polyacrylamide, polymethyl acrylate, polymethyl methacrylate and the like), and prepolymers of thermosetting resins such as polyester, polyurethane, polyvinyl alcohol, chlorioxygen cut film, change of properties of the silver film by oxidation can be prevented and stable modulation can be realized.

In the surface plasmon optical modulator element in accordance with the fourth aspect of the present invention, the surface plasmon resonance generating condition becomes more strict due to resonance with waveguide mode of the dielectric material layer which is formed on the dielectric material block and has a refractive index lower than that of the dielectric material block, whereby a sufficient degree of modulation can be obtained by changing the refractive index of the photo-functional film by only a small amount.

This will be described in more detail with reference to FIG. 7, hereinbelow. FIG. 7 shows a result of computer simulation of the relation between the angle of incidence θ of the light-to-be-modulated to the surface of the dielectric material block and the reflectance of the surface of the dielectric material block when the metal film is formed directly on the surface of the dielectric material block as in the conventional surface plasmon optical modulator element (curve a) and that when the metal film is formed on a dielectric material layer formed on the surface of the dielectric material block as in the surface plasmon optical modulator element in accordance with the fourth aspect of the present invention (curve b). As can be understood from FIG. 7, the condition under which total reflection is cancelled, that is, the surface plasmon resonance generating condition is limited to a narrower band when the metal film is formed on a dielectric material layer formed on the surface of the dielectric material block. The characteristic curves a and b are translated substantially in the direction of the abscissa when the refractive index of the photo-functional film on the metal film changes according to whether the modulating light is projected onto the photo-functional film. As can be understood from the characteristic curve a, when the surface plasmon resonance generating condition is slack, the difference between the reflectance with projection of the modulating light and that without projection of the modulating light, i.e., the degree of modulation, cannot be large unless the difference between the refractive indexes of the photo-functional film with and without projection of the modulating light is extremely large. To the contrast, as can be understood from the characteristic curve b, when the surface plasmon resonance generating condition is limited to a narrow band, the difference between the reflectance with projection of the modulating light and that without projection of the modulating light can be large (almost 100%) and a large degree of modulation can be obtained even if the difference between the refractive indexes with and without projection of the modulating light is small.

When the angle of incidence of the light-to-be-modulated to said one surface of the dielectric material block is set so that surface plasmon resonance is generated in the metal film when the modulating light is projected onto the photo-functional film and no surface plasmon resonance is generated in the metal film when the modulating light is not projected onto the photo-functional film, the surface plasmon optical modulator element of the fourth aspect is of a type where the light-to-be-modulated is turned off or weakened in response to projection of the modulating light.

To the contrast, when the angle of incidence of the light-to-be-modulated to said one surface of the dielectric material block is set so that surface plasmon resonance is generated in the metal film when the modulating light is not projected onto the photo-functional film and no surface plasmon resonance is generated in the metal film when the modulating light is projected onto the photo-functional film, the surface plasmon optical modulator element of the fourth aspect is of a type where the light-to-be-modulated is turned on or strengthened in response to projection of the modulating light.

In the surface plasmon optical modulator element in accordance with the fifth aspect of the present invention, the photo-functional film is formed of dye which contains an electron donor and an electron acceptor so that a photoelectron can be transferred therebetween. Accordingly, the surface plasmon optical modulator element can effect modulation of light at a higher speed than the conventional surface plasmon optical modulator element, can effect modulation of light in a wider wavelength range, is higher in durability against repetition and can effect modulation of light with modulating light at low power.

When the angle of incidence of the light-to-be-modulated to said one surface of the dielectric material block is set so that surface plasmon resonance is generated in the metal film when the modulating light is projected onto the photo-functional film and no surface plasmon resonance is generated in the metal film when the modulating light is not projected onto the photo-functional film, the surface plasmon optical modulator element of the fifth aspect is of a type where the light-to-be-modulated is turned off or weakened in response to projection of the modulating light.

To the contrast, when the angle of incidence of the light-to-be-modulated to said one surface of the dielectric material block is set so that surface plasmon resonance is generated in the metal film when the modulating light is not projected onto the photo-functional film and no surface plasmon resonance is generated in the metal film when the modulating light is projected onto the photo-functional film, the surface plasmon optical modulator element of the fifth aspect is of a type where the light-to-be-modulated is turned on or strengthened in response to projection of the modulating light.

In the surface plasmon optical modulator element in accordance with the sixth aspect of the present invention, the photo-functional film is disposed on the dielectric material block side of the metal film, and accordingly, the modulating light may be projected onto the same side of the photo-functional film as the light-to-be-modulated, which facilitates positioning of the light-to-be-modulated and the modulating light.

At the same time, since a thick protective layer can be formed on the outer side of the metal film and the metal film can be easily protected without deteriorating properties of the metal film.

When the angle of incidence of the light-to-be-modulated to said one surface of the dielectric material block is set so that surface plasmon resonance is generated in the metal film when the modulating light is projected onto the photo-functional film and no surface plasmon resonance is generated in the metal film when the modulating light is not projected onto the photo-functional film, the surface plasmon optical modulator element of the sixth aspect is of a type where the light-to-be-modulated is turned off or weakened in response to projection of the modulating light.

To the contrast, when the angle of incidence of the light-to-be-modulated to said one surface of the dielectric material block is set so that surface plasmon resonance is generated in the metal film when the modulating light is not projected onto the photo-functional film and no surface plasmon resonance is generated in the metal film when the modulating light is projected onto the photo-functional film, the surface plasmon optical modulator element of the sixth aspect is of a type where the light-to-be-modulated is turned on or strengthened in response to projection of the modulating light.

BRIEF DESCRIPTION OF THE DRAWINGS

FIG. 6 is a graph showing the relation between on and off of projection of the modulating light and the intensity of the SPR signal in the surface plasmon optical modulator element of the first embodiment, FIG. 13 is a schematic side view of a surface plasmon optical modulator element in accordance with a seventh embodiment of the present invention, and FIG. 14 is a schematic side view of a surface plasmon optical modulator element in accordance with an eighth embodiment of the present invention.

DESCRIPTION OF THE PREFERRED EMBODIMENTS

Figure 1:
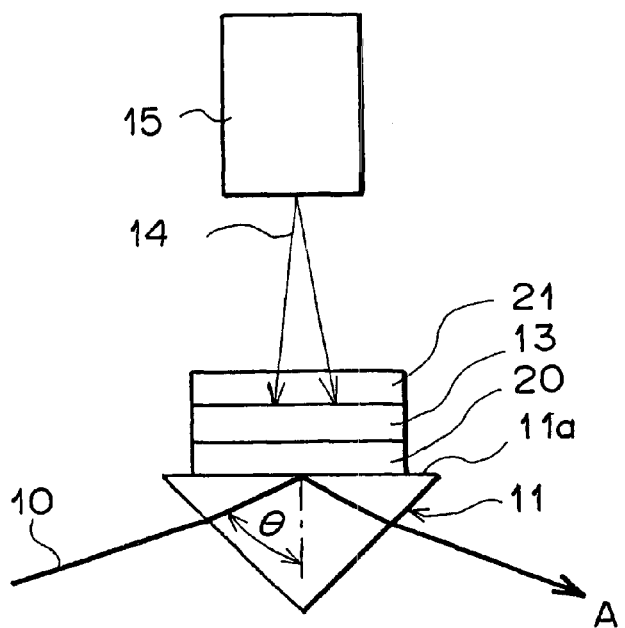
FIG. 1 is a schematic side view of a surface plasmon optical modulator element in accordance with a first embodiment of the present invention.
Figure 2:
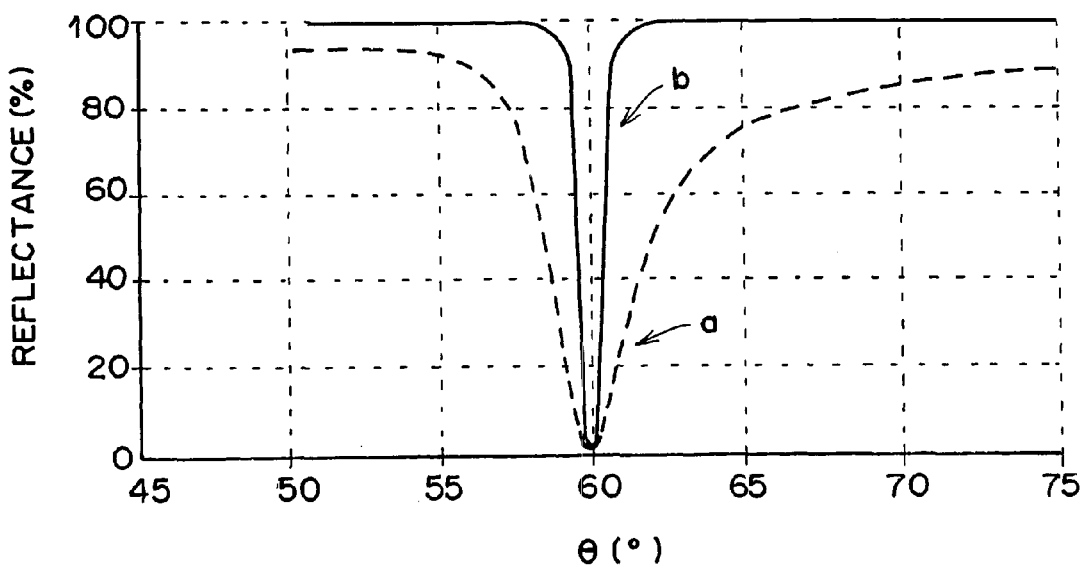
FIG. 2 is a view showing the relation between the angle of incidence θ of the light-to-be-modulated to the surface of the dielectric material block and the reflectance of the surface of the dielectric material block for different conditions under which surface plasmon resonance is generated in the conventional surface plasmon optical modulator element, characteristic curve a representing the relation when the surface plasmon resonance generating condition is relatively slack and characteristic curve b representing the relation when the surface plasmon resonance generating condition is relatively strict.

A surface plasmon optical modulator element in accordance with a first embodiment of the present invention will be described with reference to FIG. 1, hereinbelow. The surface plasmon optical modulator element of this embodiment comprises a dielectric material block 11 which is like a prism and is disposed so that light-to-be-modulated 10 travels through the interior of the dielectric material block 11 and impinges upon a surface 11a thereof at an angle of total reflection, a silver film 20 formed on the surface 11a of the dielectric material block 11, a photo-functional film 13 which is formed on the silver film 20 and whose refractive index is changed upon exposure to light, an oxygen cut layer 21 formed on the photo-functional film 13 and a modulating light source 15 which projects modulating light 14 onto the photo-functional film 13.

In this particular embodiment, the light-to-be-modulated 10 is linearly polarized light which is 680 nm in wavelength, and the dielectric material block 11 is positioned so that the light-to-be-modulated 10 impinges upon the surface 11a in the form of P-polarized light. The dielectric material block 11 is formed of high-refractive-index glass and is 2.05 in refractive index to light at 680 nm.

It is preferred that the modulating light source 15 be a semiconductor laser which can be turned on and off at a high speed, and in this particular embodiment, the modulating light source 15 is a semiconductor laser which emits a laser beam at 532 nm as the modulating light 14.

In this particular embodiment, the silver film 20 is 15 nm in thickness. The photo-functional film 13 is formed of a material selected from the compounds described above. In this particular embodiment, the photo-functional film 13 is formed by spin-coating No. 26 compound (dye), in the compounds listed above as the specific examples of the compounds represented by the general formulae (II-1) and (II-2), on the silver film 20 in an thickness of 130 nm, and the refractive index to a wavelength of 680 nm of the photo-functional film 13 is 1.60 when the 532 nm modulating light 14 is not projected onto the photo-functional film 13 and changes to 1.61 when the 532 nm modulating light 14 is projected onto the photo-functional film 13. The oxygen cut layer 21 is formed of, for instance, polyvinyl alcohol which transmits the 532 nm modulating light 14 and 100 nm in thickness.

Figure 3:
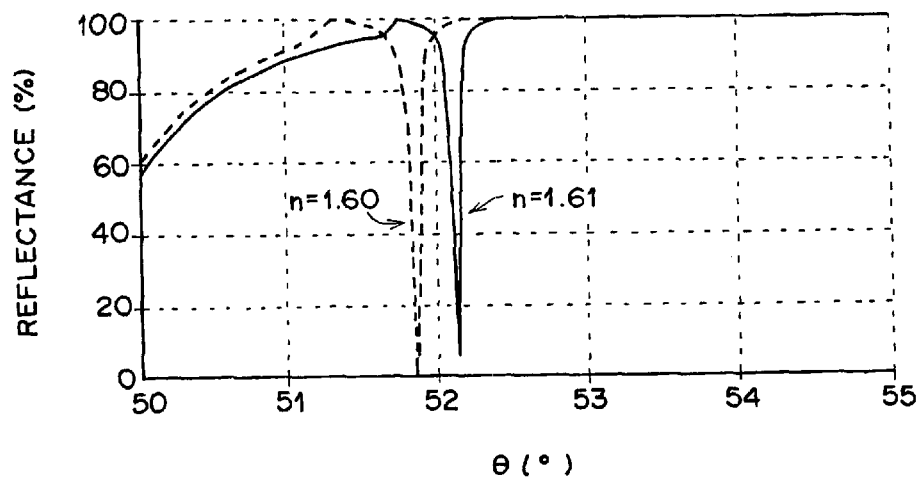
FIG. 3 is a view showing the relation between the angle of incidence θ of the light-to-be-modulated to the surface of the dielectric material block and the reflectance of the surface of the dielectric material block with projection of the modulating light in comparison with that without projection of the modulating light in the surface plasmon optical modulator element of the first embodiment.

Operation of the surface plasmon optical modulator element will be described, hereinbelow. As described above, the refractive index to a wavelength of 680 nm of the photo-functional film 13 is 1.60 when the 532 nm modulating light 14 is not projected onto the photo-functional film 13 and changes to 1.61 when the 532 nm modulating light 14 is projected onto the photo-functional film 13. The relation between the angle of incident θ (°) of the light-to-be-modulated 10 to the interface between the dielectric material block 11 and the silver film 20 and the reflectance at the interface is as shown by the broken line in FIG. 3 when the refractive index n of the photo-functional film 13 is 1.60 and is as shown by the solid line in FIG. 3 when the refractive index n of the photo-functional film 13 is 1.61. The characteristics shown in FIG. 3 are obtained by computer simulation.

When the angle of incidence θ isset, for instance, at 51.8°, the reflectance at the interface is about 0% in the state where the modulating light 14 is not projected onto the photo-functional film 13 (refractive index n is 1.60), and is changed to 100% when the modulating light 14 is projected onto the photo-functional film 13 (refractive index n is 1.61), whereby the light-to-be-modulated 10 traveling in the direction of arrow A in FIG. 1 can be turned on and off in response to on and off of the modulating light 14.

FIG. 6 is a view showing the change in measured intensity of a SPR signal (representing the light-to-be-modulated 10 reflected at the interface) in response to on and off of the modulating light 14 when the light-to-be-modulated 10 is modulated by the surface plasmon optical modulator element of the first embodiment. As can be seen from FIG. 6, the SPR signal is clearly modulated in response to on and off of the modulating light 14.

Though, in the first embodiment, the photo-functional film 13 is formed of No. 26 compound (dye) in the compounds listed above as the specific examples of the compounds represented by the general formulae (II-1) and (II-2), the similar result was obtained when the photo-functional film 13 was formed of the following compounds in place of No. 26 compound.

| compound No. | wavelength of modulating light |
|---|---|
| a compound represented by general formula (I): A-1 + B-1 | 680 nm |
| a 100:15 mixture of B-16 (represented by general formula (III)) and A-4 (represented by general formula (IV)) | 633 nm |
| compound (VI-1) | 532 nm |

As described above, when a silver film 20 is employed as the metal film, the surface plasmon resonance generating condition becomes very strict and accordingly, the reflectance at the interface between the photo-functional film 13 and the silver film 20 is changed from 0% to 100% by changing the refractive index n of the photo-functional film 13 only by 0.01, whereby a sufficiently high degree of modulation can be obtained.

At the same time, the oxygen cut layer 21 formed on the photo-functional film 13 effectively prevents oxidation of the silver film 20 which is more apt to be oxidized than a gold film, whereby the light-to-be-modulated 10 can be stably modulated without affected by characteristic change of the silver film 20 due to oxidation.

Further, as can be seen from FIG. 3, when the angle of incidence θ is set at 52.2°, the reflectance at the interface is about 100% in the state where the modulating light 14 is not projected onto the photo-functional film 13 (refractive index n is 1.60), and is changed to about 5% when the modulating light 14 is projected onto the photo-functional film 13 (refractive index n is 1.61), whereby the light-to-be-modulated 10 traveling in the direction of arrow A in FIG. 1 can be modulated so that the amount of light reflected at the interface is reduced when the modulating light 14 is projected onto the photo-functional film 13.

Further though, in the first embodiment, the oxygen cut layer 21 is formed on the photo-functional film 13 formed on the silver film 20, the oxygen cut layer 21 may be formed directly on the silver film 20 with the photo-functional film 13 formed on the oxygen cut layer 21 or the photo-functional film 13 itself may be an oxygen cut layer.

Figure 5:
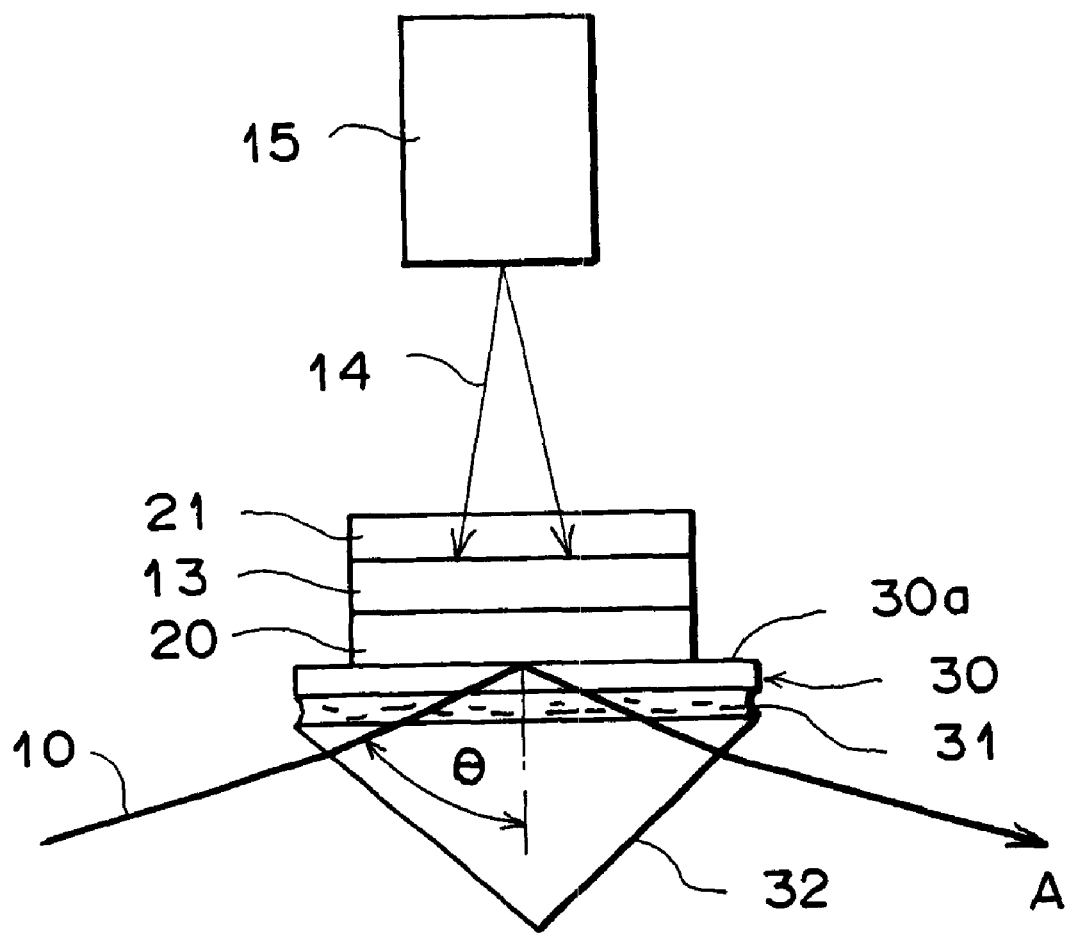
FIG. 5 is a schematic side view of a surface plasmon optical modulator element in accordance with a second embodiment of the present invention.

A surface plasmon optical modulator element in accordance with a second embodiment of the present invention will be described with reference to FIG. 5, hereinbelow. The surface plasmon optical modulator element of this embodiment basically differs from that of the first embodiment in that a substantially rectangular dielectric material block 30 which is combined with a prism 32 with a refractive index matching solution 31 intervening therebetween is employed in place of the prism-like dielectric material block 11.

In this surface plasmon optical modulator element, the light-to-be-modulated 10 is caused to impinge upon a surface 30a of the dielectric material block 30 through the prism 32. The dielectric material block 30 and the prism 32 are formed of the same material and the refractive index matching solution 31 is the same as the dielectric material block 30 and the prism 32 in refractive index. Accordingly, the assembly of the dielectric material block 30, the refractive index matching solution 31 and the prism 32 is optically equivalent to a prism.

Though, in the embodiments described above, the light-to-be-modulated 10 is in the form of a single beam, the surface plasmon optical modulator element of this invention may be employed to receive light which two-dimensionally spreads and bears thereon image information as projected light from a projector as the light-to-be-modulated 10 and to switch the optical path of the light by modulating action.

A surface plasmon optical modulator element in accordance with a third embodiment of the present invention will be described with reference to FIG. 8, hereinbelow. The surface plasmon optical modulator element of this embodiment comprises a dielectric material block 111 which is like a prism and is disposed so that light-to-be-modulated 110 travels through the interior of the dielectric material block 111 and impinges upon a surface 111a thereof at an angle of total reflection, a dielectric material layer 120 which is formed of a material lower than the material of the dielectric material block 111 in refractive index and is formed on the surface 111a of the dielectric material block 111, a metal film 112 formed on the dielectric material layer 120, a photo-functional film 113 which is formed on the metal film 112 and whose refractive index is changed upon exposure to light, and a modulating light source 115 which projects modulating light 114 onto the photo-functional film 113.

In this particular embodiment, the light-to-be-modulated 110 is linearly polarized light which is 680 nm in wavelength, and the dielectric material block 111 is positioned so that the light-to-be-modulated 110 impinges upon the surface 111a in the form of P-polarized light. The dielectric material block 111 is formed of high-refractive-index glass and is 2.05 in refractive index to light at 680 nm.

The dielectric material layer 120 is formed, for instance, of $SiO_2$ and 1000 nm in thickness. Further, the dielectric material layer 120 is lower than the dielectric material block 111 in refractive index to light at 680 nm and 1.60 in refractive index to light at 680 nm. The metal film 112 may be formed, for instance, of gold and 15 nm in thickness.

It is preferred that the modulating light source 115 be a semiconductor laser which can be turned on and off at a high speed, and in this particular embodiment, the modulating light source 115 is a semiconductor laser which emits a laser beam at 532 nm as the modulating light 114.

The photo-functional film 113 is formed of a material selected from the compounds described above. In this particular embodiment, the photo-functional film 113 is formed by spin-coating No. 26 compound (dye), in the compounds listed above as the specific examples of the compounds represented by the general formulae (II-1) and (II-2), on the metal film 112 in an thickness of 130 nm, and the refractive index to a wavelength of 680 nm of the photo-functional film 113 is 1.60 when the 532 nm modulating light 114 is not projected onto the photo-functional film 113 and changes to 1.61 when the 532 nm modulating light 114 is projected onto the photo-functional film 113.

Operation of the surface plasmon optical modulator element will be described, hereinbelow. As described above, the refractive index to a wavelength of 680 nm of the photo-functional film 113 is 1.60 when the 532 nm modulating light 114 is not projected onto the photo-functional film 113 and changes to 1.61 when the 532 nm modulating light 114 is projected onto the photo-functional film 113. The relation between the angle of incident θ (°) of the light-tobe-modulated 110 to the interface between the dielectric material block 111 and the dielectric material layer 120 and the reflectance at the interface is as shown by the broken line in FIG. 3 when the refractive index n of the photo-functional film 113 is 1.60 and is as shown by the solid line in FIG. 3 when the refractive index n of the photo-functional film 113 is 1.61.

Figure 8:
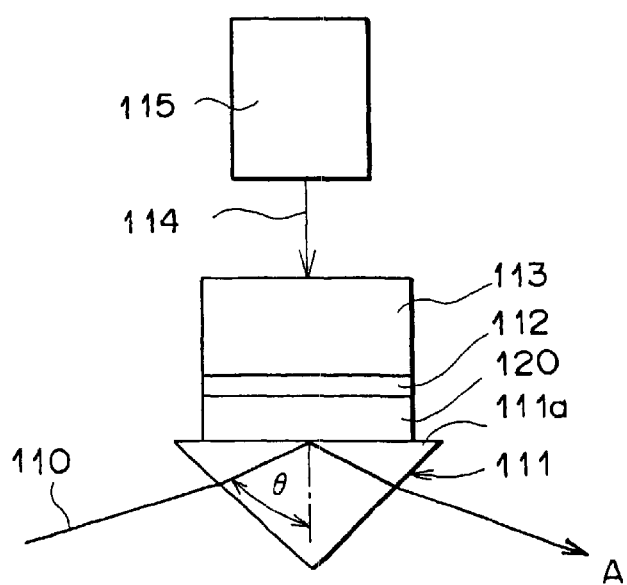
FIG. 8 is a schematic side view of a surface plasmon optical modulator element in accordance with a third embodiment of the present invention.

When the angle of incidence θ is set, for instance, at 51.8°, the reflectance at the interface is about 0% in the state where the modulating light 114 is not projected onto the photo-functional film 113 (refractive index n is 1.60), and is changed to 100% when the modulating light 114 is projected onto the photo-functional film 113 (refractive index n is 1.61), whereby the light-to-be-modulated 110 traveling in the direction of arrow A in FIG. 8 can be turned on and off in response to on and off of the modulating light 114.

FIG. 6 is a view showing the change in measured intensity of a SPR signal (representing the light-to-be-modulated 110 reflected at the interface) in response to on and off of the modulating light 114 when the light-to-be-modulated 110 is modulated by the surface plasmon optical modulator element of the third embodiment. As can be seen from FIG. 6, the SPR signal is clearly modulated in response to on and off of the modulating light 114.

Though, in the third embodiment, the photo-functional film 113 is formed of No. 26 compound (dye) in the compounds listed above as the specific examples of the compounds represented by the general formulae (II-1) and (II-2), the similar result was obtained when the photo-functional film 113 was formed of the following compounds in place of No. 26 compound.

| compound No. | wavelength of modulating light |
|---|---|
| a compound represented by general formula (I): A-1 + B-1 | 680 nm |
| a 100:15 mixture of B-16 (represented by general formula (III)) and A-4 (represented by general formula (IV)) | 633 nm |
| compound (VI-1) | 532 nm |

As can be understood from the description above, when a dielectric material layer 120 is interposed between the dielectric material block 111 and the metal film 112, a sufficiently high degree of modulation can be obtained by slightly changing the refractive index of the photo-functional film 113. The reason for this is as described above with reference to FIG. 7.

Figure 4:
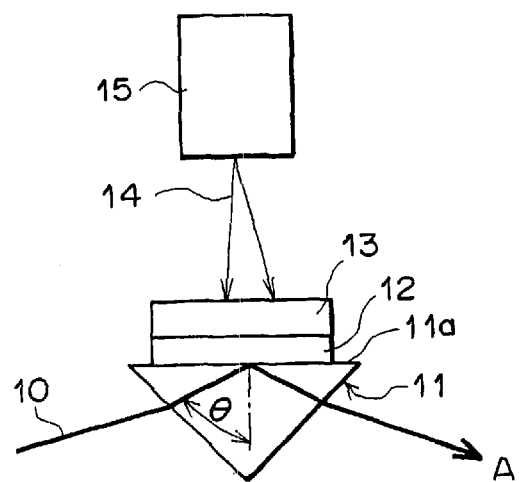
FIG. 4 is a schematic side view of an example of a conventional surface plasmon optical modulator element.
Figure 7:
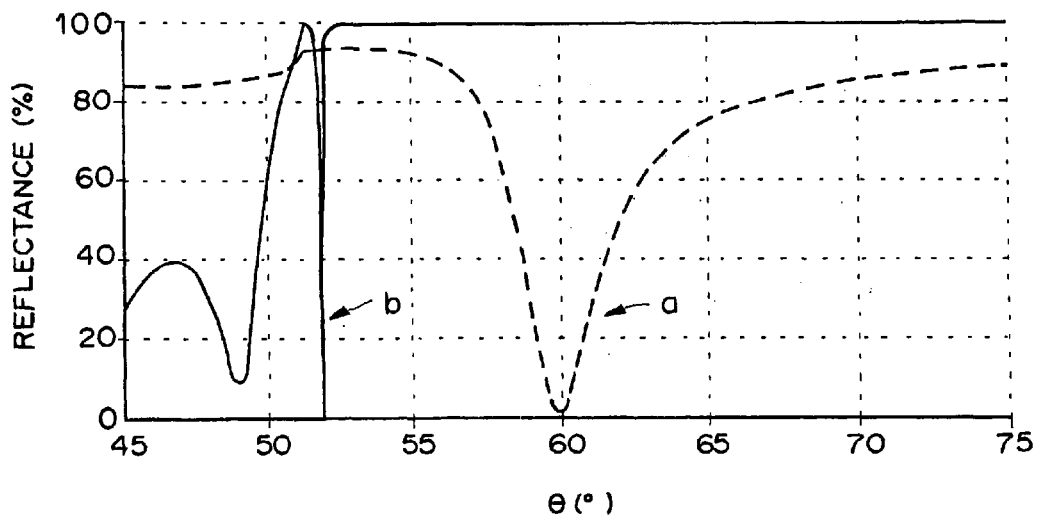
FIG. 7 is a view showing a result of computer simulation of the relation between the angle of incidence θ of the light-to-be-modulated to the surface of the dielectric material block and the reflectance of the surface of the dielectric material block when the metal film is formed directly on the surface of the dielectric material block as in the conventional surface plasmon optical modulator element (curve a) and that when the metal film is formed on a dielectric material layer formed on the surface of the dielectric material block as in the surface plasmon optical modulator element in accordance with the fourth aspect of the present invention (curve b)

The curve b shown in FIG. 7 is obtained by computer simulation on the surface plasmon optical modulator element of the third embodiment shown in FIG. 8, whereas the curve a is obtained by computer simulation on a conventional surface plasmon optical modulator element which is of the structure shown in FIG. 4 and is substantially the same as the surface plasmon optical modulator element of the embodiment except that there is no dielectric material layer and the metal film is 50 nm in thickness.

Further, as can be seen from FIG. 3, when the angle of incidence θ is set at 52.2°, the reflectance at the interface is about 100% in the state where the modulating light 114 is not projected onto the photo-functional film 113 (refractive index n is 1.60), and is changed to about 5% when the modulating light 114 is projected onto the photo-functional film 113 (refractive index n is 1.61), whereby the light-to-be-modulated 110 traveling in the direction of arrow A in FIG. 8 can be modulated so that the amount of light reflected at the interface is reduced when the modulating light 114 is projected onto the photo-functional film 113.

Figure 9:
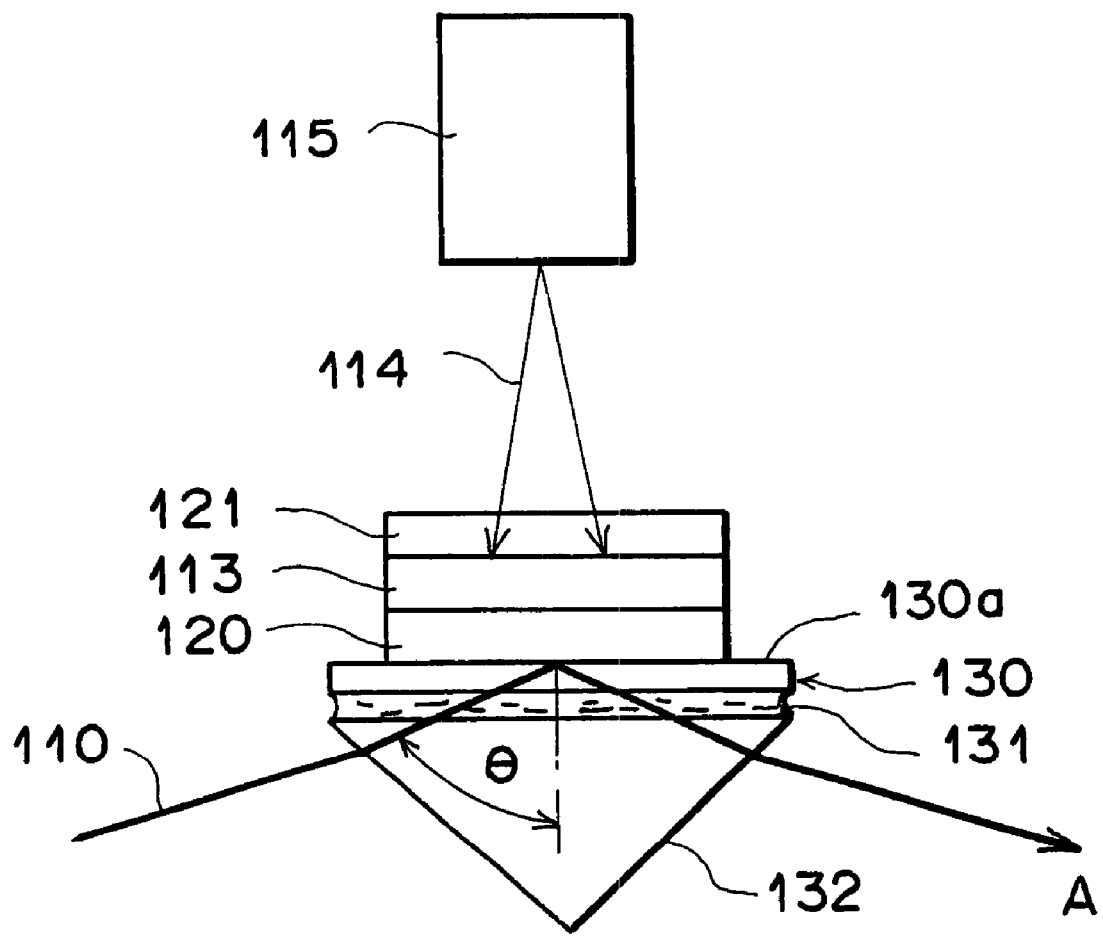
FIG. 9 is a schematic side view of a surface plasmon optical modulator element in accordance with a fourth embodiment of the present invention.

A surface plasmon optical modulator element in accordance with a fourth embodiment of the present invention will be described with reference to FIG. 9, hereinbelow. The surface plasmon optical modulator element of this embodiment basically differs from that of the third embodiment in that a substantially rectangular dielectric material block 130 which is combined with a prism 132 with a refractive index matching solution 131 intervening therebetween is employed in place of the prism-like dielectric material block 111.

In this surface plasmon optical modulator element, the light-to-be-modulated 110 is caused to impinge upon a surface 130*a* of the dielectric material block 130 through the prism 132. The dielectric material block 130 and the prism 132 are formed of the same material and the refractive index matching solution 131 is the same as the dielectric material block 130 and the prism 132 in refractive index. Accordingly, the assembly of the dielectric material block 130, the refractive index matching solution 131 and the prism 132 is optically equivalent to a prism.

Though, in the embodiments described above, the light-to-be-modulated 110 is in the form of a single beam, the surface plasmon optical modulator element of this invention may be employed to receive light which two-dimensionally spreads and bears thereon image information as projected light from a projector as the light-to-be-modulated 110 and to switch the optical path of the light by modulating action.

A surface plasmon optical modulator element in accordance with a fifth embodiment of the present invention will be described with reference to FIG. 10, hereinbelow. The surface plasmon optical modulator element of this embodiment comprises a dielectric material block 211 which is like a prism and is disposed so that light-to-be-modulated 210 travels through the interior of the dielectric material block 211 and impinges upon a surface 211*a* thereof at an angle of total reflection, a metal film 212 formed on the surface 211*a* of the dielectric material block 211, a photo-functional film 213 formed on the metal film 212, and a modulating light source 215 which projects modulating light 214 onto the photo-functional film 213.

In this particular embodiment, the light-to-be-modulated 210 is linearly polarized light which is 680 nm in wavelength, and the dielectric material block 211 is positioned so that the light-to-be-modulated 210 impinges upon the surface 211*a* in the form of P-polarized light. The dielectric material block 211 is formed of high-refractive-index glass and is 2.05 in refractive index to light at 680 nm.

It is preferred that the modulating light source 215 be a semiconductor laser which can be turned on and off at a high speed, and in this particular embodiment, the modulating light source 215 is a semiconductor laser which emits a laser beam at 532 nm as the modulating light 214.

The metal film 212 is formed of gold and 15 nm in thickness. The photo-functional film 213 is formed of dye which contains an electron donor and an electron acceptor so that a photoelectron can be transferred therebetween and is selected from the compounds described above. In this particular embodiment, the photo-functional film 213 is formed of a 15:100 (by weight) mixture of a compound indicated at A-4 in the compounds listed above as the specific examples of the compounds represented by the general formula (IV-4) and a compound indicated at B-17 in the compounds listed above as the specific examples of the compounds represented by the general formula (III). The refractive index to a wavelength of 680 nm of the photo-functional film 213 is 1.60 when the 532 nm modulating light 214 is not projected onto the photo-functional film 213 and changes to 1.61 when the 532 nm modulating light 214 is projected onto the photo-functional film 213. The thickness of the photo-functional film 213 is generally 1 nm to 10 μm, preferably 5 nm to 1 μm, and more preferably 10 nm to 500 nm.

Operation of the surface plasmon optical modulator element will be described, hereinbelow. As described above, the refractive index to a wavelength of 680 nm of the photo-functional film 213 is 1.60 when the 532 nm modulating light 214 is not projected onto the photo-functional film 213 and changes to 1.61 when the 532 nm modulating light 214 is projected onto the photo-functional film 213. The relation between the angle of incident θ (°) of the light-to-be-modulated 210 to the interface between the dielectric material block 211 and the photo-functional film 213 and the reflectance at the interface is as shown by the broken line in FIG. 3 when the refractive index n of the photo-functional film 213 is 1.60 and is as shown by the solid line in FIG. 3 when the refractive index n of the photo-functional film 213 is 1.61.

Figure 10:
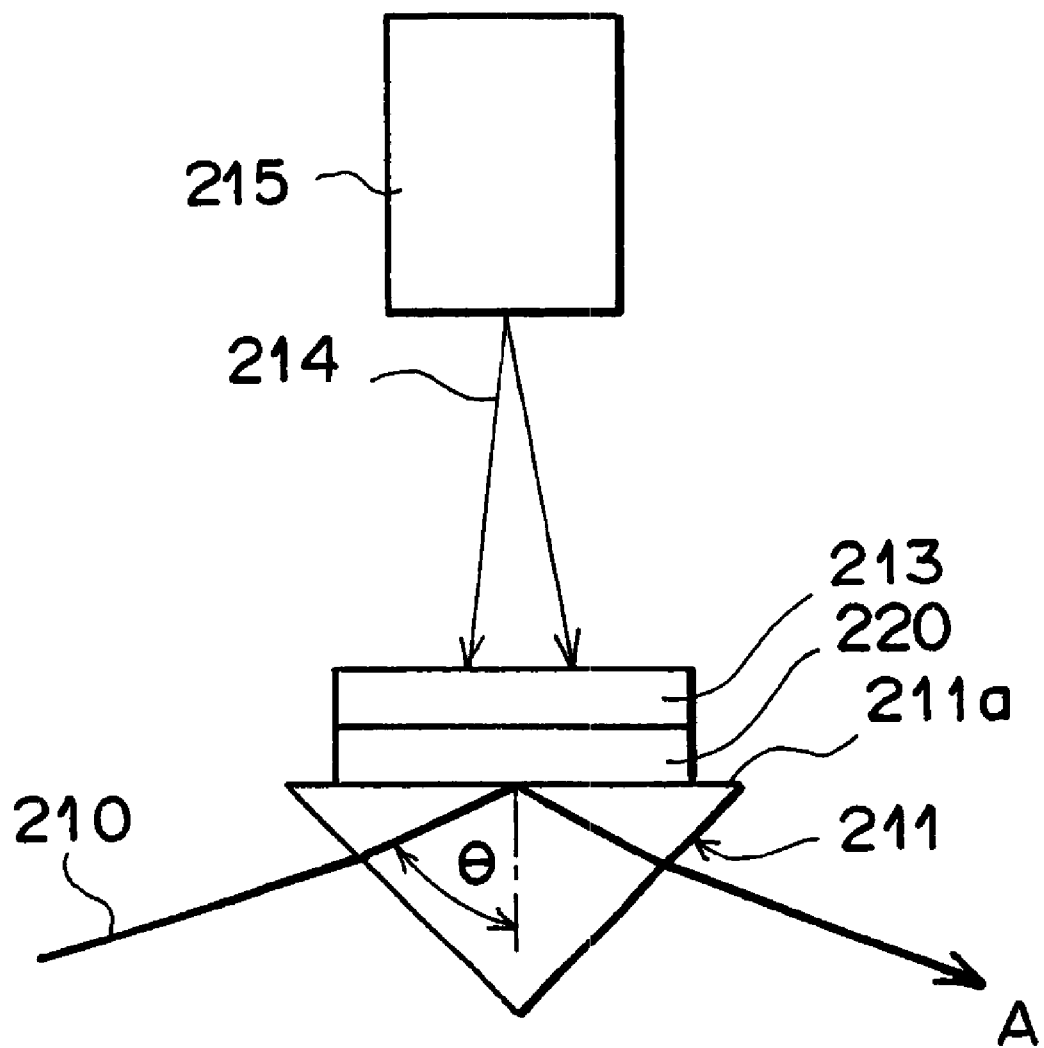
FIG. 10 is a schematic side view of a surface plasmon optical modulator element in accordance with a fifth embodiment of the present invention.

When the angle of incidence θ is set, for instance, at 51.8°, the reflectance at the interface is about 0% in the state where the modulating light 214 is not projected onto the photo-functional film 213 (refractive index n is 1.60), and is changed to 100% when the modulating light 214 is projected onto the photo-functional film 213 (refractive index n is 1.61), whereby the light-to-be-modulated 210 traveling in the direction of arrow A in FIG. 10 can be turned on and off in response to on and off of the modulating light 214.

Further, as can be seen from FIG. 3, when the angle of incidence θ is set at 52.2°, the reflectance at the interface is about 100% in the state where the modulating light 214 is not projected onto the photo-functional film 213 (refractive index n is 1.60), and is changed to about 5% when the modulating light 214 is projected onto the photo-functional film 213 (refractive index n is 1.61), whereby the light-to-be-modulated 210 traveling in the direction of arrow A in FIG. 10 can be modulated so that the amount of light reflected at the interface is reduced when the modulating light 214 is projected onto the photo-functional film 213.

In the surface plasmon optical modulator element of this embodiment, the photo-functional film 213 is formed of dye which contains an electron donor and an electron acceptor so that a photoelectron can be transferred therebetween. Accordingly, the surface plasmon optical modulator element can effect modulation of light at a higher speed than the conventional surface plasmon optical modulator element, can effect modulation of light in a wider wavelength range, is higher in durability against repetition and can effect modulation of light with modulating light at low power. The reason for this is as described above in detail.

Though, in the fifth embodiment, the photo-functional film 113 is formed of a mixture of a compound indicated at A-4 in the compounds listed above as the specific examples of the compounds represented by the general formula (IV-4) and a compound indicated at B-17 in the compounds listed above as the specific examples of the compounds represented by the general formula (III), the similar result was obtained when the photo-functional film 113 was formed of the following compounds in place of the mixture.

| compound No. | wavelength of modulating light |
|---|---|
| a compound represented by general formula (I): A-1 + B-1 | 680 nm |
| compound No. 26 represented by general formula (II) | 532 nm |
| compound (V-1) | 532 nm |

Figure 11:
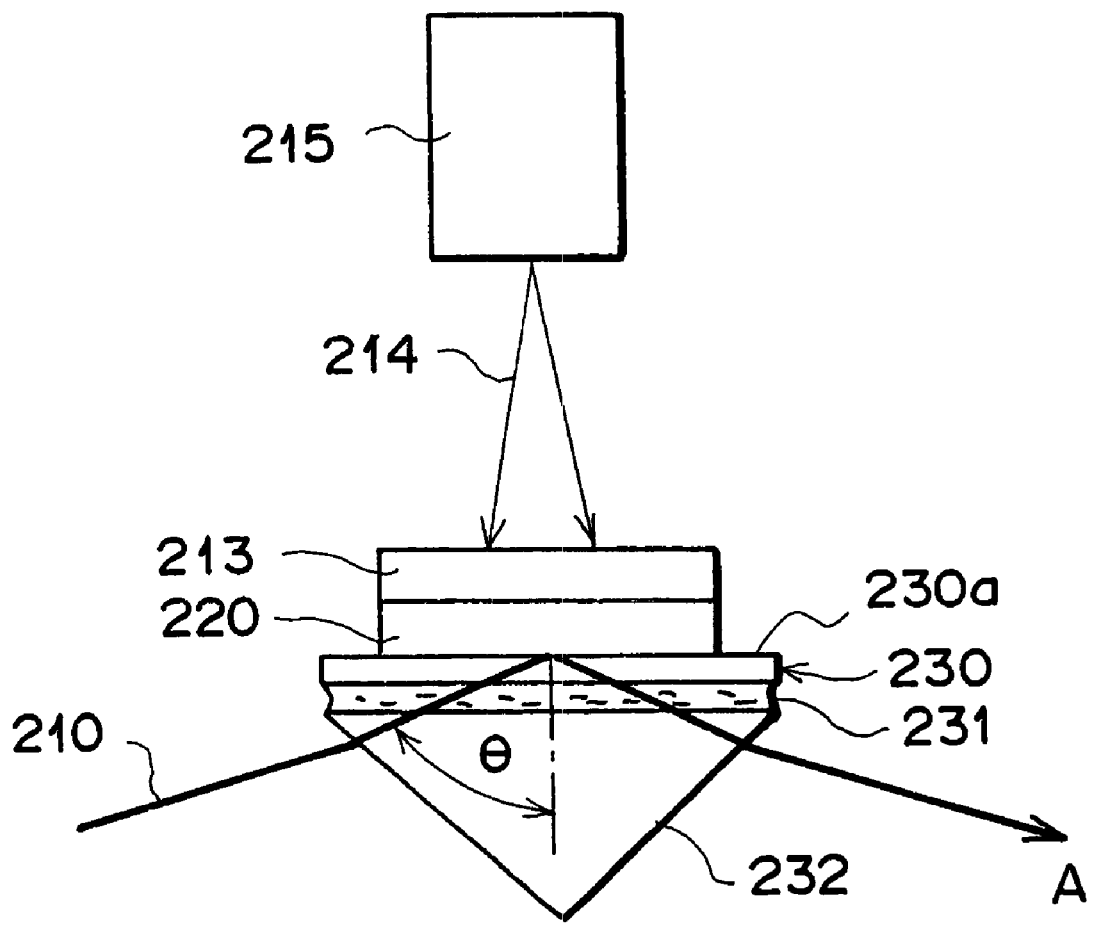
FIG. 11 is a schematic side view of a surface plasmon optical modulator element in accordance with a sixth embodiment of the present invention.

A surface plasmon optical modulator element in accordance with a sixth embodiment of the present invention will be described with reference to FIG. 11, hereinbelow. The surface plasmon optical modulator element of this embodiment basically differs from that of the fifth embodiment in that a substantially rectangular dielectric material block 230 which is combined with a prism 232 with a refractive index matching solution 231 intervening therebetween is employed in place of the prism-like dielectric material block 211.

In this surface plasmon optical modulator element, the light-to-be-modulated 210 is caused to impinge upon a surface 230a of the dielectric material block 230 through the prism 232. The dielectric material block 230 and the prism 232 are formed of the same material and the refractive index matching solution 231 is the same as the dielectric material block 230 and the prism 232 in refractive index. Accordingly, the assembly of the dielectric material block 230, the refractive index matching solution 231 and the prism 232 is optically equivalent to a prism.

Figure 12A:
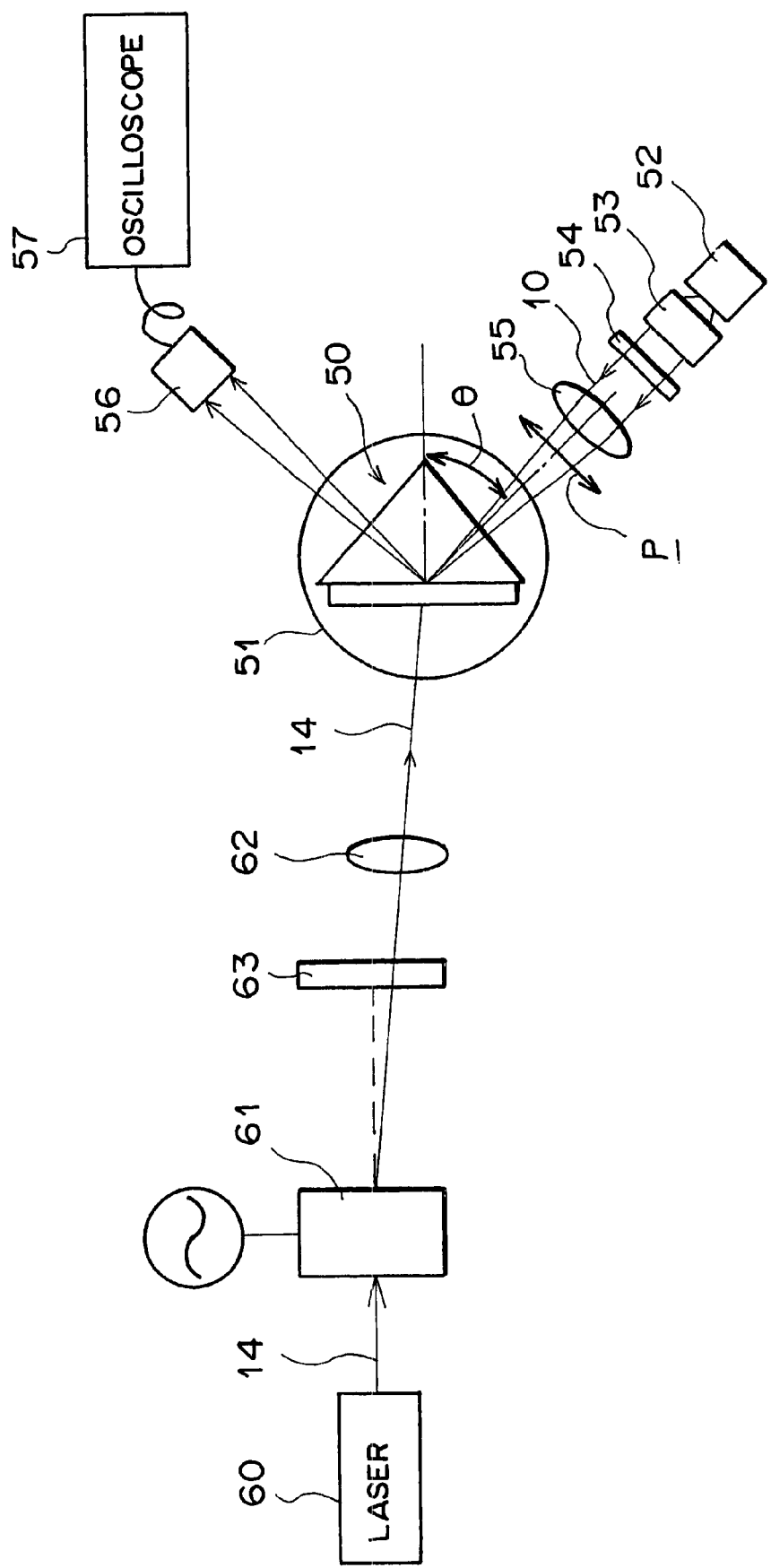
FIG. 12A is a schematic side view of a system for measuring properties of the surface plasmon optical modulator element in accordance with the sixth embodiment of the present invention.

Light was modulated by a system shown in FIG. 12A, in which a surface plasmon optical modulator element in accordance with the sixth embodiment of the present invention was employed. In FIG. 12A, reference numeral 450 denotes a surface plasmon optical modulator element in accordance with the sixth embodiment. That is, the surface plasmon optical modulator element 450 comprises a prism 232, a dielectric material block 230, a metal film 212 and a photo-functional film 213. The photo-functional film 213 is formed of a compound indicated at V-1 in the compounds listed above as the specific examples of the compounds represented by the general formula (III) and the metal film 212 is of gold and 50 nm in thickness.

The surface plasmon optical modulator element 450 is mounted on a rotary stage 451 so that the angle of incidence θ of the light-to-be-modulated 410 to the surface 230a of the dielectric material block 230 (FIG. 11) can be changed. The light-to-be-modulated 410 is linearly-polarized light at a wavelength of 685 nm emitted from a semiconductor laser 452. The light-to-be-modulated 410 is emitted from the semiconductor laser 452 as divergent light and is collimated by a collimator lens 453. Then the collimated light-to-be-modulated 410 is adjusted by a λ/2 plate 454 so that orientation of its linear-polarization becomes equal to the direction of arrow P, that is, so that the light-to-be-modulated 410 impinges upon the surface 230a of the dielectric material block 230 in the form of P-polarized light.

Then the light-to-be-modulated 410 is condensed by a condenser lens 455 (e.g., of a focal length of 50 mm) to converge on the surface 230a of the dielectric material block 230. The light-to-be-modulated 410 reflected at the surface 230a is detected by a pin photodiode 456 and the output of the photodiode 456 is input into an oscilloscope 457.

Modulating light 414 (35 mW in output power and 532 nm in wavelength) emitted from a laser 460 is intensity-modulated into a predetermined pattern by an AOM (acoustooptic modulator) 461. The modulated modulating light 414 is condensed by a condenser lens 462 (e.g., of a focal length of 100 mm) to converge on the photo-functional film 213 (FIG. 11). Components of modulating light 414 emitted from the AOM 461 in unused directions are cut by a light-shielding plate 463.

Figure 12B:
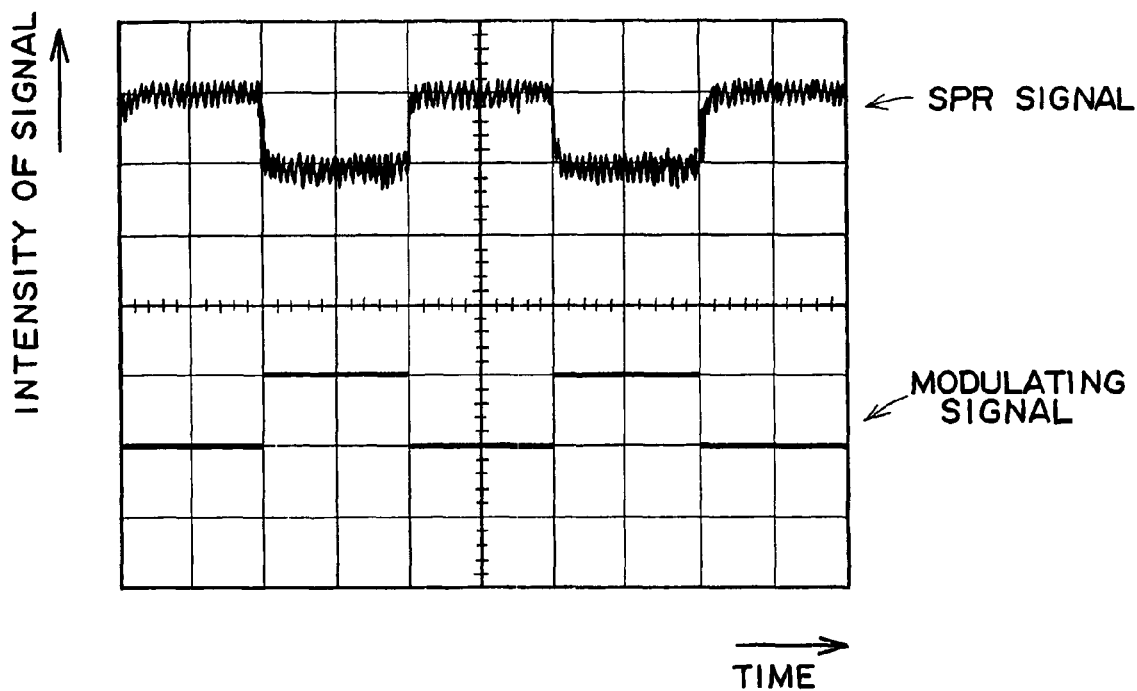
FIG. 12B is a graph showing the modulating characteristics of the surface plasmon optical modulator element in accordance with the sixth embodiment of the present invention as measured by the system shown in FIG. 12A.

FIG. 12B shows the waveform of the intensity-modulated modulating light 414 and the waveform of the light-to-be-modulated 410 measured by the oscilloscope 457. As can be seen from FIG. 12B, the light-to-be-modulated 410 was well modulated following the waveform of the modulating light 414.

Though, in the embodiments described above, the light-to-be-modulated 210 is in the form of a single beam, the surface plasmon optical modulator element of this invention may be employed to receive light which two-dimensionally spreads and bears thereon image information as projected light from a projector as the light-to-be-modulated 210 and to switch the optical path of the light by modulating action.

A surface plasmon optical modulator element in accordance with a seventh embodiment of the present invention will be described with reference to FIG. 13, hereinbelow. The surface plasmon optical modulator element of this embodiment comprises a dielectric material block 311 which is like a prism and is disposed so that light-to-be-modulated 310 travels through the interior of the dielectric material block 311 and impinges upon a surface 311a thereof at an angle of total reflection, a photo-functional film 313 which is formed on the surface 311a of the dielectric material block 311 and whose refractive index is changed upon exposure to light, a silver film 312 formed on the photo-functional film 313, a protective layer 320 formed on the silver film 312 and a modulating light source 315 which projects modulating light 314 onto the photo-functional film 313.

In this particular embodiment, the light-to-be-modulated 310 is linearly polarized light which is 680 nm in wavelength, and the dielectric material block 311 is positioned so that the light-to-be-modulated 310 impinges upon the surface 311a in the form of P-polarized light. The dielectric material block 311 is formed of high-refractive-index glass and is 2.05 in refractive index to light at 680 nm.

It is preferred that the modulating light source 315 be a semiconductor laser which can be turned on and off at a high speed, and in this particular embodiment, the modulating light source 315 is a semiconductor laser which emits a laser beam at 532 nm as the modulating light 314.

In this particular embodiment, the silver film 312 is 15 nm in thickness. The photo-functional film 313 is formed of a material selected from the compounds described above. In this particular embodiment, the photo-functional film 313 is formed of a dye whose refractive index to a wavelength of 680 nm is 1.60 when the 532 nm modulating light 314 is not projected onto the photo-functional film 313 and changes to 1.61 when the 532 nm modulating light 314 is projected onto the photo-functional film 313. The thickness of the photo-functional film 313 is generally 1 nm to 10 μm, preferably 5 nm to 1 μm, and more preferably 10 nm to 500 nm. The protective layer 320 is 1 μm in thickness and is formed of, for instance, oxygen cutting ultraviolet-curing resin SD318 (Dainihon Ink Chemical).

Operation of the surface plasmon optical modulator element will be described, hereinbelow. As described above, the refractive index to a wavelength of 680 nm of the photo-functional film 313 is 1.60 when the 532 nm modulating light 414 is not projected onto the photo-functional film 313 and changes to 1.61 when the 532 nm modulating light 314 is projected onto the photo-functional film 313. The relation between the angle of incident θ (°) of the light-to-be-modulated 310 to the interface between the dielectric material block 311 and the photo-functional film 313 and the reflectance at the interface is as shown by the broken line in FIG. 3 when the refractive index n of the photo-functional film 313 is 1.60 and is as shown by the solid line in FIG. 3 when the refractive index n of the photo-functional film 313 is 1.61.

When the angle of incidence θ is set, for instance, at 51.8°, the reflectance at the interface is about 0% in the state where the modulating light 314 is not projected onto the photo-functional film 313 (refractive index n is 1.60), and is changed to 100% when the modulating light 314 is projected onto the photo-functional film 313 (refractive index n is 1.61), whereby the light-to-be-modulated 310 traveling in the direction of arrow A in FIG. 13 can be turned on and off in response to on and off of the modulating light 314.

We made surface plasmon optical modulator elements which were as shown in FIG. 13 in structure and were provided with a photo-functional film 313 formed by spin-coating one of the following compounds on the surface 311a of the dielectric material block 311 in a thickness of 160 nm and confirmed that the surface plasmon optical modulator elements could successfully modulate the light-to-be-modulated 310

| compound No. | wavelength of modulating light |
|---|---|
| a compound represented by general formula (I): A-1 + B-1 | 680 nm |
| a 100:15 mixture of B-16 (represented by general formula (III)) and A-4 (represented by general formula (IV)) | 633 nm |
| compound (VI-1) | 532 nm |

As described above, when a silver film 312 is employed as the metal film, the surface plasmon resonance generating condition becomes very strict and accordingly, the reflectance at the interface between the photo-functional film 313 and the silver film 312 is changed from 0% to 100% by changing the refractive index n of the photo-functional film 313 only by 0.01, whereby a sufficiently high degree of modulation can be obtained.

At the same time, the protective layer 320 formed on the silver film 312 effectively prevents oxidation of the silver film 312 which is more apt to be oxidized than a gold film, whereby the light-to-be-modulated 310 can be stably modulated without affected by characteristic change of the silver film 312 due to oxidation.

Further, as can be seen from FIG. 3, when the angle of incidence θ is set at 52.2°, the reflectance at the interface is about 100% in the state where the modulating light 314 is not projected onto the photo-functional film 313 (refractive index n is 1.60), and is changed to about 5% when the modulating light 314 is projected onto the photo-functional film 313 (refractive index n is 1.61), whereby the light-to-be-modulated 310 traveling in the direction of arrow A in FIG. 13 can be modulated so that the amount of light reflected at the interface is reduced when the modulating light 314 is projected onto the photo-functional film 313.

A surface plasmon optical modulator element in accordance with an eighth embodiment of the present invention will be described with reference to FIG. 14, hereinbelow. The surface plasmon optical modulator element of this embodiment basically differs from that of the first embodiment in that a substantially rectangular dielectric material block 330 which is combined with a prism 332 with a refractive index matching solution 331 intervening therebetween is employed in place of the prism-like dielectric material block 311.

In this surface plasmon optical modulator element, the light-to-be-modulated 310 is caused to impinge upon a surface 330a of the dielectric material block 330 through the prism 332. The dielectric material block 330 and the prism 332 are formed of the same material and the refractive index matching solution 331 is the same as the dielectric material block 330 and the prism 332 in refractive index. Accordingly, the assembly of the dielectric material block 330, the refractive index matching solution 331 and the prism 332 is optically equivalent to a prism.

Though, in the embodiments described above, the light-to-be-modulated 310 is in the form of a single beam, the surface plasmon optical modulator element of this invention may be employed to receive light which two-dimensionally spreads and bears thereon image information as projected light from a projector as the light-to-be-modulated 310 and to switch the optical path of the light by modulating action.

What is claimed is:

1. A surface plasmon optical modulator element comprising
   a dielectric material block disposed so that light-to-be-modulated travels through the interior of the dielectric material block and impinges upon one surface thereof at an angle of total reflection,
   a silver film formed on said one surface of the dielectric material block,
   a photo-functional film which is formed on the silver film and whose refractive index is changed upon exposure to light,
   an oxygen cut film which is transparent to the modulating light and is formed on the photo-functional film, and
   a modulating light source which projects modulating light onto the photo-functional film.

2. A surface plasmon optical modulator element as defined in claim 1 in which the angle of incidence of the light-to-be-modulated to said one surface of the dielectric material block is set so that relatively strong surface plasmon resonance is generated in the metal film when the modulating light is projected onto the photo-functional film and relatively weak or no surface plasmon resonance is generated in the metal film when the modulating light is not projected onto the photo-functional film.

3. A surface plasmon optical modulator element as defined in claim 1 in which the angle of incidence of the light-to-be-modulated to said one surface of the dielectric material block is set so that relatively strong surface plasmon resonance is generated in the metal film when the modulating light is not projected onto the photo-functional film and relatively weak or no surface plasmon resonance is generated in the metal film when the modulating light is projected onto the photo-functional film.

4. A surface plasmon optical modulator element as defined in claim 1 in which the light-to-be-modulated is linearly polarized light and the dielectric material block is positioned so that the light-to-be-modulated impinges upon said one surface in the form of P-polarized light.

5. A surface plasmon optical modulator element as defined in claim 1 in which said dielectric material block is in the form of a prism.

6. A surface plasmon optical modulator element as defined in claim 1 in which said dielectric material block is integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism.

7. A surface plasmon optical modulator element as defined in claim 1 in which said photo-functional film is formed of a compound represented by the following general formula (I):

General formula (I)

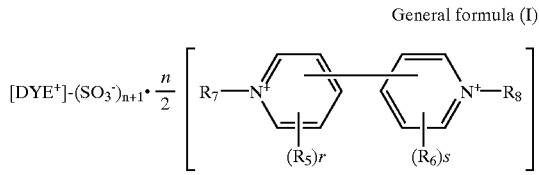

wherein $DYE^+$ represents a monovalent cyanine dye cation, n represents an integer not smaller than 1, $R_5$ and $R_6$ represent a substituent group independently of each other, $R_7$ and $R_8$ represent an alkyl group, an alkenyl group, an alkynyl group, an aralkyl group, an aryl group or a heterocyclic group independently of each other, $R_5$ and $R_6$ may be bonded to form a ring, $R_5$ and $R_7$ may be bonded to form a ring, $R_6$ and $R_8$ may be bonded to form a ring, $R_7$ and $R_8$ may be bonded to form a ring, r and s represent an integer from 0 to 4 independently of each other, and when each of r and s represents an integer not smaller than 2, that is, when there are a plurality of $R_5$'s or $R_6$'s, they may be either equal to each other or different from each other.

8. A surface plasmon optical modulator element as defined in claim 1 in which said photo-functional film is formed of one or more dye compounds represented by the following general formula (II-1) or (II-2):

General formula (II-1)

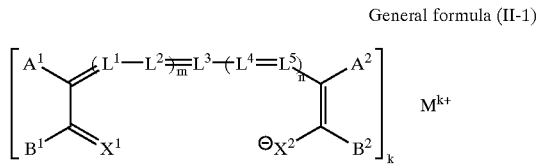

General formula (II-2)

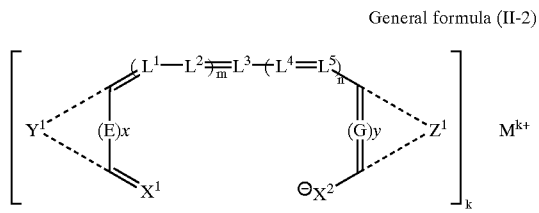

wherein $A^1$, $A^2$, $B^1$ and $B^2$ respectively represent substituent groups, $L^1$, $L^2$, $L^3$, $L^4$ and $L^5$ respectively represents methyne groups, $X^1$ represents =O, =NR, or =C(CN)$_2$ (R representing a substituent group), $X^2$ represents —O, —NR or —C(CN)$_2$ (R representing a substituent group), m and n respectively represent integers in the range of 0 to 2, $Y^1$ and E respectively represent an atom or a group of atoms required to form a carbon ring or a heterocycle, $Z^1$ and G respectively represent an atom or a group of atoms required to form a carbon ring or a heterocycle, x represents 0 or 1, y represents 0 or 1, $Mk^+$ represents an onium ion and k represents a number of the charges.

9. A surface plasmon optical modulator element as defined in claim 1 in which said photo-functional film is formed of an organic dye compound represented by the following general formula (III):

General formula (III)

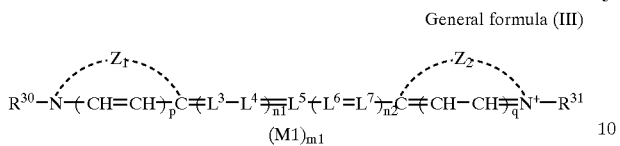

(M1)$_{m1}$ wherein $Z^1$ and $Z^2$ represent independently of each other a group of atoms required to form a five- or six-membered nitrogen-containing heterocycle; $R^{30}$ and $R^{31}$ represent independently of each other an alkyl group; $L^3$, $L^4$, $L^5$, $L^6$ and $L^7$ represent a methyne group; n1, n2, p and q respectively represent an integer from 0 to 2 and $(M1)_{m1}$ represents a charge-balancing counter ion.

10. A surface plasmon optical modulator element as defined in claim 9 in which said photo-functional film is formed of a combination of an organic dye compound represented by said general formula (III) and an organic oxidizing agent represented by the following general formula (IV):

General formula (IV)

wherein m and n represents independently of each other an integer 0 to 2, $X^1$ and $X^2$ represent $=NR^1$ or $=CR^2R^3$ ($R^1$, $R^2$ and $R^3$ being a substituent group) and $L^1$ and $L^2$ represent independently of each other a divalent bonding group.

11. A surface plasmon optical modulator element as defined in claim 1 in which said photo-functional film is formed of a compound represented by the following general formula (V):

General formula (V)

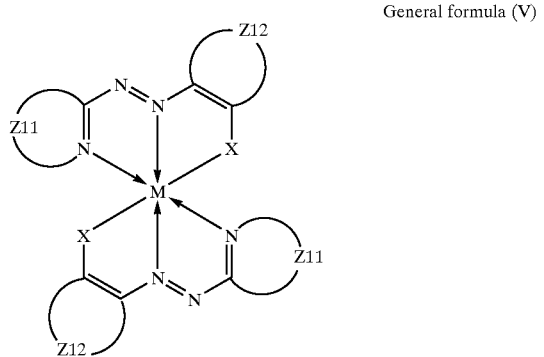

wherein M represents a metal atom, X represents an oxygen atom, a sulfur atom or $=NR^{21}$, $NR^{21}$ representing a hydrogen atom, an alkyl group, an aryl group, an acyl group, an alkylsulfonyl group or an arylsulfonyl group, $Z^{11}$ represents a group of atoms required to complete a five- or six-membered nitrogen-containing heterocycle, and $Z^{12}$ represents a group of atoms required to complete an aromatic ring or an aromatic heterocycle.

12. A surface plasmon optical modulator element comprising
 a dielectric material block disposed so that light-to-be-modulated travels through the interior of the dielectric material block and impinges upon one surface thereof at an angle of total reflection,
 a silver film formed on said one surface of the dielectric material block,
 an oxygen cut film formed on the silver film,
 a photo-functional film which is formed on the oxygen cut film and whose refractive index is changed upon exposure to light, and
 a modulating light source which projects modulating light onto the photo-functional film.

13. A surface plasmon optical modulator element as defined in claim 12 in which the angle of incidence of the light-to-be-modulated to said one surface of the dielectric material block is set so that relatively strong surface plasmon resonance is generated in the metal film when the modulating light is projected onto the photo-functional film and relatively weak or no surface plasmon resonance is generated in the metal film when the modulating light is not projected onto the photo-functional film.

14. A surface plasmon optical modulator element as defined in claim 12 in which the angle of incidence of the light-to-be-modulated to said one surface of the dielectric material block is set so that relatively strong surface plasmon resonance is generated in the metal film when the modulating light is not projected onto the photo-functional film and relatively weak or no surface plasmon resonance is generated in the metal film when the modulating light is projected onto the photo-functional film.

15. A surface plasmon optical modulator element as defined in claim 12 in which the light-to-be-modulated is linearly polarized light and the dielectric material block is positioned so that the light-to-be-modulated impinges upon said one surface in the form of P-polarized light.

16. A surface plasmon optical modulator element as defined in claim 12 in which said dielectric material block is in the form of a prism.

17. A surface plasmon optical modulator element as defined in claim 12 in which said dielectric material block is integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism.

18. A surface plasmon optical modulator element as defined in claim 12 in which said photo-functional film is formed of a compound represented by the following general formula (I):

General formula (I)

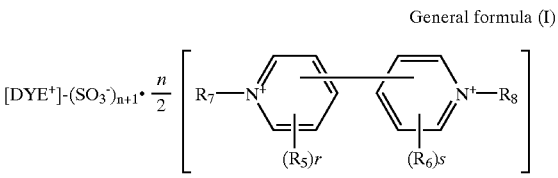

wherein DYE$^+$ represents a monovalent cyanine dye cation, n represents an integer not smaller than 1, $R_5$ and $R_6$ represent a substituent group independently of each other, $R_7$ and $R_8$ represent an alkyl group, an alkenyl group, an alkynyl group, an aralkyl group, an aryl group or a heterocyclic group independently of each other, $R_5$ and $R_6$ may be bonded to form a ring, $R_5$ and $R_7$ may be bonded to form a ring, $R_6$ and $R_8$ may be bonded to form a ring, $R_7$ and $R_8$ may be bonded to form a ring, r and s represent an integer from 0 to 4 independently of each other, and when each of r and s represents an integer not smaller than 2, that is, when there are a plurality of $R_5$'s or $R_6$'s, they may be either equal to each other or different from each other.

19. A surface plasmon optical modulator element as defined in claim 12 in which said photo-functional film is formed of one or more dye compounds represented by the following general formula (II-1) or (II-2):

General formula (II-1)

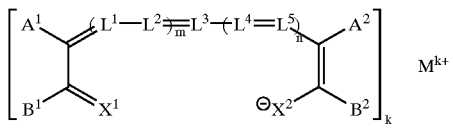

General formula (II-2)

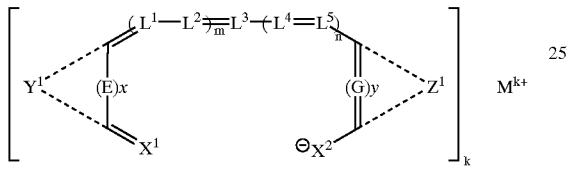

wherein $A^1$, $A^2$, $B^1$ and $B^2$ respectively represent substituent groups, $L^1$, $L^2$, $L^3$, $L^4$ and $L^5$ respectively represents methyne groups, $X^1$ represents =O, =NR, or =C(CN)$_2$ (R representing a substituent group), $X^2$ represents —O, —NR or —C(CN)$_2$ (R representing a substituent group), m and n respectively represent integers in the range of 0 to 2, $Y^1$ and E respectively represent an atom or a group of atoms required to form a carbon ring or a heterocycle, $Z^1$ and G respectively represent an atom or a group of atoms required to form a carbon ring or a heterocycle, x represents 0 or 1, y represents 0 or 1, $Mk^+$ represents an onium ion and k represents a number of the charges.

20. A surface plasmon optical modulator element as defined in claim 12 in which said photo-functional film is formed of an organic dye compound represented by the following general formula (III):

General formula (III)

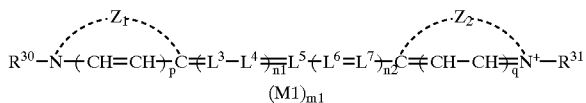

wherein $Z^1$ and $Z^2$ represent independently of each other a group of atoms required to form a five- or six-membered nitrogen-containing heterocycle; $R^{30}$ and $R^{31}$ represent independently of each other an alkyl group; $L^3$, $L^4$, $L^5$, $L^6$ and $L^7$ represent a methyne group; n1, n2, p and q respectively represent an integer from 0 to 2 and $(M1)_{m1}$ represents a charge-balancing counter ion.

21. A surface plasmon optical modulator element as defined in claim 20 in which said photo-functional film is formed of a combination of an organic dye compound represented by said general formula (III) and an organic oxidizing agent represented by the following general formula (IV):

General formula (IV)

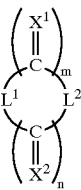

wherein m and n represents independently of each other an integer 0 to 2, $X^1$ and $X^2$ represent =NR$^1$ or =CR$^2$R$^3$ ($R^1$, $R^2$ and $R^3$ being a substituent group) and $L^1$ and $L^2$ represent independently of each other a divalent bonding group.

22. A surface plasmon optical modulator element as defined in claim 12 in which said photo-functional film is formed of a compound represented by the following general formula (V):

General formula (V)

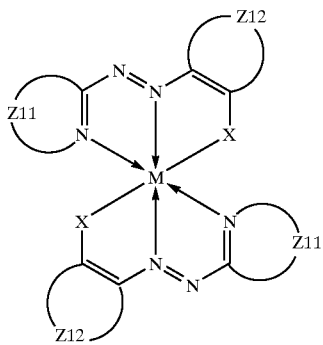

wherein M represents a metal atom, X represents an oxygen atom, a sulfur atom or =NR$^{21}$, NR$^{21}$ representing a hydrogen atom, an alkyl group, an aryl group, an acyl group, an alkylsulfonyl group or an arylsulfonyl group, $Z^{11}$ represents a group of atoms required to complete a five- or six-membered nitrogen-containing heterocycle, and $Z^{12}$ represents a group of atoms required to complete an aromatic ring or an aromatic heterocycle.

23. A surface plasmon optical modulator element comprising
a dielectric material block disposed so that light-to-be-modulated travels through the interior of the dielectric material block and impinges upon one surface thereof at an angle of total reflection,
a silver film formed on said one surface of the dielectric material block,
an oxygen cut photo-functional film which is formed on the silver film and whose refractive index is changed upon exposure to light, and
a modulating light source which projects modulating light onto the photo-functional film.

24. A surface plasmon optical modulator element as defined in claim 23 in which the angle of incidence of the light-to-be-modulated to said one surface of the dielectric material block is set so that relatively strong surface plasmon resonance is generated in the metal film when the modulating light is projected onto the photo-functional film and relatively weak or no surface plasmon resonance is generated in the metal film when the modulating light is not projected onto the photo-functional film.

25. A surface plasmon optical modulator element as defined in claim 23 in which the angle of incidence of the light-to-be-modulated to said one surface of the dielectric material block is set so that relatively strong surface plasmon resonance is generated in the metal film when the modulating light is not projected onto the photo-functional film and relatively weak or no surface plasmon resonance is generated in the metal film when the modulating light is projected onto the photo-functional film.

26. A surface plasmon optical modulator element as defined in claim 23 in which the light-to-be-modulated is linearly polarized light and the dielectric material block is positioned so that the light-to-be-modulated impinges upon said one surface in the form of P-polarized light.

27. A surface plasmon optical modulator element as defined in claim 23 in which said dielectric material block is in the form of a prism.

28. A surface plasmon optical modulator element as defined in claim 23 in which said dielectric material block is integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism.

29. A surface plasmon optical modulator element as defined in claim 23 in which said photo-functional film is formed of a compound represented by the following general formula (I):

General formula (I)

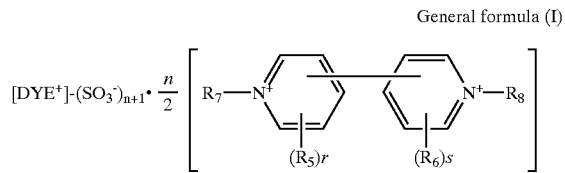

wherein DYE⁺ represents a monovalent cyanine dye cation, n represents an integer not smaller than 1, $R_5$ and $R_6$ represent a substituent group independently of each other, $R_7$ and $R_8$ represent an alkyl group, an alkenyl group, an alkynyl group, an aralkyl group, an aryl group or a heterocyclic group independently of each other, $R_5$ and $R_6$ may be bonded to form a ring, $R_5$ and $R_7$ may be bonded to form a ring, $R_6$ and $R_8$ may be bonded to form a ring, $R_7$ and $R_8$ may be bonded to form a ring, r and s represent an integer from 0 to 4 independently of each other, and when each of r and s represents an integer not smaller than 2, that is, when there are a plurality of $R_5$'s or $R_6$'s, they may be either equal to each other or different from each other.

30. A surface plasmon optical modulator element as defined in claim 23 in which said photo-functional film is formed of one or more dye compounds represented by the following general formula (II-1) or (II-2):

General formula (II-1)

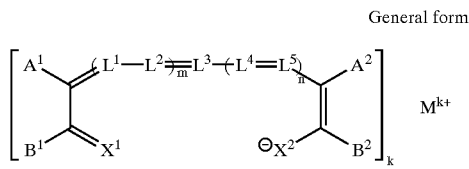

General formula (II-2)

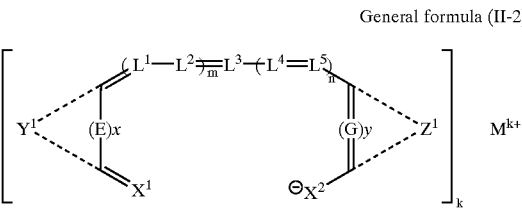

wherein $A^1$, $A^2$, $B^1$ and $B^2$ respectively represent substituent groups, $L^1$, $L^2$, $L^3$, $L^4$ and $L^5$ respectively represents methyne groups, $X^1$ represents =O, =NR, or =C(CN)$_2$ (R representing a substituent group), $X^2$ represents —O, —NR or —C(CN)$_2$ (R representing a substituent group), m and n respectively represent integers in the range of 0 to 2, $Y^1$ and E respectively represent an atom or a group of atoms required to form a carbon ring or a heterocycle, $Z^1$ and G respectively represent an atom or a group of atoms required to form a carbon ring or a heterocycle, x represents 0 or 1, y represents 0 or 1, Mk⁺ represents an onium ion and k represents a number of the charges.

31. A surface plasmon optical modulator element as defined in claim 23 in which said photo-functional film is formed of an organic dye compound represented by the following general formula (III):

General formula (III)

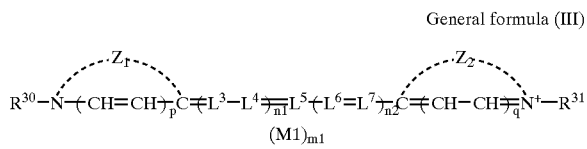

wherein $Z^1$ and $Z^2$ represent independently of each other a group of atoms required to form a five- or six-membered nitrogen-containing heterocycle; $R^{30}$ and $R^{31}$ represent independently of each other an alkyl group; $L^3$, $L^4$, $L^5$, $L^6$ and $L^7$ represent a methyne group; n1, n2, p and q respectively represent an integer from 0 to 2 and $(M1)_{m1}$ represents a charge-balancing counter ion.

32. A surface plasmon optical modulator element as defined in claim 31 in which said photo-functional film is formed of a combination of an organic dye compound represented by said general formula (III) and an organic oxidizing agent represented by the following general formula (IV):

General formula (IV)

wherein m and n represents independently of each other an integer 0 to 2, $X^1$ and $X^2$ represent =NR¹ or =CR²R₃ ($R^1$, $R^2$ and $R^3$ being a substituent group) and $L^1$ and $L^2$ represent independently of each other a divalent bonding group.

33. A surface plasmon optical modulator element as defined in claim 23 in which said photo-functional film is formed of a compound represented by the following general formula (V):

General formula (V)

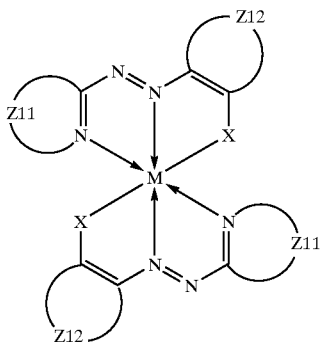

wherein M represents a metal atom, X represents an oxygen atom, a sulfur atom or =$N^{21}$, $NR^{21}$ representing a hydrogen atom, an alkyl group, an aryl group, an acyl group, an alkylsulfonyl group or an arylsulfonyl group, $Z^{11}$ represents a group of atoms required to complete a five- or six-membered nitrogen-containing heterocycle, and $Z^{12}$ represents a group of atoms required to complete an aromatic ring or an aromatic heterocycle.

34. A surface plasmon optical modulator element comprising
    a dielectric material block disposed so that light-to-be-modulated travels through the interior of the dielectric material block and impinges upon one surface thereof at an angle of total reflection,
    a dielectric material layer which is formed on said one surface of the dielectric material block and is of a material lower than the dielectric material block in refractive index,
    a metal film formed on the dielectric material layer,
    a photo-functional film which is formed on the metal film and whose refractive index is changed upon exposure to light, and
    a modulating light source which projects modulating light onto the photo-functional film.

35. A surface plasmon optical modulator element as defined in claim 34 in which the angle of incidence of the light-to-be-modulated to said one surface of the dielectric material block is set so that relatively strong surface plasmon resonance is generated in the metal film when the modulating light is projected onto the photo-functional film and relatively weak or no surface plasmon resonance is generated in the metal film when the modulating light is not projected onto the photo-functional film.

36. A surface plasmon optical modulator element as defined in claim 34 in which the angle of incidence of the light-to-be-modulated to said one surface of the dielectric material block is set so that relatively strong surface plasmon resonance is generated in the metal film when the modulating light is not projected onto the photo-functional film and relatively weak or no surface plasmon resonance is generated in the metal film when the modulating light is projected onto the photo-functional film.

37. A surface plasmon optical modulator element as defined in claim 34 in which the refractive index of the dielectric material layer is substantially equal to the refractive index of the photo-functional film without projection of the modulating light.

38. A surface plasmon optical modulator element as defined in claim 34 in which the light-to-be-modulated is linearly polarized light and the dielectric material block is positioned so that the light-to-be-modulated impinges upon said one surface in the form of P-polarized light.

39. A surface plasmon optical modulator element as defined in claim 34 in which said dielectric material block is in the form of a prism.

40. A surface plasmon optical modulator element as defined in claim 34 in which said dielectric material block is integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism.

41. A surface plasmon optical modulator element as defined in claim 34 in which said photo-functional film is formed of a compound represented by the following general formula (I):

General formula (I)

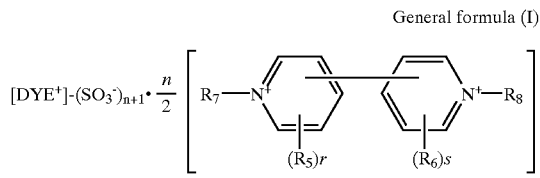

wherein $DYE^+$ represents a monovalent cyanine dye cation, n represents an integer not smaller than 1, $R_5$ and $R_6$ represent a substituent group independently of each other, $R_7$ and $R_8$ represent an alkyl group, an alkenyl group, an alkynyl group, an aralkyl group, an aryl group or a heterocyclic group independently of each other, $R_5$ and $R_6$ may be bonded to form a ring, $R_5$ and $R_7$ may be bonded to form a ring, $R_6$ and $R_8$ may be bonded to form a ring, $R_7$ and $R_8$ may be bonded to form a ring, r and s represent an integer from 0 to 4 independently of each other, and when each of r and s represents an integer not smaller than 2, that is, when there are a plurality of $R_5$'s or $R_6$'s, they may be either equal to each other or different from each other.

42. A surface plasmon optical modulator element as defined in claim 34 in which said photo-functional film is formed of one or more dye compounds represented by the following general formula (II-1) or (II-2):

General formula (II-1)

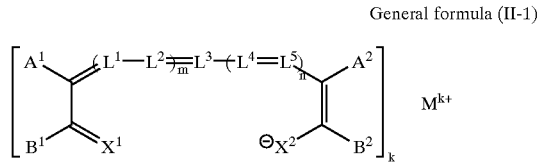

General formula (II-2)

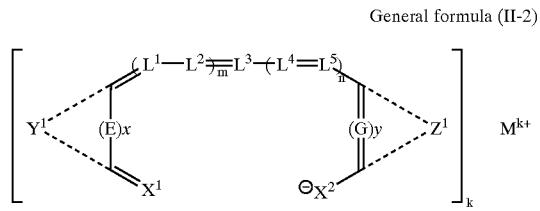

wherein $A^1$, $A^2$, $B^1$ and $B^2$ respectively represent substituent groups, $L^1$, $L^2$, $L^3$, $L^4$ and $L^5$ respectively represents methyne groups, $X^1$ represents =O, =NR, or =$C(CN)_2$ (R representing a substituent group), $X^2$ represents —O, —NR or —$C(CN)_2$ (R representing a substituent group), m and n respectively represent integers in the range of 0 to 2, $Y^1$ and E respectively represent an atom or a group of atoms required to form a carbon ring or a heterocycle, $Z^1$ and G respectively represent an atom or a group of atoms required to form a carbon ring or a heterocycle, x represents 0 or 1, y represents 0 or 1, $Mk^+$ represents an onium ion and k represents a number of the charges.

43. A surface plasmon optical modulator element as defined in claim 34 in which said photo-functional film is formed of an organic dye compound represented by the following general formula (III):

General formula (III)

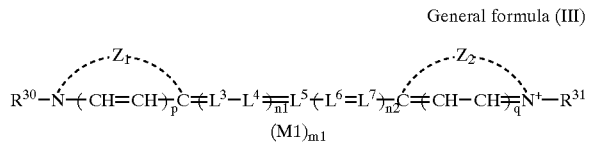

$(M1)_{m1}$ wherein $Z^1$ and $Z^2$ represent independently of each other a group of atoms required to form a five- or six-membered nitrogen-containing heterocycle; $R^{30}$ and $R^{31}$ represent independently of each other an alkyl group; $L^3$, $L^4$, $L^5$, $L^6$ and $L^7$ represent a methyne group; n1, n2, p and q respectively represent an integer from 0 to 2 and $(M1)_{m1}$ represents a charge-balancing counter ion.

44. A surface plasmon optical modulator element as defined in claim 43 in which said photo-functional film is formed of a combination of an organic dye compound represented by said general formula (III) and an organic oxidizing agent represented by the following general formula (IV):

General formula (IV)

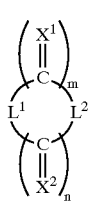

wherein m and n represents independently of each other an integer 0 to 2, $X^1$ and $X^2$ represent $=NR^1$ or $=CR^2R^3$ ($R^1$, $R^2$ and $R^3$ being a substituent group) and $L^1$ and $L^2$ represent independently of each other a divalent bonding group.

45. A surface plasmon optical modulator element as defined in claim 34 in which said photo-functional film is formed of a compound represented by the following general formula (V):

General formula (V)

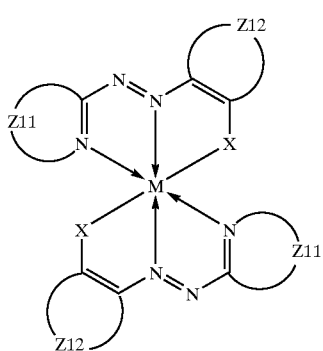

wherein M represents a metal atom, X represents an oxygen atom, a sulfur atom or $=NR^{21}$, $NR^{21}$ representing a hydrogen atom, an alkyl group, an aryl group, an acyl group, an alkylsulfonyl group or an arylsulfonyl group, $Z^{12}$ represents a group of atoms required to complete a five- or six-membered nitrogen-containing heterocycle, and $Z^{12}$ represents a group of atoms required to complete an aromatic ring or an aromatic heterocycle.

46. A surface plasmon optical modulator element comprising a dielectric material block disposed so that light-to-be-modulated travels through the interior of the dielectric material block and impinges upon one surface thereof at an angle of total reflection, a metal film formed on said one surface of the dielectric material block, a photo-functional film which is formed on the metal film and whose refractive index is changed upon exposure to light, and a modulating light source which projects modulating light onto the photo-functional film, wherein the improvement comprises that said photo-functional film is formed of a compound comprising a plurality of molecules containing dye therein, wherein said dyes contain an electron donor and an electron acceptor so that photoelectrons can be transferred between said molecules without any change in the molecular structures thereof when exposed to light.

47. A surface plasmon optical modulator element as defined in claim 46 in which said photo-functional film is formed of a compound represented by the following general formula (I):

General formula (I)

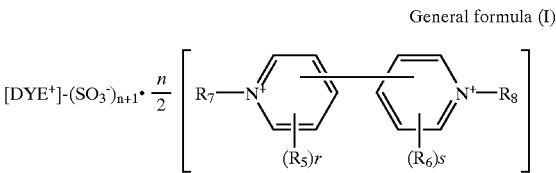

wherein $DYE^+$ represents a monovalent cyanine dye cation, n represents an integer not smaller than 1, $R_5$ and $R_6$ represent a substituent group independently of each other, $R_7$ and $R_8$ represent an alkyl group, an alkenyl group, an alkynyl group, an aralkyl group, an aryl group or a heterocyclic group independently of each other, $R_5$ and $R_6$ may be bonded to form a ring, $R_5$ and $R_7$ may be bonded to form a ring, $R_6$ and $R_8$ may be bonded to form a ring, $R_7$ and $R_8$ may be bonded to form a ring, r and s represent an integer from 0 to 4 independently of each other, and when each of r and s represents an integer not smaller than 2, that is, when there are a plurality of $R_5$'s or $R_6$'s, they may be either equal to each other or different from each other.

48. A surface plasmon optical modulator element as defined in claim 46 in which said photo-functional film is formed of one or more dye compounds represented by the following general formula (II-1) or (II-2):

General formula (II-1)

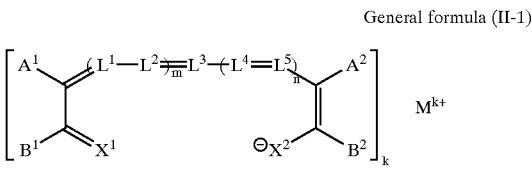

General formula (II-2)

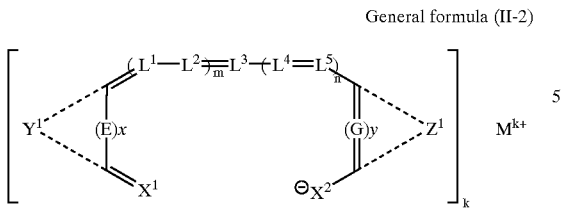

wherein $A^1$, $A^2$, $B^1$ and $B^2$ respectively represent substituent groups, $L^1$, $L^2$, $L^3$, $L^4$ and $L^5$ respectively represents methyne groups, $X^1$ represents =O, =NR, or =C(CN)$_2$ (R representing a substituent group), $X^2$ represents —O, —NR or —C(CN)$_2$ (R representing a substituent group), m and n respectively represent integers in the range of 0 to 2, $Y^1$ and E respectively represent an atom or a group of atoms required to form a carbon ring or a heterocycle, $Z^1$ and G respectively represent an atom or a group of atoms required to form a carbon ring or a heterocycle, x represents 0 or 1, y represents 0 or 1, Mk+ represents an onium ion and k represents a number of the charges.

49. A surface plasmon optical modulator element as defined in claim 46 in which said photo-functional film is formed of an organic dye compound represented by the following general formula (III):

General formula (III)

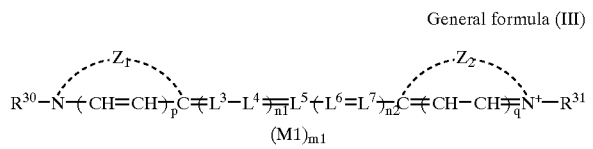

wherein $Z^1$ and $Z^2$ represent independently of each other a group of atoms required to form a five- or six-membered nitrogen-containing heterocycle; $R^{30}$ and $R^{31}$ represent independently of each other an alkyl group; $L^3$, $L^4$, $L^5$, $L^6$ and $L^7$ represent a methyne group; n1, n2, p and q respectively represent an integer from 0 to 2 and $(M1)_{m1}$ represents a charge-balancing counter ion.

50. A surface plasmon optical modulator element as defined in claim 49 in which said photo-functional film is formed of a combination of an organic dye compound represented by said general formula (III) and an organic oxidizing agent represented by the following general formula (IV):

General formula (IV)

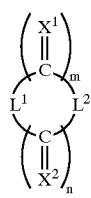

wherein m and n represent independently of each other an integer 0 to 2, $X^1$ and $X^2$ represent =NR$^1$ or =CR$^2$R$^3$ ($R^1$, $R^2$ and $R^3$ being a substituent group) and $L^1$ and $L^2$ represent independently of each other a divalent bonding group.

51. A surface plasmon optical modulator element as defined in claim 46 in which said photo-functional film is formed of a compound represented by the following general formula (V):

General formula (V)

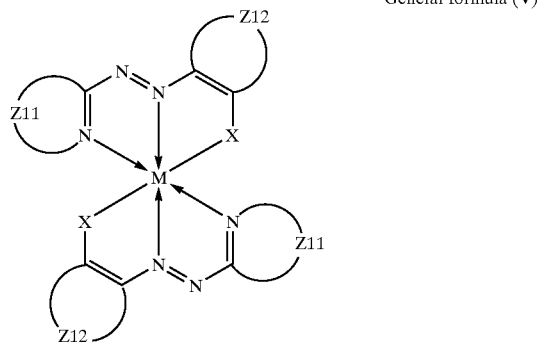

wherein M represents a metal atom, X represents an oxygen atom, a sulfur atom or =NR$^{21}$, NR$^{21}$ representing a hydrogen atom, an alkyl group, an aryl group, an acyl group, an alkylsulfonyl group or an arylsulfonyl group, $Z^{11}$ represents a group of atoms required to complete a five- or six-membered nitrogen-containing heterocycle, and $Z^{12}$ represents a group of atoms required to complete an aromatic ring or an aromatic heterocycle.

52. A surface plasmon optical modulator element as defined in claim 42 in which the angle of incidence of the light-to-be-modulated to said one surface of the dielectric material block is set so that relatively strong surface plasmon resonance is generated in the metal film when the modulating light is projected onto the photo-functional film and relatively weak or no surface plasmon resonance is generated in the metal film when the modulating light is not projected onto the photo-functional film.

53. A surface plasmon optical modulator element as defined in claim 42 in which the angle of incidence of the light-to-be-modulated to said one surface of the dielectric material block is set so that relatively strong surface plasmon resonance is generated in the metal film when the modulating light is not projected onto the photo-functional film and relatively weak or no surface plasmon resonance is generated in the metal film when the modulating light is projected onto the photo-functional film.

54. A surface plasmon optical modulator element as defined in claim 42 in which the light-to-be-modulated is linearly polarized light and the dielectric material block is positioned so that the light-to-be-modulated impinges upon said one surface in the form of P-polarized light.

55. A surface plasmon optical modulator element as defined in claim 42 in which said dielectric material block is in the form of a prism.

56. A surface plasmon optical modulator element as defined in claim 42 in which said dielectric material block is integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism.

57. A surface plasmon optical modulator element comprising a dielectric material block disposed so that light-to-be-modulated travels through the interior of the dielectric material block and impinges upon one surface thereof at an angle of total reflection, a photo-functional film which is formed on said one surface of the dielectric material block and whose refractive index is changed upon exposure to light, a metal film formed on the photo-functional film, and a modulating light source which projects modulating light onto the photo-functional film through the dielectric material block.

58. A surface plasmon optical modulator element as defined in claim 57 in which a protective layer which prevents oxidation of the metal film is formed on the metal film.

59. A surface plasmon optical modulator element as defined in claim 57 in which the angle of incidence of the light-to-be-modulated to said one surface of the dielectric material block is set so that relatively strong surface plasmon resonance is generated in the metal film when the modulating light is projected onto the photo-functional film and relatively weak or no surface plasmon resonance is generated in the metal film when the modulating light is not projected onto the photo-functional film.

60. A surface plasmon optical modulator element as defined in claim 57 in which the angle of incidence of the light-to-be-modulated to said one surface of the dielectric material block is set so that relatively strong surface plasmon resonance is generated in the metal film when the modulating light is not projected onto the photo-functional film and relatively weak or no surface plasmon resonance is generated in the metal film when the modulating light is projected onto the photo-functional film.

61. A surface plasmon optical modulator element as defined in claim 57 in which the light-to-be-modulated is linearly polarized light and the dielectric material block is positioned so that the light-to-be-modulated impinges upon said one surface in the form of P-polarized light.

62. A surface plasmon optical modulator element as defined in claim 57 in which said dielectric material block is in the form of a prism.

63. A surface plasmon optical modulator element as defined in claim 57 in which said dielectric material block is integrated with a prism having a refractive index equal to that of the dielectric material block with refractive index matching solution having a refractive index equal to that of the dielectric material block interposed therebetween so that the light-to-be-modulated impinges upon said one surface of the dielectric material block through the prism.

64. A surface plasmon optical modulator element as defined in claim 57 in which said photo-functional film is formed of a compound represented by the following general formula (I):

General formula (I)

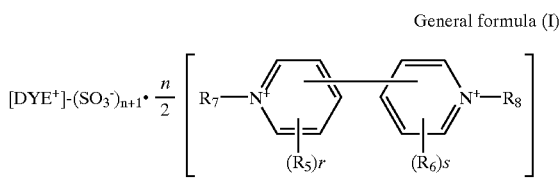

wherein $DYE^+$ represents a monovalent cyanine dye cation, n represents an integer not smaller than 1, $R_5$ and $R_6$ represent a substituent group independently of each other, $R_7$ and $R_8$ represent an alkyl group, an alkenyl group, an alkynyl group, an aralkyl group, an aryl group or a heterocyclic group independently of each other, $R_5$ and $R_6$ may be bonded to form a ring, $R_5$ and $R_7$ may be bonded to form a ring, $R_6$ and $R_8$ may be bonded to form a ring, $R_7$ and $R_8$ may be bonded to form a ring, r and s represent an integer from 0 to 4 independently of each other, and when each of r and s represents an integer not smaller than 2, that is, when there are a plurality of $R_5$'s or $R_6$'s, they may be either equal to each other or different from each other.

65. A surface plasmon optical modulator element as defined in claim 57 in which said photo-functional film is formed of one or more dye compounds represented by the following general formula (II-1) or (II-2):

General formula (II-1)

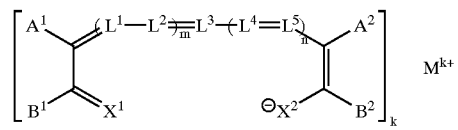

General formula (II-2)

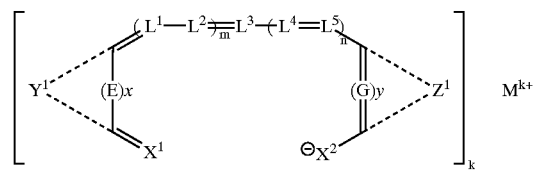

wherein $A^1$, $A^2$, $B^1$ and $B^2$ respectively represent substituent groups, $L^1$, $L^2$, $L^3$, $L^4$ and $L^5$ respectively represents methyne groups, $X^1$ represents =O, =NR, or =C(CN)$_2$ (R representing a substituent group), $X^2$ represents —O, —NR or —C(CN)$_2$ (R representing a substituent group), m and n respectively represent integers in the range of 0 to 2, $Y^1$ and E respectively represent an atom or a group of atoms required to form a carbon ring or a heterocycle, $Z^1$ and G respectively represent an atom or a group of atoms required to form a carbon ring or a heterocycle, x represents 0 or 1, y represents 0 or 1, $Mk^+$ represents an onium ion and k represents a number of the charges.

66. A surface plasmon optical modulator element as defined in claim 57 in which said photo-functional film is formed of an organic dye compound represented by the following general formula (III):

General formula (III)

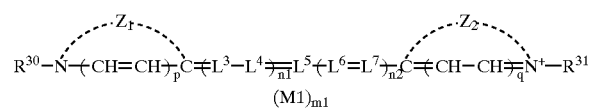

wherein $Z^1$ and $Z^2$ represent independently of each other a group of atoms required to form a five- or six-membered nitrogen-containing heterocycle; $R^{30}$ and $R^{31}$ represent independently of each other an alkyl group; $L^3$, $L^4$, $L^5$, $L^6$ and $L^7$ represent a methyne group; n1, n2, p and q respectively represent an integer from 0 to 2 and $(M1)_{m1}$ represents a charge-balancing counter ion.

67. A surface plasmon optical modulator element as defined in claim 66 in which said photo-functional film is formed of a combination of an organic dye compound represented by said general formula (III) and an organic oxidizing agent represented by the following general formula (IV):

General formula (IV)

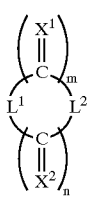

wherein m and n represents independently of each other an integer 0 to 2, $X^1$ and $X^2$ represent $=NR^1$ or $=CR^2R^3$ ($R^1$, $R^2$ and $R^3$ being a substituent group) and $L^1$ and $L^2$ represent independently of each other a divalent bonding group.

68. A surface plasmon optical modulator element as defined in claim 57 in which said photo-functional film is formed of a compound represented by the following general formula (V):

General formula (V)

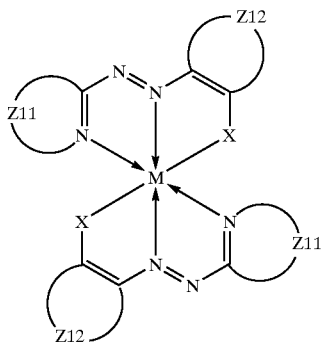

wherein M represents a metal atom, X represents an oxygen atom, a sulfur atom or $=NR^{21}$, $NR^{21}$ representing a hydrogen atom, an alkyl group, an aryl group, an acyl group, an alkylsulfonyl group or an arylsulfonyl group, $Z^{11}$ represents a group of atoms required to complete a five- or six-membered nitrogen-containing heterocycle, and $Z^{12}$ represents a group of atoms required to complete an aromatic ring or an aromatic heterocycle.

* * * * *